(12) United States Patent
Duparre

(10) Patent No.: US 9,128,228 B2
(45) Date of Patent: Sep. 8, 2015

(54) OPTICAL ARRANGEMENTS FOR USE WITH AN ARRAY CAMERA

(71) Applicant: Pelican Imaging Corporation, Mountain View, CA (US)

(72) Inventor: Jacques Duparre, Jena (DE)

(73) Assignee: PELICAN IMAGING CORPORATION, Santa Clara, CA (US)

( * ) Notice: Subject to any disclaimer, the term of this patent is extended or adjusted under 35 U.S.C. 154(b) by 0 days.

(21) Appl. No.: 14/281,534

(22) Filed: May 19, 2014

(65) Prior Publication Data

US 2014/0347748 A1    Nov. 27, 2014

Related U.S. Application Data

(62) Division of application No. 13/536,520, filed on Jun. 28, 2012, now Pat. No. 8,804,255.

(60) Provisional application No. 61/502,158, filed on Jun. 28, 2011.

(51) Int. Cl.
*G02B 9/00*      (2006.01)
*G02B 9/04*      (2006.01)
(Continued)

(52) U.S. Cl.
CPC ........ *G02B 3/0062* (2013.01); *B29D 11/00298* (2013.01); *G02B 5/20* (2013.01); *G02B 7/003* (2013.01); *G02B 9/04* (2013.01); *G02B 13/003* (2013.01); *G02B 13/004* (2013.01);
(Continued)

(58) Field of Classification Search
CPC ....... G02B 13/003; G02B 13/006; G02B 9/04

USPC .................................................. 359/793, 796
See application file for complete search history.

(56) References Cited

U.S. PATENT DOCUMENTS 4,124,798 A    11/1978  Thompson
4,198,646 A     4/1980  Alexander et al.
(Continued)

FOREIGN PATENT DOCUMENTS

EP        840502 A2    5/1998
EP       1201407 A2    5/2002
(Continued)

OTHER PUBLICATIONS

International Search Report and Written Opinion for International Application No. PCT/US13/46002, Completed Nov. 13, 2013, Mailed Nov. 29, 2013, 7 pgs.
International Search Report and Written Opinion for International Application No. PCT/US13/48772, Completed Oct. 21, 2013, Mailed Nov. 8, 2013, 6 pgs.
(Continued)

*Primary Examiner* — William Choi
(74) *Attorney, Agent, or Firm* — KPPB LLP

(57) ABSTRACT

A variety of optical arrangements and methods of modifying or enhancing the optical characteristics and functionality of these optical arrangements are provided. The optical arrangements being specifically designed to operate with camera arrays that incorporate an imaging device that is formed of a plurality of imagers that each include a plurality of pixels. The plurality of imagers include a first imager having a first imaging characteristics and a second imager having a second imaging characteristics. The images generated by the plurality of imagers are processed to obtain an enhanced image compared to images captured by the imagers.

6 Claims, 42 Drawing Sheets

(51) Int. Cl.
*G02B 3/00* (2006.01)
*G02B 13/00* (2006.01)
*B29D 11/00* (2006.01)
*G02B 5/20* (2006.01)
*G02B 7/00* (2006.01)

(52) U.S. Cl.
CPC .......... *G02B13/005* (2013.01); *G02B 13/0035* (2013.01); *G02B 13/0045* (2013.01); *G02B 13/0085* (2013.01); *G02B 3/0006* (2013.01)

(56) References Cited

U.S. PATENT DOCUMENTS

| | | | |
|---|---|---|---|
| 4,323,925 A | 4/1982 | Abell et al. |
| 4,460,449 A | 7/1984 | Montalbano |
| 4,467,365 A | 8/1984 | Murayama et al. |
| 5,005,083 A | 4/1991 | Grage |
| 5,070,414 A | 12/1991 | Tsutsumi |
| 5,144,448 A | 9/1992 | Hornbaker |
| 5,327,125 A | 7/1994 | Iwase et al. |
| 5,629,524 A | 5/1997 | Stettner et al. |
| 5,808,350 A | 9/1998 | Jack et al. |
| 5,832,312 A | 11/1998 | Rieger et al. |
| 5,880,691 A | 3/1999 | Fossum et al. |
| 5,933,190 A | 8/1999 | Dierickx et al. |
| 5,973,844 A | 10/1999 | Burger |
| 6,002,743 A | 12/1999 | Telymonde |
| 6,034,690 A | 3/2000 | Gallery et al. |
| 6,069,351 A | 5/2000 | Mack |
| 6,069,365 A | 5/2000 | Chow et al. |
| 6,097,394 A | 8/2000 | Levoy et al. |
| 6,124,974 A | 9/2000 | Burger |
| 6,137,535 A | 10/2000 | Meyers |
| 6,141,048 A | 10/2000 | Meyers |
| 6,160,909 A | 12/2000 | Melen |
| 6,205,241 B1 | 3/2001 | Melen |
| 6,358,862 B1 | 3/2002 | Ireland et al. |
| 6,563,537 B1 | 5/2003 | Kawamura et al. |
| 6,603,513 B1 | 8/2003 | Berezin |
| 6,611,289 B1 | 8/2003 | Yu |
| 6,627,896 B1 | 9/2003 | Hashimoto et al. |
| 6,628,330 B1 | 9/2003 | Lin |
| 6,635,941 B2 | 10/2003 | Suda |
| 6,657,218 B2 | 12/2003 | Noda |
| 6,671,399 B1 | 12/2003 | Berestov |
| 6,765,617 B1 | 7/2004 | Tangen et al. |
| 6,771,833 B1 | 8/2004 | Edgar |
| 6,774,941 B1 | 8/2004 | Boisvert et al. |
| 6,795,253 B2 | 9/2004 | Shinohara |
| 6,879,735 B1 | 4/2005 | Portniaguine et al. |
| 6,903,770 B1 | 6/2005 | Kobayashi et al. |
| 6,909,121 B2 | 6/2005 | Nishikawa |
| 6,958,862 B1 | 10/2005 | Joseph |
| 7,085,409 B2 | 8/2006 | Sawhney et al. |
| 7,199,348 B2 | 4/2007 | Olsen et al. |
| 7,262,799 B2 | 8/2007 | Suda |
| 7,292,735 B2 | 11/2007 | Blake et al. |
| 7,295,697 B1 | 11/2007 | Satoh |
| 7,391,572 B2 | 6/2008 | Jacobowitz et al. |
| 7,408,725 B2 | 8/2008 | Sato |
| 7,606,484 B1 | 10/2009 | Richards et al. |
| 7,633,511 B2 | 12/2009 | Shum et al. |
| 7,657,090 B2 | 2/2010 | Omatsu et al. |
| 7,675,681 B2 | 3/2010 | Tomikawa et al. |
| 7,706,634 B2 | 4/2010 | Schmitt et al. |
| 7,723,662 B2 | 5/2010 | Levoy et al. |
| 7,782,364 B2 | 8/2010 | Smith |
| 7,826,153 B2 * | 11/2010 | Hong .......................... 359/797 |
| 7,912,673 B2 | 3/2011 | Hébert et al. |
| 8,013,904 B2 | 9/2011 | Tan et al. |
| 8,027,531 B2 | 9/2011 | Wilburn et al. |
| 8,044,994 B2 | 10/2011 | Vetro et al. |
| 8,077,245 B2 | 12/2011 | Adamo et al. |
| 8,098,304 B2 | 1/2012 | Pinto et al. |
| 8,106,949 B2 | 1/2012 | Tan et al. |
| 8,126,279 B2 | 2/2012 | Marcellin et al. |
| 8,131,097 B2 | 3/2012 | Lelescu et al. |
| 8,164,629 B1 | 4/2012 | Zhang |
| 8,180,145 B2 | 5/2012 | Wu et al. |
| 8,189,089 B1 | 5/2012 | Georgiev et al. |
| 8,213,711 B2 | 7/2012 | Tam et al. |
| 8,231,814 B2 | 7/2012 | Duparre |
| 8,294,099 B2 | 10/2012 | Blackwell, Jr. |
| 8,305,456 B1 | 11/2012 | Mcmahon |
| 8,360,574 B2 | 1/2013 | Ishak et al. |
| 8,406,562 B2 | 3/2013 | Bassi et al. |
| 8,514,491 B2 | 8/2013 | Duparre |
| 8,541,730 B2 | 9/2013 | Inuiya |
| 8,542,933 B2 | 9/2013 | Venkataraman et al. |
| 8,559,756 B2 | 10/2013 | Georgiev et al. |
| 8,619,082 B1 | 12/2013 | Ciurea et al. |
| 8,773,536 B1 | 7/2014 | Zhang |
| 8,804,255 B2 | 8/2014 | Duparre |
| 8,830,375 B2 | 9/2014 | Ludwig |
| 8,861,089 B2 | 10/2014 | Duparre |
| 2001/0005225 A1 | 6/2001 | Clark et al. |
| 2001/0019621 A1 | 9/2001 | Hanna et al. |
| 2002/0012056 A1 | 1/2002 | Trevino et al. |
| 2002/0027608 A1 | 3/2002 | Johnson et al. |
| 2002/0039438 A1 | 4/2002 | Mori et al. |
| 2002/0063807 A1 | 5/2002 | Margulis |
| 2002/0087403 A1 | 7/2002 | Meyers et al. |
| 2002/0089596 A1 | 7/2002 | Suda |
| 2002/0094027 A1 | 7/2002 | Sato et al. |
| 2002/0101528 A1 | 8/2002 | Lee et al. |
| 2002/0113867 A1 | 8/2002 | Takigawa et al. |
| 2002/0113888 A1 | 8/2002 | Sonoda et al. |
| 2002/0163054 A1 | 11/2002 | Suda |
| 2002/0167537 A1 | 11/2002 | Trajkovic |
| 2002/0177054 A1 | 11/2002 | Saitoh et al. |
| 2003/0025227 A1 | 2/2003 | Daniell |
| 2003/0086079 A1 | 5/2003 | Barth et al. |
| 2003/0124763 A1 | 7/2003 | Fan et al. |
| 2003/0179418 A1 | 9/2003 | Wengender et al. |
| 2003/0211405 A1 | 11/2003 | Venkataraman |
| 2004/0008271 A1 | 1/2004 | Hagimori et al. |
| 2004/0012689 A1 | 1/2004 | Tinnerino et al. |
| 2004/0047274 A1 | 3/2004 | Amanai |
| 2004/0050104 A1 | 3/2004 | Ghosh et al. |
| 2004/0056966 A1 | 3/2004 | Schechner et al. |
| 2004/0100570 A1 | 5/2004 | Shizukuishi |
| 2004/0114807 A1 | 6/2004 | Lelescu et al. |
| 2004/0151401 A1 | 8/2004 | Sawhney et al. |
| 2004/0165090 A1 | 8/2004 | Ning |
| 2004/0170340 A1 | 9/2004 | Tipping et al. |
| 2004/0174439 A1 | 9/2004 | Upton |
| 2004/0207836 A1 | 10/2004 | Chhibber et al. |
| 2004/0213449 A1 | 10/2004 | Safaee-Rad et al. |
| 2004/0218809 A1 | 11/2004 | Blake et al. |
| 2004/0234873 A1 | 11/2004 | Venkataraman |
| 2004/0251509 A1 | 12/2004 | Choi |
| 2005/0006477 A1 | 1/2005 | Patel |
| 2005/0012035 A1 | 1/2005 | Miller |
| 2005/0036778 A1 | 2/2005 | DeMonte |
| 2005/0047678 A1 | 3/2005 | Jones et al. |
| 2005/0048690 A1 | 3/2005 | Yamamoto |
| 2005/0068436 A1 | 3/2005 | Fraenkel et al. |
| 2005/0128595 A1 | 6/2005 | Shimizu |
| 2005/0132098 A1 | 6/2005 | Sonoda et al. |
| 2005/0134712 A1 | 6/2005 | Gruhlke et al. |
| 2005/0151759 A1 | 7/2005 | Gonzalez-Banos et al. |
| 2005/0175257 A1 | 8/2005 | Kuroki |
| 2005/0205785 A1 | 9/2005 | Hornback et al. |
| 2005/0219363 A1 | 10/2005 | Kohler et al. |
| 2005/0225654 A1 | 10/2005 | Feldman et al. |
| 2005/0275946 A1 | 12/2005 | Choo et al. |
| 2005/0286612 A1 | 12/2005 | Takanashi |
| 2006/0002635 A1 | 1/2006 | Nestares et al. |
| 2006/0023197 A1 | 2/2006 | Joel |
| 2006/0023314 A1 | 2/2006 | Boettiger et al. |
| 2006/0033005 A1 | 2/2006 | Jerdev et al. |
| 2006/0038891 A1 | 2/2006 | Okutomi et al. |
| 2006/0054780 A1 | 3/2006 | Garrood et al. |
| 2006/0054782 A1 | 3/2006 | Olsen et al. |

(56) References Cited

U.S. PATENT DOCUMENTS

| | | |
|---|---|---|
| 2006/0055811 A1 | 3/2006 | Frtiz et al. |
| 2006/0072029 A1 | 4/2006 | Miyatake et al. |
| 2006/0087747 A1 | 4/2006 | Ohzawa et al. |
| 2006/0098888 A1 | 5/2006 | Morishita |
| 2006/0125936 A1 | 6/2006 | Gruhike et al. |
| 2006/0138322 A1 | 6/2006 | Costello et al. |
| 2006/0157640 A1 | 7/2006 | Perlman et al. |
| 2006/0159369 A1 | 7/2006 | Young |
| 2006/0176566 A1 | 8/2006 | Boettiger et al. |
| 2006/0187338 A1 | 8/2006 | May et al. |
| 2006/0203113 A1 | 9/2006 | Wada et al. |
| 2006/0210186 A1 | 9/2006 | Berkner |
| 2006/0239549 A1 | 10/2006 | Kelly et al. |
| 2006/0243889 A1 | 11/2006 | Farnworth et al. |
| 2006/0251410 A1 | 11/2006 | Trutna |
| 2006/0274174 A1 | 12/2006 | Tewinkle |
| 2006/0278948 A1 | 12/2006 | Yamaguchi et al. |
| 2006/0279648 A1 | 12/2006 | Senba et al. |
| 2007/0002159 A1 | 1/2007 | Olsen et al. |
| 2007/0024614 A1 | 2/2007 | Tam et al. |
| 2007/0040828 A1 | 2/2007 | Zalevsky et al. |
| 2007/0040922 A1 | 2/2007 | McKee et al. |
| 2007/0041391 A1 | 2/2007 | Lin et al. |
| 2007/0052825 A1 | 3/2007 | Cho |
| 2007/0083114 A1 | 4/2007 | Yang et al. |
| 2007/0085917 A1 | 4/2007 | Kobayashi |
| 2007/0102622 A1 | 5/2007 | Olsen et al. |
| 2007/0126898 A1 | 6/2007 | Feldman et al. |
| 2007/0127831 A1 | 6/2007 | Venkataraman |
| 2007/0139333 A1 | 6/2007 | Sato et al. |
| 2007/0146511 A1 | 6/2007 | Kinoshita et al. |
| 2007/0159541 A1 | 7/2007 | Sparks et al. |
| 2007/0160310 A1 | 7/2007 | Tanida et al. |
| 2007/0171290 A1 | 7/2007 | Kroger |
| 2007/0206241 A1 | 9/2007 | Smith et al. |
| 2007/0211164 A1 | 9/2007 | Olsen et al. |
| 2007/0216765 A1 | 9/2007 | Wong et al. |
| 2007/0228256 A1 | 10/2007 | Mentzer et al. |
| 2007/0257184 A1 | 11/2007 | Olsen et al. |
| 2007/0258006 A1 | 11/2007 | Olsen et al. |
| 2007/0258706 A1 | 11/2007 | Raskar et al. |
| 2007/0263114 A1 | 11/2007 | Gurevich et al. |
| 2007/0268374 A1 | 11/2007 | Robinson |
| 2007/0296835 A1 | 12/2007 | Olsen et al. |
| 2008/0019611 A1 | 1/2008 | Larkin et al. |
| 2008/0025649 A1 | 1/2008 | Liu et al. |
| 2008/0030597 A1 | 2/2008 | Olsen et al. |
| 2008/0043095 A1 | 2/2008 | Vetro et al. |
| 2008/0043096 A1 | 2/2008 | Vetro et al. |
| 2008/0054518 A1 | 3/2008 | Ra et al. |
| 2008/0062164 A1 | 3/2008 | Bassi et al. |
| 2008/0080028 A1 | 4/2008 | Bakin et al. |
| 2008/0084486 A1 | 4/2008 | Enge et al. |
| 2008/0088793 A1 | 4/2008 | Sverdrup et al. |
| 2008/0118241 A1 | 5/2008 | TeKolste et al. |
| 2008/0131019 A1 | 6/2008 | Ng |
| 2008/0131107 A1 | 6/2008 | Ueno |
| 2008/0151097 A1 | 6/2008 | Chen et al. |
| 2008/0152296 A1 | 6/2008 | Oh et al. |
| 2008/0158259 A1 | 7/2008 | Kempf et al. |
| 2008/0158375 A1 | 7/2008 | Kakkori et al. |
| 2008/0218610 A1 | 9/2008 | Chapman et al. |
| 2008/0219654 A1 | 9/2008 | Border et al. |
| 2008/0239116 A1 | 10/2008 | Smith |
| 2008/0240598 A1 | 10/2008 | Hasegawa |
| 2008/0247638 A1 | 10/2008 | Tanida et al. |
| 2008/0247653 A1 | 10/2008 | Moussavi et al. |
| 2008/0272416 A1 | 11/2008 | Yun |
| 2008/0298674 A1 | 12/2008 | Baker et al. |
| 2009/0050946 A1 | 2/2009 | Duparre et al. |
| 2009/0052743 A1 | 2/2009 | Techmer |
| 2009/0060281 A1 | 3/2009 | Tanida et al. |
| 2009/0086074 A1 | 4/2009 | Li et al. |
| 2009/0091806 A1 | 4/2009 | Inuiya |
| 2009/0096050 A1 | 4/2009 | Park |
| 2009/0102956 A1 | 4/2009 | Georgiev |
| 2009/0109306 A1 | 4/2009 | Shan et al. |
| 2009/0179142 A1 | 7/2009 | Duparre et al. |
| 2009/0180021 A1 | 7/2009 | Kikuchi et al. |
| 2009/0200622 A1 | 8/2009 | Tai et al. |
| 2009/0201371 A1 | 8/2009 | Matsuda et al. |
| 2009/0207235 A1 | 8/2009 | Francini et al. |
| 2009/0225203 A1 | 9/2009 | Tanida et al. |
| 2009/0237520 A1 | 9/2009 | Kaneko et al. |
| 2009/0263017 A1 | 10/2009 | Tanbakuchi |
| 2009/0268192 A1 | 10/2009 | Koenck et al. |
| 2009/0268970 A1 | 10/2009 | Babacan et al. |
| 2009/0268983 A1 | 10/2009 | Stone et al. |
| 2009/0284651 A1 | 11/2009 | Srinivasan |
| 2009/0297056 A1 | 12/2009 | Lelescu et al. |
| 2009/0302205 A9 | 12/2009 | Olsen et al. |
| 2009/0323195 A1 | 12/2009 | Hembree et al. |
| 2009/0323206 A1 | 12/2009 | Oliver et al. |
| 2009/0324118 A1 | 12/2009 | Maslov et al. |
| 2010/0002126 A1 | 1/2010 | Wenstrand et al. |
| 2010/0002313 A1 | 1/2010 | Duparre et al. |
| 2010/0002314 A1 | 1/2010 | Duparre |
| 2010/0053342 A1 | 3/2010 | Hwang et al. |
| 2010/0053600 A1 | 3/2010 | Tanida et al. |
| 2010/0060746 A9 | 3/2010 | Olsen et al. |
| 2010/0086227 A1 | 4/2010 | Sun et al. |
| 2010/0091389 A1 | 4/2010 | Henriksen et al. |
| 2010/0097491 A1 | 4/2010 | Farina et al. |
| 2010/0103259 A1 | 4/2010 | Tanida et al. |
| 2010/0103308 A1 | 4/2010 | Butterfield et al. |
| 2010/0111444 A1 | 5/2010 | Coffman |
| 2010/0118127 A1 | 5/2010 | Nam et al. |
| 2010/0133230 A1 | 6/2010 | Henriksen et al. |
| 2010/0141802 A1 | 6/2010 | Knight et al. |
| 2010/0142839 A1 | 6/2010 | Lakus-Becker |
| 2010/0157073 A1 | 6/2010 | Kondo et al. |
| 2010/0177411 A1 | 7/2010 | Hegde et al. |
| 2010/0194901 A1 | 8/2010 | Van Hoorebeke et al. |
| 2010/0195716 A1 | 8/2010 | Klein et al. |
| 2010/0201834 A1 | 8/2010 | Maruyama et al. |
| 2010/0208100 A9 | 8/2010 | Olsen et al. |
| 2010/0220212 A1 | 9/2010 | Perlman et al. |
| 2010/0231285 A1 | 9/2010 | Boomer et al. |
| 2010/0244165 A1 | 9/2010 | Lake et al. |
| 2010/0265385 A1 | 10/2010 | Knight et al. |
| 2010/0281070 A1 | 11/2010 | Chan et al. |
| 2011/0001037 A1 | 1/2011 | Tewinkle |
| 2011/0018973 A1 | 1/2011 | Takayama |
| 2011/0032370 A1 | 2/2011 | Ludwig |
| 2011/0043661 A1 | 2/2011 | Podoleanu |
| 2011/0043665 A1 | 2/2011 | Ogasahara |
| 2011/0043668 A1 | 2/2011 | McKinnon et al. |
| 2011/0069189 A1 | 3/2011 | Venkataraman et al. |
| 2011/0080487 A1 | 4/2011 | Venkataraman et al. |
| 2011/0122308 A1 | 5/2011 | Duparre |
| 2011/0149408 A1 | 6/2011 | Hahgholt et al. |
| 2011/0149409 A1 | 6/2011 | Haugholt et al. |
| 2011/0153248 A1 | 6/2011 | Gu et al. |
| 2011/0157321 A1 | 6/2011 | Nakajima et al. |
| 2011/0176020 A1 | 7/2011 | Chang |
| 2011/0211824 A1 | 9/2011 | Georgiev et al. |
| 2011/0221658 A1 | 9/2011 | Haddick et al. |
| 2011/0221939 A1 | 9/2011 | Jerdev |
| 2011/0241234 A1 | 10/2011 | Duparre |
| 2011/0255592 A1 | 10/2011 | Sung et al. |
| 2011/0267348 A1 | 11/2011 | Lin et al. |
| 2011/0279721 A1 | 11/2011 | McMahon |
| 2011/0285866 A1 | 11/2011 | Bhrugumalla et al. |
| 2011/0298917 A1 | 12/2011 | Yanagita |
| 2011/0310980 A1 | 12/2011 | Mathew |
| 2012/0012748 A1 | 1/2012 | Pain et al. |
| 2012/0026297 A1 | 2/2012 | Sato |
| 2012/0026342 A1 | 2/2012 | Yu et al. |
| 2012/0069235 A1 | 3/2012 | Imai |
| 2012/0113413 A1 | 5/2012 | Miahczylowicz-Wolski et al. |
| 2012/0147139 A1 | 6/2012 | Li et al. |
| 2012/0147205 A1 | 6/2012 | Lelescu et al. |
| 2012/0153153 A1 | 6/2012 | Chang et al. |
| 2012/0154551 A1 | 6/2012 | Inoue |

(56) References Cited

U.S. PATENT DOCUMENTS

| | | |
|---|---|---|
| 2012/0170134 A1 | 7/2012 | Bolis et al. |
| 2012/0198677 A1 | 8/2012 | Duparre |
| 2012/0229628 A1 | 9/2012 | Ishiyama et al. |
| 2012/0249550 A1 | 10/2012 | Akeley et al. |
| 2012/0287291 A1 | 11/2012 | Mcmahon |
| 2012/0314033 A1 | 12/2012 | Lee et al. |
| 2013/0002828 A1 | 1/2013 | Ding et al. |
| 2013/0003184 A1 | 1/2013 | Duparre |
| 2013/0010073 A1 | 1/2013 | Do et al. |
| 2013/0050504 A1 | 2/2013 | Safaee-Rad et al. |
| 2013/0070060 A1 | 3/2013 | Chatterjee et al. |
| 2013/0077880 A1 | 3/2013 | Venkataraman et al. |
| 2013/0077882 A1 | 3/2013 | Venkataraman et al. |
| 2013/0088637 A1 | 4/2013 | Duparre |
| 2013/0113899 A1 | 5/2013 | Morohoshi et al. |
| 2013/0128121 A1 | 5/2013 | Agarwala et al. |
| 2013/0147979 A1 | 6/2013 | McMahon et al. |
| 2013/0215108 A1 | 8/2013 | McMahon et al. |
| 2013/0222556 A1 | 8/2013 | Shimada |
| 2013/0229540 A1 | 9/2013 | Farina et al. |
| 2013/0265459 A1 | 10/2013 | Duparre et al. |
| 2014/0009586 A1 | 1/2014 | McNamer et al. |
| 2014/0132810 A1 | 5/2014 | McMahon |
| 2014/0198188 A1 | 7/2014 | Izawa |
| 2014/0267762 A1 | 9/2014 | Mullis, Robert et al. |
| 2014/0347509 A1 | 11/2014 | Venkataraman et al. |
| 2014/0354773 A1 | 12/2014 | Venkataraman et al. |
| 2014/0354843 A1 | 12/2014 | Venkataraman et al. |
| 2014/0354853 A1 | 12/2014 | Venkataraman et al. |
| 2014/0354854 A1 | 12/2014 | Venkataraman et al. |
| 2014/0355870 A1 | 12/2014 | Venkataraman et al. |
| 2014/0368686 A1 | 12/2014 | Duparre |

FOREIGN PATENT DOCUMENTS

| | | |
|---|---|---|
| EP | 2336816 A2 | 6/2011 |
| JP | 11142609 A | 5/1999 |
| JP | 11223708 A | 8/1999 |
| JP | 2002205310 A | 7/2002 |
| JP | 2003094445 A | 4/2003 |
| JP | 2005116022 A | 4/2005 |
| JP | 2005181460 A | 7/2005 |
| JP | 2006033493 A | 2/2006 |
| JP | 2006047944 A | 2/2006 |
| JP | 2006258930 A | 9/2006 |
| JP | 2007520107 A | 7/2007 |
| JP | 2008055908 A | 3/2008 |
| JP | 2009132010 A | 6/2009 |
| JP | 2011109484 A | 6/2011 |
| JP | 2013526801 A | 6/2013 |
| JP | 2014521117 A | 8/2014 |
| WO | 2007083579 A1 | 7/2007 |
| WO | 2008108271 A1 | 9/2008 |
| WO | 2009151903 A2 | 12/2009 |
| WO | 2011055655 A1 | 5/2011 |
| WO | 2011063347 A2 | 5/2011 |
| WO | 2011116203 A1 | 9/2011 |
| WO | 2011063347 A3 | 10/2011 |
| WO | 2011143501 A1 | 11/2011 |
| WO | 2012057619 A1 | 5/2012 |
| WO | 2012057620 A2 | 5/2012 |
| WO | 2012057621 A1 | 5/2012 |
| WO | 2012057622 A1 | 5/2012 |
| WO | 2012057623 A1 | 5/2012 |
| WO | 2012057620 A3 | 6/2012 |
| WO | 2012074361 A1 | 6/2012 |
| WO | 2012082904 A1 | 6/2012 |
| WO | 2013003276 A1 | 1/2013 |
| WO | 2013043751 A1 | 3/2013 |
| WO | 2013043761 A1 | 3/2013 |
| WO | 2013049699 A1 | 4/2013 |
| WO | 2013055960 A1 | 4/2013 |
| WO | 2013119706 A1 | 8/2013 |
| WO | 2013126578 A1 | 8/2013 |
| WO | 2014032020 A3 | 5/2014 |
| WO | 2014144157 A1 | 9/2014 |
| WO | 2014149403 A1 | 9/2014 |

OTHER PUBLICATIONS

International Search Report and Written Opinion for International Application No. PCT/US13/56065, Completed Nov. 25, 2013, Mailed Nov. 26, 2013, 8 pgs.
International Search Report and Written Opinion for International Application No. PCT/US13/59991, Completed Feb. 6, 2014, Mailed Feb. 26, 2014, 8 pgs.
International Search Report and Written Opinion for International Application No. PCT/US13/024987, Completed Mar. 27, 2013, Mailed Apr. 15, 2013, 14 pgs.
International Search Report and Written Opinion for International Application No. PCT/US13/056502, Completed Feb. 18, 2014, Mailed Mar. 19, 2014, 7 pgs.
International Search Report and Written Opinion for International Application No. PCT/US2013/069932, Completed Mar. 14, 2014, Mailed Apr. 14, 2014, 12 pgs.
IPRP for International Application No. PCT/US2012/059813, International Filing Date Oct. 11, 2012, Completed Apr. 15, 2014, 7 pgs.
International Search Report and Written Opinion for International Application PCT/US11/36349, mailed Aug. 22, 2011, 12 pgs.
International Search Report and Written Opinion for International Application No. PCT/US2011/64921, Feb. 25, 2011, mailed Mar. 6, 2012, 17 pgs.
International Search Report and Written Opinion for International Application No. PCT/US2013/027146, completed Apr. 2, 2013, 12 pgs.
International Search Report and Written Opinion for International Application PCT/US2009/044687, completed Jan. 5, 2010, 13 pgs.
International Search Report and Written Opinion for International Application PCT/US2010/057661, completed Mar. 9, 2011, 14 pgs.
International Search Report and Written Opinion for International Application PCT/US2012/044014, completed Oct. 12, 2012, 15 pgs.
International Search Report and Written Opinion for International Application PCT/US2012/056151, completed Nov. 14, 2012, 10 pgs.
International Search Report and Written Opinion for International Application PCT/US2012/059813, completed Dec. 17, 2012, 8 pgs.
International Search Report and Written Opinion for International Application PCT/US12/37670, Completed Jul. 5, 2012, 9 pgs.
International Search Report and Written Opinion for International Application PCT/US2012/58093, completed Nov. 15, 2012, 12 pgs.
Office Action for U.S. Appl. No. 12/952,106, dated Aug. 16, 2012, 12 pgs.
Baker et al., "Limits on Super-Resolution and How to Break Them", IEEE Transactions on Pattern Analysis and Machine Intelligence, Sep. 2002, vol. 24, No. 9, pp. 1167-1183.
Bertero et al., "Super-resolution in computational imaging", Micron, 2003, vol. 34, Issues 6-7, 17 pgs.
Bishop et al., "Full-Resolution Depth Map Estimation from an Aliased Plenoptic Light Field", ACCV 2010, Part II, LNCS 6493, pp. 186-200, 2011.
Bishop et al., "Light Field Superresolution", Retrieved from http://home.eps.hw.ac.uk/~sz73/ICCP09/LightFieldSuperresolution.pdf, 9 pgs., (2009).
Bishop et al., "The Light Field Camera: Extended Depth of Field, Aliasing, and Superresolution", IEEE Transactions on Pattern Analysis and Machine Intelligence, May 2012, vol. 34, No. 5, pp. 972-986.
Borman, "Topics in Multiframe Superresolution Restoration", Thesis of Sean Borman, Apr. 2004, 282 pgs.
Borman et al, "Image Sequence Processing", Source unknown, Oct. 14, 2002, 81 pgs.
Borman et al., "Block-Matching Sub-Pixel Motion Estimation from Noisy, Under-Sampled Frames—An Empirical Performance Evaluation", Proc SPIE, Dec. 1998, 3653, 10 pgs.
Borman et al., "Image Resampling and Constraint Formulation for Multi-Frame Super-Resolution Restoration", Proc. SPIE, Jun. 2003, 5016, 12 pgs.
Borman et al., "Linear models for multi-frame super-resolution restoration under non-affine registration and spatially varying PSF", Proc. SPIE, May 2004, vol. 5299, 12 pgs.

(56) References Cited

OTHER PUBLICATIONS

Borman et al., "Nonlinear Prediction Methods for Estimation of Clique Weighting Parameters in NonGaussian Image Models", Proc. SPIE, 1998. 3459, 9 pgs.
Borman et al., "Simultaneous Multi-Frame Map Super-Resolution Video Enhancement Using Spatio-Temporal Priors", Image Processing, 1999, ICIP 99 Proceedings, vol. 3, pp. 469-473.
Borman et al., "Super-Resolution from Image Sequences—A Review", Circuits & Systems, 1998, pp. 374-378.
Bose et al., "Superresolution and Noise Filtering Using Moving Least Squares", IEEE Transactions on Image Processing, date unknown, 21 pgs., (2006).
Boye et al., "Comparison of Subpixel Image Registration Algorithms", Proc. of SPIE-IS&T Electronic Imaging, vol. 7246, pp. 72460X-1-72460X-9, (2009).
Bruckner et al., "Artificial compound eye applying hyperacuity", Optics Express, Dec. 11, 2006, vol. 14, No. 25, pp. 12076-12084.
Bruckner et al., "Driving microoptical imaging systems towards miniature camera applications", Proc. SPIE, Micro-Optics, 2010, 11 pgs.
Bruckner et al., "Thin wafer-level camera lenses inspired by insect compound eyes", Optics Express, Nov. 22, 2010, vol. 18, No. 24, pp. 24379-24394.
Capel, "Image Mosaicing and Super-resolution", [online], Retrieved on Nov. 10, 2012. Retrieved from the Internet at URL:<http://citeseerx.ist.psu.edu/viewdoc/download?doi=1 0.1.1.226.2643 &rep=repl &type=pdf>, Title pg., abstract, table of contents, pp. 1-263 (269 total pages).
Chan et al., "Extending the Depth of Field in a Compound-Eye Imaging System with Super-Resolution Reconstruction", Proceedings—International Conference on Pattern Recognition, 2006, vol. 3, pp. 623-626.
Chan et al., "Investigation of Computational Compound-Eye Imaging System with Super-Resolution Reconstruction", IEEE, ISASSP 2006, pp. 1177-1180.
Chan et al., "Super-resolution reconstruction in a computational compound-eye imaging system", Multidim. Syst. Sign Process, 2007, vol. 18, pp. 83-101.
Drouin et al., "Fast Multiple-Baseline Stereo with Occlusion", Proceedings of the Fifth International Conference on 3-D Digital Imaging and Modeling, 2005, 8 pgs.
Drouin et al., "Geo-Consistency for Wide Multi-Camera Stereo", Proceedings of the 2005 IEEE Computer Society Conference on Computer Vision and Pattern Recognition, 2005, 8 pgs.
Drouin et al., "Improving Border Localization of Multi-Baseline Stereo Using Border-Cut", International Journal of Computer Vision, Jul. 2009, vol. 83, Issue 3, 8 pgs.
Duparre et al., "Artificial apposition compound eye fabricated by micro-optics technology", Applied Optics, Aug. 1, 2004, vol. 43, No. 22, pp. 4303-4310.
Duparre et al., "Artificial compound eye zoom camera", Bioinspiration & Biomimetics, 2008, vol. 3, pp. 1-6.
Duparre et al., "Artificial compound eyes—different concepts and their application to ultra flat image acquisition sensors", MOEMS and Miniaturized Systems IV, Proc. SPIE 5346, Jan. 2004, pp. 89-100.
Duparre et al., "Chirped arrays of refractive ellipsoidal microlenses for aberration correction under oblique incidence", Optics Express, Dec. 26, 2005, vol. 13, No. 26, pp. 10539-10551.
Duparre et al., "Micro-optical artificial compound eyes", Bioinspiration & Biomimetics, 2006, vol. 1, pp. R1-R16.
Duparre et al., "Microoptical artificial compound eyes—from design to experimental verification of two different concepts", Proc. of SPIE, Optical Design and Engineering II, vol. 5962, pp. 59622A-1-59622A-12, (2005).
Duparre et al., "Microoptical Artificial Compound Eyes—Two Different Concepts for Compact Imaging Systems", 11th Microoptics Conference, Oct. 30-Nov. 2, 2005, 2 pgs.
Duparre et al., "Microoptical telescope compound eye", Optics Express, Feb. 7, 2005, vol. 13, No. 3, pp. 889-903.
Duparre et al., "Micro-optically fabricated artificial apposition compound eye", Electronic Imaging—Science and Technology, Prod. SPIE 5301, Jan. 2004, pp. 25-33.
Duparre et al., "Novel Optics/Micro-Optics for Miniature Imaging Systems", Proc. of SPIE, 2006, vol. 6196, pp. 619607-1-619607-15.
Duparre et al., "Theoretical analysis of an artificial superposition compound eye for application in ultra flat digital image acquisition devices", Optical Systems Design, Proc. SPIE 5249, Sep. 2003, pp. 408-418.
Duparre et al., "Thin compound-eye camera", Applied Optics, May 20, 2005, vol. 44, No. 15, pp. 2949-2956.
Duparre et al., "Ultra-Thin Camera Based on Artificial Apposistion Compound Eyes", 10th Microoptics Conference, Sep. 1-3, 2004, 2 pgs.
Fanaswala, "Regularized Super-Resolution of Multi-View Images", Retrieved on Nov. 10, 2012. Retrieved from the Internet at URL:<http://vvww.site.uottawa.ca/-edubois/theses/Fanaswala_thesis.pdf>, 163 pgs.
Farrell et al., "Resolution and Light Sensitivity Tradeoff with Pixel Size", Proceedings of the SPIE Electronic Imaging 2006 Conference, 2006, vol. 6069, 8 pgs.
Farsiu et al., "Advances and Challenges in Super-Resolution", International Journal of Imaging Systems and Technology, 2004, vol. 14, pp. 47-57.
Farsiu et al., "Fast and Robust Multiframe Super Resolution", IEEE Transactions on Image Processing, Oct. 2004, vol. 13, No. 10, pp. 1327-1344.
Farsiu et al., "Multiframe Demosaicing and Super-Resolution of Color Images", IEEE Transactions on Image Processing, Jan. 2006, vol. 15, No. 1, pp. 141-159.
Feris et al., "Multi-Flash Stereopsis: Depth Edge Preserving Stereo with Small Baseline Illumination", IEEE Trans on PAMI, 2006, 31 pgs.
Fife et al., "A 3D Multi-Aperture Image Sensor Architecture", Custom Integrated Circuits Conference, 2006, CICC '06, IEEE, pp. 281-284.
Fife et al., "A 3MPixel Multi-Aperture Image Sensor with 0.7Mu Pixels in 0.11Mu CMOS", ISSCC 2008, Session 2, Image Sensors & Technology, 2008, pp. 48-50.
Fischer et al., Optical System Design, 2nd Edition, SPIE Press, pp. 191-198, (2008).
Fischer et al., Optical System Design, 2nd Edition, SPIE Press, pp. 49-58, (2008).
Hamilton, "JPEG File Interchange Format, Version 1.02", Sep. 1, 1992, 9 pgs.
Hardie, "A Fast Image Super-Algorithm Using an Adaptive Wiener Filter", IEEE Transactions on Image Processing, Dec. 2007, vol. 16, No. 12, pp. 2953-2964.
Horisaki et al., "Irregular Lens Arrangement Design to Improve Imaging Performance of Compound-Eye Imaging Systems", Applied Physics Express, 2010, vol. 3, pp. 022501-1-022501-3.
Horisaki et al., "Superposition Imaging for Three-Dimensionally Space-Invariant Point Spread Functions", Applied Physics Express, 2011, vol. 4, pp. 112501-1-112501-3.
Kang et al., "Handling Occlusions inn Dense Multi-View Stereo", Computer Vision and Pattern Recognition, 2001, vol. 1, pp. 1-103-1-110.
Kitamura et al., "Reconstruction of a high-resolution image on a compound-eye image-capturing system", Applied Optics, Mar. 10, 2004, vol. 43, No. 8, pp. 1719-1727.
Krishnamurthy et al., "Compression and Transmission of Depth Maps for Image-Based Rendering", Image Processing, 2001, pp. 828-831.
Kutulakos et al., "Occluding Contour Detection Using Affine Invariants and Purposive Viewpoint Control", Proc., CVPR 94, 8 pgs., (1994).
Lensvector, "How LensVector Autofocus Works", printed Nov. 2, 2012 from http://www.lensvector.com/overview.html, 1 pg.
Levoy, "Light Fields and Computational Imaging", IEEE Computer Society, Aug. 2006, pp. 46-55.
Levoy et al., "Light Field Rendering", Proc. ADM SIGGRAPH '96, pp. 1-12.

(56) References Cited

OTHER PUBLICATIONS

Li et al., "A Hybrid Camera for Motion Deblurring and Depth Map Super-Resolution," Jun. 23-28, 2008, IEEE Conference on Computer Vision and Pattern Recognition, 8 pgs. Retrieved from www.eecis.udel.edu/~jye/lab_research/08/deblur-feng.pdf on Feb. 5, 2014.
Liu et al., "Virtual View Reconstruction Using Temporal Information", 2012 IEEE International Conference on Multimedia and Expo, 2012, pp. 115-120.
Muehlebach, "Camera Auto Exposure Control for VSLAM Applications", Studies on Mechatronics, Swiss Federal Institute of Technology Zurich, Autumn Term 2010 course, 67 pgs.
Nayar, "Computational Cameras: Redefining the Image", IEEE Computer Society, Aug. 2006, pp. 30-38.
Ng, "Digital Light Field Photography", Thesis, Jul. 2006, 203 pgs.
Ng et al., "Super-Resolution Image Restoration from Blurred Low-Resolution Images", Journal of Mathematical Imaging and Vision, 2005, vol. 23, pp. 367-378.
Nitta et al., "Image reconstruction for thin observation module by bound optics by using the iterative backprojection method", Applied Optics, May 1, 2006, vol. 45, No. 13, pp. 2893-2900.
Nomura et al., "Scene Collages and Flexible Camera Arrays", Proceedings of Eurographics Symposium on Rendering, 2007, 12 pgs.
Park et al., "Super-Resolution Image Reconstruction", IEEE Signal Processing Magazine, May 2003, pp. 21-36.
Pham et al., "Robust Super-Resolution without Regularization", Journal of Physics: Conference Series 124, 2008, pp. 1-19.
Polight, "Designing Imaging Products Using Reflowable Autofocus Lenses", http://www.polight.no/tunable-polymer-autofocus-lens-html--11.html, (2012).
Protter et al., "Generalizing the Nonlocal-Means to Super-Resolution Reconstruction", IEEE Transactions on Image Processing, Jan. 2009, vol. 18, No. 1, pp. 36-51.
Radtke et al., "Laser lithographic fabrication and characterization of a spherical artificial compound eye", Optics Express, Mar. 19, 2007, vol. 15, No. 6, pp. 3067-3077.
Rander et al., "Virtualized Reality: Constructing Time-Varying Virtual Worlds From Real World Events", Proc. of IEEE Visualization '97, Phoenix, Arizona, Oct. 19-24, 1997, pp. 277-283, 552.
Rhemann et al, "Fast Cost-Volume Filtering for Visual Correspondence and Beyond", IEEE Trans. Pattern Anal. Mach. Intell, 2013, vol. 35, No. 2, pp. 504-511.
Robertson et al., "Dynamic Range Improvement Through Multiple Exposures", In Proc. of the Int. Conf. on Image Processing, 1999, 5 pgs.
Robertson et al., "Estimation-theoretic approach to dynamic range enhancement using multiple exposures", Journal of Electronic Imaging, Apr. 2003, vol. 12, No. 2, pp. 219-228.
Roy et al., "Non-Uniform Hierarchical Pyramid Stereo for Large Images", Computer and Robot Vision, 2007, pp. 208-215.
Sauer et al., "Parallel Computation of Sequential Pixel Updates in Statistical Tomographic Reconstruction", ICIP 1995, pp. 93-96.
Shum et al., "Pop-Up Light Field: An Interactive Image-Based Modeling and Rendering System," Apr. 2004, ACM Transactions on Graphics, vol. 23, No. 2, pp. 143-162. Retrieved from http://131.107.65.14/en-us/um/people/jiansun/papers/PopupLightField_TOG.pdf on Feb. 5.
Stollberg et al., "The Gabor superlens as an alternative wafer-level camera approach inspired by superposition compound eyes of nocturnal insects", Optics Express, Aug. 31, 2009, vol. 17, No. 18, pp. 15747-15759.
Sun et al., "Image Super-Resolution Using Gradient Profile Prior", Source and date unknown, 8 pgs., (2008).
Takeda et al., "Super-resolution Without Explicit Subpixel Motion Estimation", IEEE Transaction on Image Processing, Sep. 2009, vol. 18, No. 9, pp. 1958-1975.
Tanida et al., "Color imaging with an integrated compound imaging system", Optics Express, Sep. 8, 2003, vol. 11, No. 18, pp. 2109-2117.
Tanida et al., "Thin observation module by bound optics (TOMBO): concept and experimental verification", Applied Optics, Apr. 10, 2001, vol. 40, No. 11, pp. 1806-1813.
Taylor, "Virtual camera movement: The way of the future?", merican Cinematographer 77, 9 (Sept.), 93-100 (1996).
Taylor, "Virtual camera movement: The way of the future?", American Cinematographer 77, 9 (Sept.), 93-100 (1996).
Vaish et al., "Reconstructing Occluded Surfaces Using Synthetic Apertures: Stereo, Focus and Robust Measures", Proceeding, CVPR '06 Proceedings of the 2006 IEEE Computer Society Conference on Computer Vision and Pattern Recognition—vol. 2, pp. 2331-2338.
Vaish et al., "Synthetic Aperture Focusing Using a Shear-Warp Factorization of the Viewing Transform", IEEE Workshop on A3DISS, CVPR, 2005, 8 pgs.
Vaish et al., "Using Plane + Parallax for Calibrating Dense Camera Arrays", IEEE Conference on Computer Vision and Pattern Recognition (CVPR), 2004, 8 pgs.
Veilleux, "CCD Gain Lab: The Theory", University of Marland, College Park-Observational Astronomy (ASTR 310), Oct. 19, 2006, pp. 1-5 (online], [retrieved on May 13, 2014]. Retrieved from the Internet <URL: http://www.astro.umd.edu/~veilleux/ASTR310/fall06/ccd_theory.pdf, Oct. 19, 2006, 1-5.
Vuong et al., "A New Auto Exposure and Auto White-Balance Algorithm to Detect High Dynamic Range Conditions Using CMOS Technology", Proceedings of the World Congress on Engineering and Computer Science 2008, WCECS 2008.
Wang, "Calculation of Image Position, Size and Orientation Using First Order Properties", 10 pgs. (2010).
Wetzstein et al., "Computational Plenoptic Imaging", Computer Graphics Forum, 2011, vol. 30, No. 8, pp. 2397-2426.
Wheeler et al., "Super-Resolution Image Synthesis Using Projections Onto Convex Sets in the Frequency Domain", Proc. SPIE, 2005, 5674, 12 pgs.
Wikipedia, "Polarizing Filter (Photography)", http://en.wikipedia.org/wiki/Polarizing_filter_(photography), 1 pg. (2012).
Wilburn, "High Performance Imaging Using Arrays of Inexpensive Cameras", Thesis of Bennett Wilburn, Dec. 2004, 128 pgs.
Wilburn et al., "High Performance Imaging Using Large Camera Arrays", ACM Transactions on Graphics, Jul. 2005, vol. 24, No. 3, pp. 765-776.
Wilburn et al., "High-Speed Videography Using a Dense Camera Array", Proceeding, CVPR'04 Proceedings of the 2004 IEEE Computer Society Conference on Computer Vision and Pattern Recognition, pp. 294-301.
Wilburn et al., "The Light Field Video Camera", Proceedings of Media Processors 2002, SPIE Electronic Imaging, 2002, 8 pgs.
Wippermann et al., "Design and fabrication of a chirped array of refractive ellipsoidal micro-lenses for an apposition eye camera objective", Proceedings of SPIE, Optical Design and Engineering II, Oct. 15, 2005, 59622C-1-59622C-11.
Yang et al., "A Real-Time Distributed Light Field Camera", Eurographics Workshop on Rendering (2002), pp. 1-10.
Yang et al., "Superresolution Using Preconditioned Conjugate Gradient Method", Source and date unknown, 8 pgs., (2002).
Zhang et al., "A Self-Reconfigurable Camera Array", Eurographics Symposium on Rendering, 2004, 12 pgs.
Zomet et al., "Robust Super-Resolution", IEEE, 2001, pp. 1-6.
International Search Report and Written Opinion for International Application PCT/US2014/028447, report completed Jun. 30, 2014, Mailed Jul. 21, 2014, 8 Pgs.
International Preliminary Report on Patentability for International Application PCT/US2013/039155, report completed Jul. 1, 2013, Mailed Nov. 13, 2014, 10 Pgs.
Extended European Search Report for European Application EP12804266.0, Report Completed Jan. 27, 2015, Mailed Feb. 3, 2015, 6 Pgs.
International Preliminary Report on Patentability for International Application PCT/US2013/048772, Report completed Dec. 31, 2014, Mailed Jan. 8, 2015, 8 Pgs.
US 8,965,058, 02/2015, Venkataraman et al. (withdrawn)

* cited by examiner

| Surf. type | Comment | Radius | Thickness | Glass | Semi-Diameter | Conic | Par 0 (unused) | 2nd Order Term | 4th Order Term | 6th Order Term | 8th Order Term | 10th Order Term | 12th Order Term | 14th Order Term |
|---|---|---|---|---|---|---|---|---|---|---|---|---|---|---|
| Obj | Standard | Infinity | 400.00 | | 213.425 | 0.000 | | | | | | | | |
| 1 | Even ASPH.. | 1.413 | 0.467 | 1.61,28.5 | 0.978 | 0.595 | | 0.000 | 0.000 | 0.090 | -0.213 | 0.227 | -0.099 | 0.000 |
| 2 | Standard | Infinity | 0.550 | 1.52,54.4 | 0.974 | 0.000 | | | | | | | | |
| 3 | Standard | Infinity | 4.976E-005 | 1.61,28.5 | 0.489 | 0.000 | | | | | | | | |
| 4 | Even ASPH.. | 0.586 | 0.280 | | 0.367 | 0.622 | | 0.000 | 0.000 | 16.676 | -271.697 | -5171.902 | -5171.902 | 0.000 |
| STO | Standard | Infinity | 0.720 | 1.52,54.4 | 0.291 | 0.000 | | | | | | | | |
| 6 | Standard | Infinity | 0.400 | 1.52,53.7 | 0.659 | 0.000 | | | | | | | | |
| 7 | Even ASPH.. | -0.675 | 1.774 | | 0.666 | -0.471 | | 0.000 | 0.000 | 0.223 | -1.621 | 4.259 | -3.817 | 0.000 |
| 8 | Standard | Infinity | 0.500 | 1.47,65.5 | 1.037 | 0.000 | | | | | | | | |
| 9 | Standard | Infinity | 6.000E-003 | | 1.108 | 0.000 | | | | | | | | |
| IMA | Standard | Infinity | | | 1.110 | 0.000 | | | | | | | | |

*FIG. 4B*

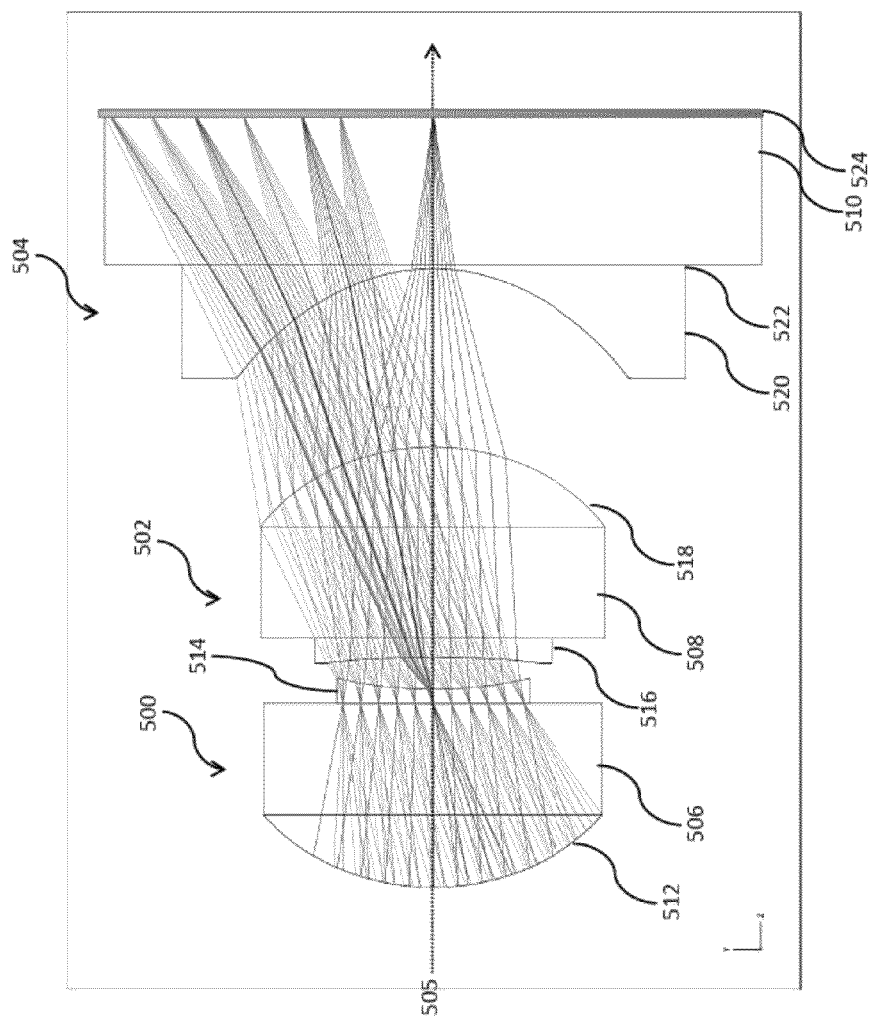
FIG. 5A1

| Surf type | Comment | Radius | Thickness | Glass | Semi-Diameter | Conic | Par 0 (unused) | 2nd Order Term | 4th Order Term | 6th Order Term | 8th Order Term | 10th Order Term |
|---|---|---|---|---|---|---|---|---|---|---|---|---|
| Obj | Standard | Infinity | 400.00 | | 213.425 | 0.000 | | | | | | |
| 1 | Standard | Infinity | 1.000 | | 1.327 | 0.000 | | | | | | |
| 2 | Even ASPH.. | 0.959 | 0.277 | 1.52,53.7 | 0.650 | 0.400 | | 0.000 | 0.000 | -0.081 | 0.219 | 0.000 |
| 3 | Standard | Infinity | 0.424 | 1.52,54.4 | 0.650 | 0.000 | | | | | | |
| STO | Standard | Infinity | 0.056 | 1.61,28.5 | 0.348 | 0.000 | | | | | | |
| 5 | Even ASPH.. | 2.068 | 0.120 | | 0.369 | 19.720 | | 0.000 | 0.000 | 0.533 | -5.047 | 0.000 |
| 6 | Even ASPH.. | -5.397 | 0.073 | 1.61,28.5 | 0.409 | 134.623 | | 0.000 | 0.000 | -1.622 | 7.681 | 0.000 |
| 7 | Standard | Infinity | 0.424 | 1.52,54.4 | 0.452 | 0.000 | | | | | | |
| 8 | Standard | Infinity | 0.304 | 1.52,53.7 | 0.661 | 0.000 | | | | | | |
| 9 | Even ASPH.. | -0.940 | 0.680 | | 0.661 | 0.472 | | 0.000 | 0.000 | 0.068 | -0.144 | 0.000 |
| 10 | Even ASPH.. | -0.765 | 0.014 | 1.52,53.7 | 0.752 | -0.624 | | 0.000 | 0.000 | 0.035 | -0.137 | 0.000 |
| 11 | Standard | Infinity | 0.566 | 1.47,66.7 | 0.963 | 0.000 | | | | | | |
| 12 | Standard | Infinity | 0.014 | 1.47,66.7 | 1.251 | 0.000 | | | | | | |
| IMA | Standard | Infinity | - | 1.47,66.7 | 1.258 | 0.000 | | | | | | |

*FIG. 5A2*

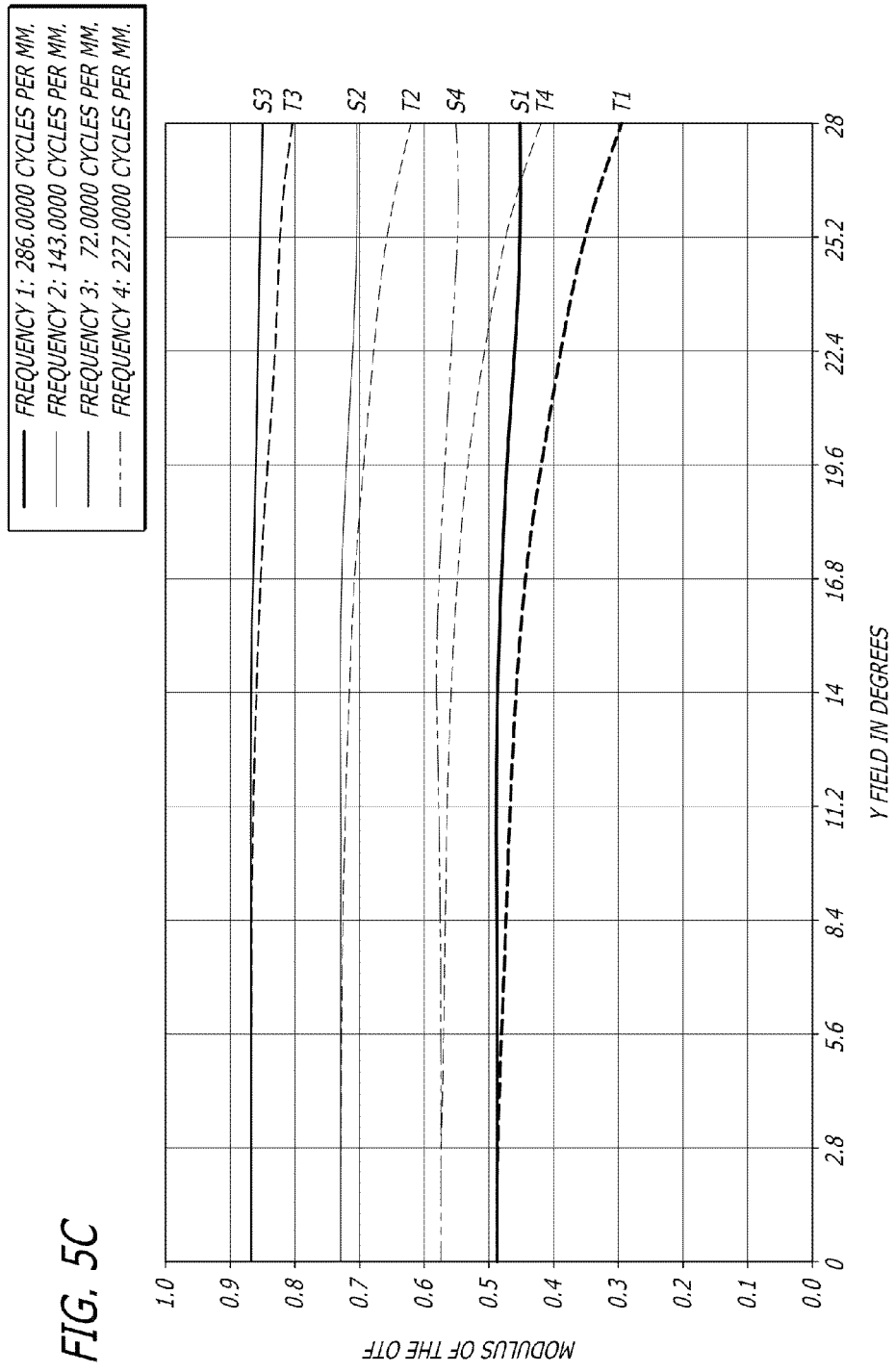

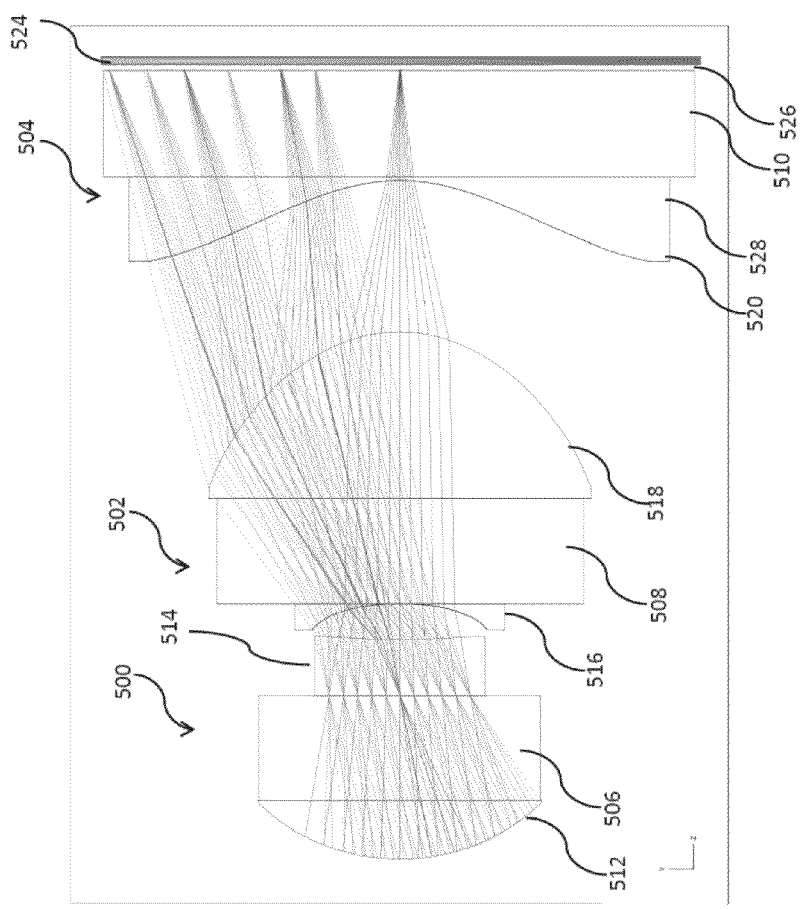
FIG. 5I1

FIG. 5I2

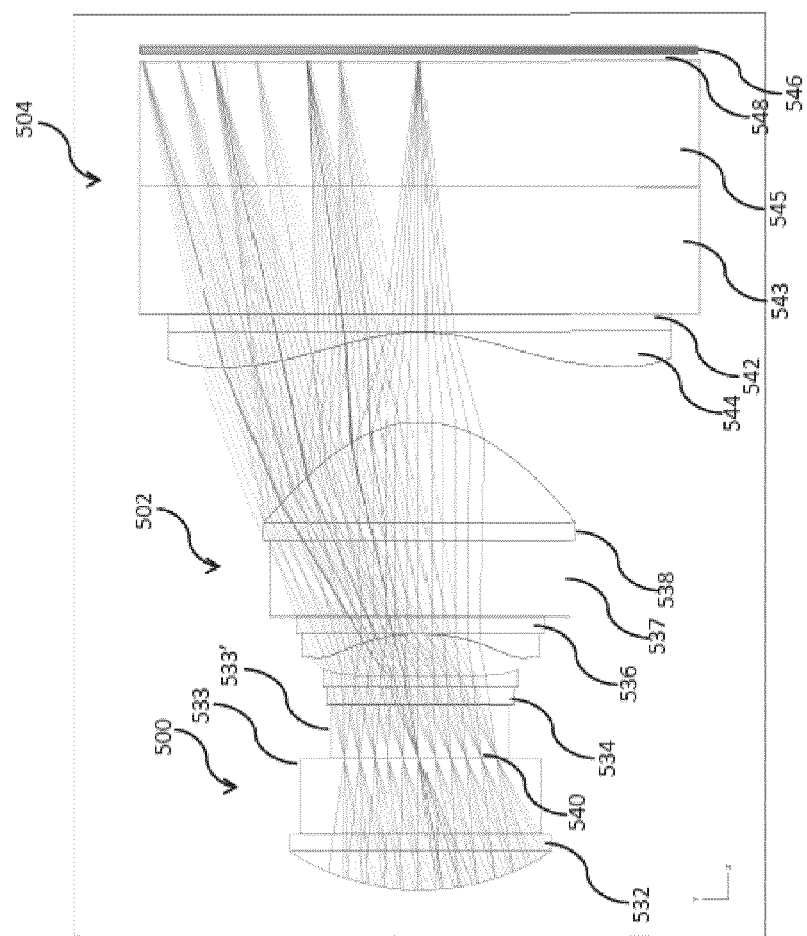
FIG. 5J1

FIG. 5J2

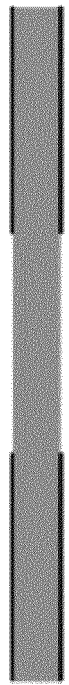 FIG. 6D1
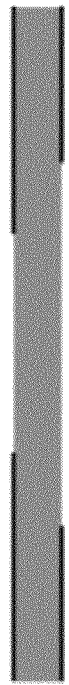 FIG. 6D2
 FIG. 6D3
 FIG. 6D4
 FIG. 6D5
 FIG. 6D6

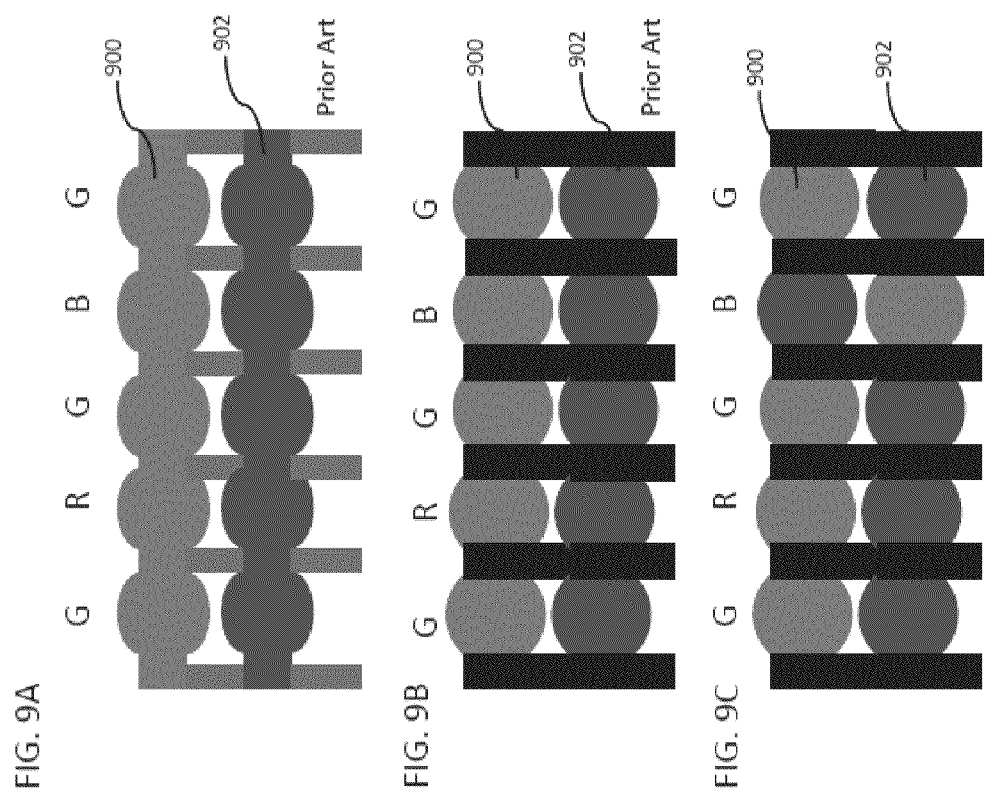

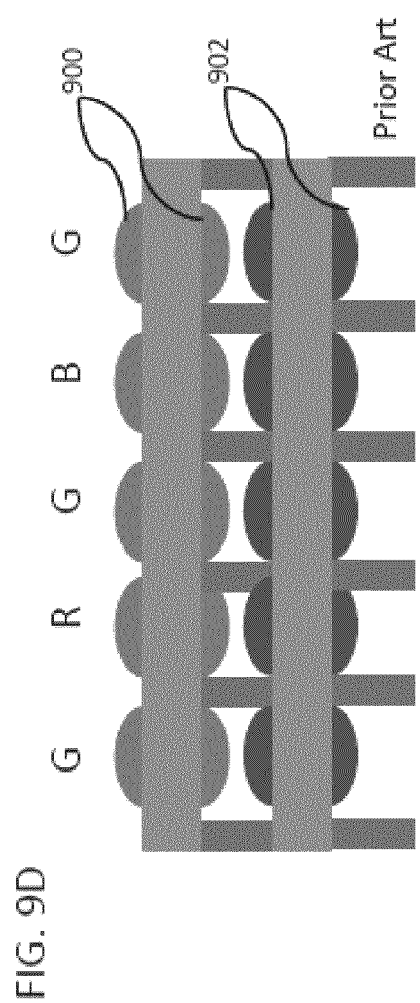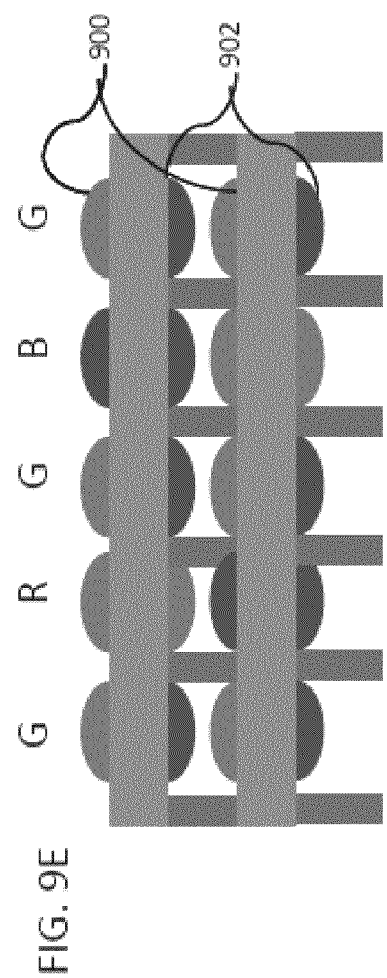
FIG. 9D
FIG. 9E

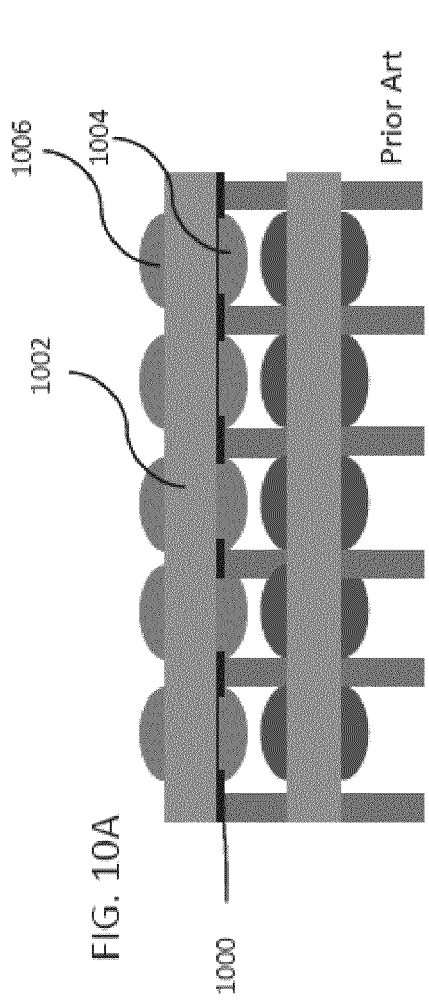
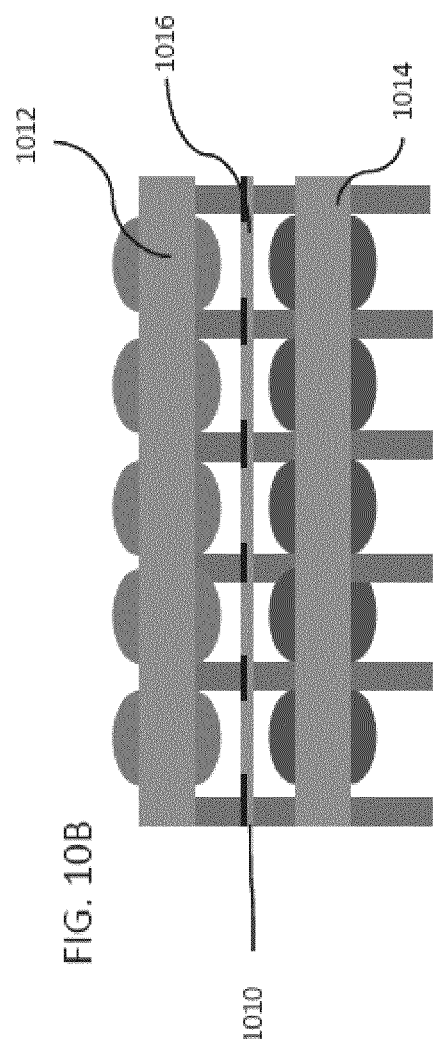
FIG. 10A (Prior Art)
FIG. 10B

OPTICAL ARRANGEMENTS FOR USE WITH AN ARRAY CAMERA

RELATED APPLICATION

This application is a divisional application of U.S. patent application Ser. No. 13/536,520 filed Jun. 28, 2012, which application claimed priority to U.S. Provisional Application No. 61/502,158 filed Jun. 28, 2011, the disclosure of which is incorporated herein by reference.

FIELD OF THE INVENTION

The present invention is related to novel optical arrangements, designs and elements for use in an array camera, and more specifically to optical arrangements of varying configurations capable of being used with arrays of image sensors.

BACKGROUND OF THE INVENTION

Image sensors are used in cameras and other imaging devices to capture images. In a typical imaging device, light enters at one end of the imaging device and is directed to an image sensor by an optical element such as a lens. In most imaging devices, one or more layers of optical elements are placed before and after the aperture stop to focus light onto the image sensor. Recently array cameras having many imagers and lenses have been developed. In most cases, multiple copies of the optical elements must be formed laterally for use in array cameras.

Conventionally, optical arrays can be formed by molding or embossing from a master lens array, or fabricated by standard lithographic or other means. However, the standard polymer-on-glass WLO and monolithic lens WLO manufacturing techniques have so far not been adapted for the specific high performance requirements of array cameras. In particular, some technical limitations of conventional WLO-processes need to be reduced, such as, for example, minimum substrate thickness requirements, inflexibility of where to place the aperture stop, accuracy, etc. The flexibility of such choices or processes needs to be increased in order to meet the high demands by array cameras otherwise such WLO techniques cannot be used to manufacture array cameras. Accordingly, a need exists for fabrication processes capable of accurately forming these arrays and for optical arrangements that give an increased flexibility in manufacturing so that the image processing software of these new types of array-type cameras can take advantage to deliver superior image quality at the system level.

SUMMARY

The current invention is directed to optical arrangements for use with an array camera.

In one embodiment, the invention is directed to a three-surface optical arrangement for an array camera. In such an embodiment, the optical arrangement includes:
  a first lens element having a first convex proximal surface and a first concave distal surface, where the diameter of the first convex surface is larger than the diameter of the first concave surface,
  a second lens element having a substantially flat second proximal surface and a second convex distal surface, where the diameter of the flat second proximal surface is smaller than the diameter of the second convex surface, and where the diameter of the second convex surface is intermediate between the diameters of the first convex surface and the first concave surface; and
  wherein the first and second lens elements are arranged sequentially in optical alignment with an imager positioned at the distal end thereof.

In one embodiment of the three-surface optical arrangement, the surfaces of the first element are separated by a first substrate, and the surfaces of the second element are separated by a second substrate. In another such embodiment, the flat second proximal surface is formed by the second substrate. In still another such embodiment, an aperture stop is disposed on the flat second proximal surface. In yet another such embodiment, at least one aperture is disposed on at least one of the first or second substrates. In still yet another such embodiment, an aperture structure is disposed between said first and second lens elements, comprising at least one aperture substrate having at least one aperture disposed thereon. In still yet another such embodiment, the first and second lens elements and the second lens element and the imager are separated by spacers. In still yet another such embodiment, a filter is disposed on at least one of the first or second substrates. In still yet another such embodiment, at least two of the surfaces of the lens elements are formed from materials having different Abbe-numbers. In still yet another such embodiment, the convex surfaces are formed from crown-like materials, and the concave surfaces are formed from flint-like materials.

In another embodiment of the three-surface optical arrangement, an array of such arrangements are described, where the array is designed to image a selected wavelength band, and where the profile of at least one of the lens surfaces within each optical arrangement is adapted to optimally image only a narrow-band portion of the selected wavelength band such that in combination the plurality of arrangements within the array image the entirety of the selected wavelength band.

In another embodiment, the invention is directed to a five-surface optical arrangement for an array camera. In such an embodiment, the optical arrangement includes:
  a first lens element having a first convex proximal surface and a first concave distal surface, where the diameter of the first convex surface is larger than the diameter of the first concave surface;
  a second lens element having a second concave proximal surface and a second convex distal surface, where the diameter of the second concave proximal surface is smaller than the diameter of the second convex surface;
  a third lens element having a third concave proximal surface and a third planar distal surface, where the diameter of the third concave proximal surface is larger than the diameters of any of the surfaces of the first and second lens elements; and
  where the first, second and thirds lens elements are arranged sequentially in optical alignment with an imager positioned at the distal end thereof.

In one such embodiment of the five-surface optical arrangement the surfaces of the first element are separated by a first substrate, and the surfaces of the second element are separated by a second substrate. In another such embodiment, the third planar distal surface is in contact with one of either the image sensor or a cover glass disposed over the image sensor. In still another such embodiment, an aperture stop is disposed on the first concave distal surface. In yet another such embodiment, an aperture stop is disposed on the first substrate adjacent to the first concave distal surface. In yet another such embodiment, at least one aperture is disposed within the first lens element. In still yet another such embodiment, an aperture structure is disposed between at least two of said lens elements, the aperture structure comprising at least one aperture substrate having at least one aperture disposed thereon. In still yet another such embodiment, the first and second lens elements, and the second and thirds lens elements are separated by spacers. In still yet another such embodiment, a filter is disposed within at least one of the first and second lens elements. In still yet another such embodiment, at least two of the surfaces of the lens elements are formed from materials having different Abbe-numbers. In still yet another such embodiment, the convex surfaces are formed from crown-like materials, and the concave surfaces are formed from flint-like materials. In still yet another such embodiment, an air-gap is positioned between the third lens element and the image sensor. In still yet another such embodiment, at least one substrate is disposed between the surfaces of at least one of the lens elements. In still yet another such embodiment, a substrate is disposed between the third lens element and the imager. In still yet another such embodiment, at least one aperture is disposed on at least one substrate within the lens elements. In still yet another such embodiment, at least one aperture is embedded within the first lens element.

In another embodiment of the five-surface optical arrangement, a plurality of the five-surface optical arrangements is provided in an array. In such embodiment, the array is designed to image a selected wavelength band, and wherein the profile of at least one of the lens surfaces within each optical arrangement is adapted to optimally image only a narrow-band portion of the selected wavelength such that in combination the plurality of arrangements within the array image the entirety of the selected wavelength band.

In another embodiment, the invention is directed to a substrate embedded hybrid lens optical arrangement for an array camera. In such an embodiment, the optical arrangement includes:
    a substrate having proximal and distal sides;
    a first monolithic lens element having first proximal and distal surfaces disposed on the proximal side of the substrate;
    a second monolithic lens element having second proximal and distal surfaces disposed on the distal side of the substrate;
    at least one aperture disposed on said substrate in optical alignment with the first and second lens elements; and
    wherein the first and second lens elements are arranged sequentially in optical alignment with an imager positioned at the distal end thereof.

In another embodiment of the substrate embedded hybrid lens optical arrangement at least two axially aligned apertures are disposed on said substrate. In another such embodiment, the at least two axially aligned apertures are one of either the same or different sizes. In still another such embodiment, at least one coating is disposed on said substrate in optical alignment with said at least one aperture. In yet another such embodiment, the at least one coating is selected from the group consisting of a polarization filter, a color filter, an IRCF filter, and a NIR-pass filter. In still yet another such embodiment, the substrate is formed from a material that acts as a filter selected from the group consisting of a polarization filter, a color filter, an IRCF filter, and a NIR-pass filter. In still yet another such embodiment, the substrate further comprises an adaptive optical element. In still yet another such embodiment, at least two of the lens elements are formed from materials having different Abbe-numbers.

In still another embodiment of the substrate embedded hybrid lens optical arrangement, such an arrangement is part of a wafer stack comprising a plurality of the substrate embedded hybrid lens optical arrangements including:
    a plurality of wafer surfaces formed from the elements of the arrangements; and
    at least two alignment marks formed in relation to each wafer surface, each of said alignment marks being cooperative with an alignment mark on an adjacent wafer surface such that said alignment marks when cooperatively aligned aide in the lateral and rotational alignment of the lens surfaces with the corresponding apertures.

In yet another embodiment of the substrate embedded hybrid lens optical arrangement, the arrangement is part of an array comprising a plurality of the substrate embedded hybrid lens optical arrangements, where the array is designed to image a selected wavelength band, and wherein the profile of at least one of the lens surfaces within each optical arrangement is adapted to optimally image only a narrow-band portion of the selected wavelength such that in combination the plurality of arrangements within the array image the entirety of the selected wavelength band.

In still another embodiment, the invention is directed to a monolithic lens optical arrangement for an array camera. In such an embodiment, the optical arrangement includes:
    at least one lens element itself comprising:
        a first monolithic lens having first proximal and distal surfaces, where the first proximal surface of the first monolithic lens has one of either a concave or convex profile, and where the first distal surface of the first monolithic lens has a plano profile;
        at least one aperture disposed on the first distal surface of the first monolithic lens and in optical alignment therewith;
        a second monolithic lens having second proximal and distal surfaces, where the second proximal surface of the second monolithic lens has a plano profile, and where the second distal surface of the second monolithic lens has one of either a concave or convex profile, and where the second monolithic lens is arranged in optical alignment with said aperture; and
        where the first monolithic lens element is in direct contact with the aperture and the second monolithic lens.

In another embodiment the monolithic optical arrangement includes at least one filter disposed on said plano surface in optical alignment with said at least one aperture. In still another such embodiment, the monolithic lenses are formed from materials having different Abbe-numbers. In yet another such embodiment, at least two lens elements are formed.

In still another embodiment the monolithic lens optical arrangement is part of an array comprising a plurality of the monolithic optical arrangements, where the array is designed to image a selected wavelength band, and wherein the profile of at least one of the lens surfaces within each optical arrangement is adapted to optimally image only a narrow-band portion of the selected wavelength such that in combination the plurality of arrangements within the array image the entirety of the selected wavelength band.

In yet another embodiment of the monolithic lens optical arrangement, such an arrangement is part of a wafer stack comprising:
    a plurality of wafer surfaces formed from the elements of the arrangements; and
    at least two alignment marks formed in relation to each wafer surface, each of the alignment marks being cooperative with an alignment mark on an adjacent wafer surface such that the alignment marks when cooperatively aligned aide in the lateral and rotational alignment of the lens surfaces with the corresponding apertures.

In yet another embodiment, the invention is directed to a three-element monolithic lens optical arrangement for an array camera. In such an embodiment, the optical arrangement includes:
- a first lens element having a first convex proximal surface and a first plano distal surface;
- a second lens element having a second concave proximal surface and a second convex distal surface;
- a third menisci lens element having a third concave proximal surface and a third convex distal surface;
- at least one aperture disposed on the first plano distal surface; and
- wherein the first, second and third lens elements are arranged sequentially in optical alignment with the aperture stop and an imager.

In another embodiment the three-element monolithic optical arrangement includes first and second lens elements that are formed from low dispersion materials and the third lens element is formed from a high dispersion material. In still another such embodiment, at least one filter is disposed on the first plano distal surface in optical alignment with the first lens element. In yet another such embodiment, the first lens element further comprises a substrate disposed on the distal surface thereof. In still yet another such embodiment, at least one aperture is disposed on the distal surface of said substrate. In still yet another such embodiment, at least one filter is disposed on the distal surface of said substrate. In still yet another such embodiment, the second lens element further comprises a substrate disposed between the proximal and distal surfaces thereof.

In still another embodiment the three-element monolithic lens optical arrangement is part of an array comprising a plurality of the three-element monolithic optical arrangements, where the array is designed to image a selected wavelength band, and wherein the profile of at least one of the lens surfaces within each optical arrangement is adapted to optimally image only a narrow-band portion of the selected wavelength such that in combination the plurality of arrangements within the array image the entirety of the selected wavelength band.

In still yet another embodiment, the invention is directed to a plurality of optical arrangements for an array camera including:
- a lens element array stack formed from a plurality of lens element arrays, each of the lens element arrays being in optical alignment with each other and a corresponding imager; and
- where each of the individual lens elements of each of the lens element stacks is formed from one of either a high or low Abbe number material, and where the sequence in which one of either a high or low Abbe number material is used in any individual lens element stack depends upon the spectral band being detected by the imager related thereto.

In still yet another embodiment, the invention is directed to a plurality of optical arrangements for an array camera including:
- a lens element array stack formed from a plurality of lens element arrays, each of said lens element arrays being formed of a plurality of lens elements;
- a plurality of structural features integrated into each of the lens element arrays;
- where the structural features ensure alignment of the lens element arrays in relation to each other within the lens element array stack in at least one dimension.

In one such embodiment of a plurality of optical arrangements the structural features are selected from the group consisting of lateral and rotational alignment features, spacers and stand-offs.

In still yet another embodiment, the invention is directed to a method of compensation for systematic fabrication errors in an array having a plurality of optical channels comprising:
- preparing a design incorporating a nominal shape of one of either a waveplate or a multilevel diffractive phase element used for only channel-wise color aberration correction of the optical channels of the array;
- fabricating an array lens module based on the design;
- experimentally determining the systematic deviation of the lens module from the design based on at least one parameter selected from the group consisting of lens metrologies, centering, distance and optical performance;
- redesigning only the channel-wise color aberration correcting surfaces of the lens module based on the results of the experiment;
- refabricating the lens module based on the redesign; and
- compensating for any of the systematic deviations remaining using a back focal length of the lens module.

In still yet another embodiment, the invention is directed to an optical arrangement comprising a plurality of optical channels, each optical channel including at least one optical element, comprising at least two optical surfaces, wherein one of the optical surfaces of each of the plurality of optical channels is a channel specific surface having a wavefront deformation sufficient solely to adapt the optical channel to a selected waveband of light. In one such embodiment, the channel specific surface is selected from the group consisting of waveplates, kinoforms, and radial symmetric multilevel diffractive phase elements.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

BRIEF DESCRIPTION OF DRAWINGS

These and other features and advantages of the present invention will be better understood by reference to the following detailed description when considered in conjunction with the accompanying data and figures, wherein:

FIG. 4B is a table of exemplary lenses in accordance with one embodiment of the optical arrangement of FIG. 4A.

FIG. 5A1 is a schematic of a five surface three-lens optical arrangement according to one embodiment of the invention.

FIG. 5A2 is a table of exemplary lenses in accordance with one embodiment of the optical arrangement of FIG. 5A1.

FIGS. 5B to 5H are data plots presenting characteristic performance indicators of the optical arrangement of FIG. 5A1.

FIG. 5I1 is a schematic of a five surface three-lens optical arrangement according to one embodiment of the invention.

FIG. 5I2 is a table of exemplary lenses in accordance with one embodiment of the optical arrangement of FIG. 5I1.

FIG. 5J1 is a schematic of a five surface three-lens optical arrangement according to one embodiment of the invention.

FIG. 5J2 is a table of exemplary lenses in accordance with one embodiment of the optical arrangement of FIG. 5J1.

FIGS. 6D1 to 6D6 are schematics of monolithic optical arrangements according to various embodiments of the invention.

FIGS. 9A and 9B are schematics of conventional injection molded optical arrangement formed of two materials.

FIG. 9C is a schematic of an injection molded optical arrangement formed of two materials according to one embodiment of the invention.

FIG. 9D is a schematic of a conventional polymer on glass wafer level optical arrangement formed of two materials.

FIG. 9E is a schematic of a polymer on glass wafer level optical arrangement formed of two materials according to one embodiment of the invention.

FIG. 10A is a schematic of a conventional polymer on glass wafer level optical arrangement having an integrated aperture stop.

FIG. 10B is a schematic of a polymer on glass wafer level optical arrangement having an integrated aperture stop according to one embodiment of the invention.

DETAILED DESCRIPTION

The current invention relates to novel optical arrangements for use in an array camera that captures images using a distributed approach using a plurality of imagers of different imaging characteristics. Each imager of such a camera may be combined with separate optics with different filters and operate with different operating parameters (e.g., exposure time). As will be described, these distinct optical elements may be fabricated using any suitable technique, including, for example, injection molding, glass molding, polymer-on-glass wafer level optics (WLO), or monolithic-lens WLO technologies (polymer or glass).

DEFINITIONS

A sensor element or pixel refers to an individual light-sensing element in a camera array. The sensor element or pixel includes, among others, traditional CIS (CMOS Image Sensor), CCD (charge-coupled device), high dynamic range pixel, multispectral pixel and various alternatives thereof.

An imager refers to a two dimensional array of pixels. The sensor elements of each imager have similar physical properties and receive light through the same optical component. Further, the sensor elements in the each imager may be associated with the same color filter.

An imager array refers to a collection of imagers designed to function as a unitary component. The imager array may be fabricated on a single chip for mounting or installing in various devices.

A lens stack refers to an axial arrangement of several optical components/lens elements.

An optical channel refers to the combination of a lens stack and an imager.

A lens array refers to a lateral arrangement of individual lens elements.

An optics or lens stack array refers to a lateral array of lens stacks, or an axial arrangement of multiple lens arrays.

A camera array refers to the combination of an optics array and an imager array, and can also be defined as an array of optical channels.

Image characteristics of an imager refer to any characteristics or parameters of the imager associated with capturing of images. The imaging characteristics may include, among others, the size of the imager, the type of pixels included in the imager, the shape of the imager, filters associated with the imager, the exposure time of the imager, aperture size of the optics associated with the imager, the configuration of the optical element associated with the imager, gain of the imager, the resolution of the imager, and operational timing of the imager.

The characteristics of the optics of a camera refer to at least the field of view (FOV), F-number (F/#), resolution (MTF), effective focal length or magnification, color or waveband, distortion, and relative illumination.

Structure of Camera Array

Figure 1:
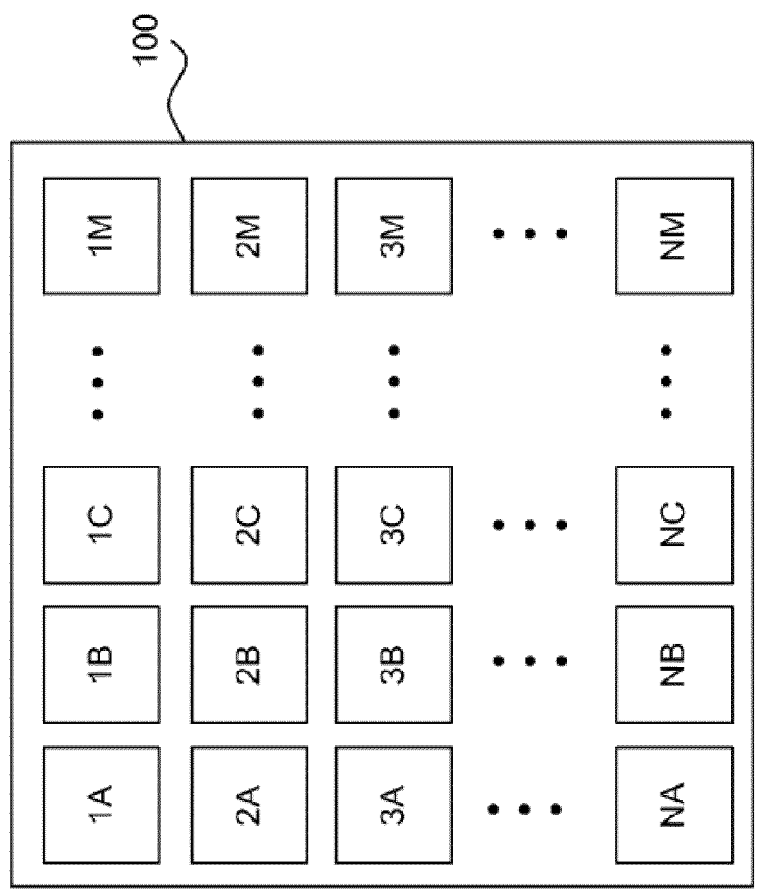
FIG. 1 is a plan view of a conventional camera array with a plurality of imagers.

FIG. 1 is a plan view of a generic camera array 100 with imagers 1A through NM. As shown, an imager array of the type shown is fabricated to include a plurality of imagers 1A through NM. In turn, each of the imagers 1A through NM may include a plurality of pixels (e.g., 0.32 Mega pixels). Although the imagers 1A through NM are arranged into a grid format as illustrated in FIG. 1, it should be understood that they may be arranged in any suitable configuration. For example, in other embodiments, the imagers may be arranged in a non-grid format, such as in a circular pattern, zigzagged pattern or scattered pattern.

Imager arrays of this design may include two or more types of heterogeneous imagers, each imager including two or more sensor elements or pixels. Each one of the imagers may have different imaging characteristics. Alternatively, there may be two or more different types of imagers where the same type of imagers shares the same imaging characteristics. For example, each imager 1A through NM may be associated with its own filter and/or optical element (e.g., lens). Specifically, each of the imagers 1A through NM or a group of imagers may be associated with spectral color filters to receive certain wavelengths of light. Example filters include a traditional filter used in the Bayer pattern (R, G, B), an IR-cut filter, a near-IR filter, a polarizing filter, and a custom filter to suit the needs of hyper-spectral imaging. In addition, some imagers may have no filter to allow reception of both the entire visible spectra and near-IR, which increases the imager's signal-to-noise ratio. The number of distinct filters may be as large as the number of imagers in the camera array.

It will be understood that such imager arrays may include other related circuitry. The other circuitry may include, among others, circuitry to control imaging parameters and sensors to sense physical parameters. The control circuitry may control imaging parameters such as exposure times, gain, and black level offset. The sensor may include dark pixels to estimate dark current at the operating temperature. The dark current may be measured for on-the-fly compensation for any thermal creep that the substrate may suffer from.

These camera arrays may be designed as a drop-in replacement for existing camera image sensors used in cell phones and other mobile devices. For this purpose, the camera array may be designed to be physically compatible with conventional camera modules of approximately the same resolution although the achieved resolution of the camera array may exceed conventional image sensors in many photographic situations. Taking advantage of the increased performance, the camera array of the embodiment may include an imager with fewer pixels to obtain equal or better quality images compared to conventional image sensors. Alternatively, the size of the pixels in the imager may be reduced compared to pixels in conventional image sensors while achieving comparable results.

In one embodiment, the camera array including the imagers replaces a conventional image sensor of M megapixels. The camera array includes ☐ imagers, each sensor including pixels of ☐. Each imager in the camera array also has the same aspect ratio as the conventional image sensor being replaced.

Optics Integration

To provide lenses and other optical elements for these imagers, these types of camera arrays may employ any suitable optical technology. The following discussion will provide a general overview of conventional optical elements for use in camera arrays.

Figure 2:
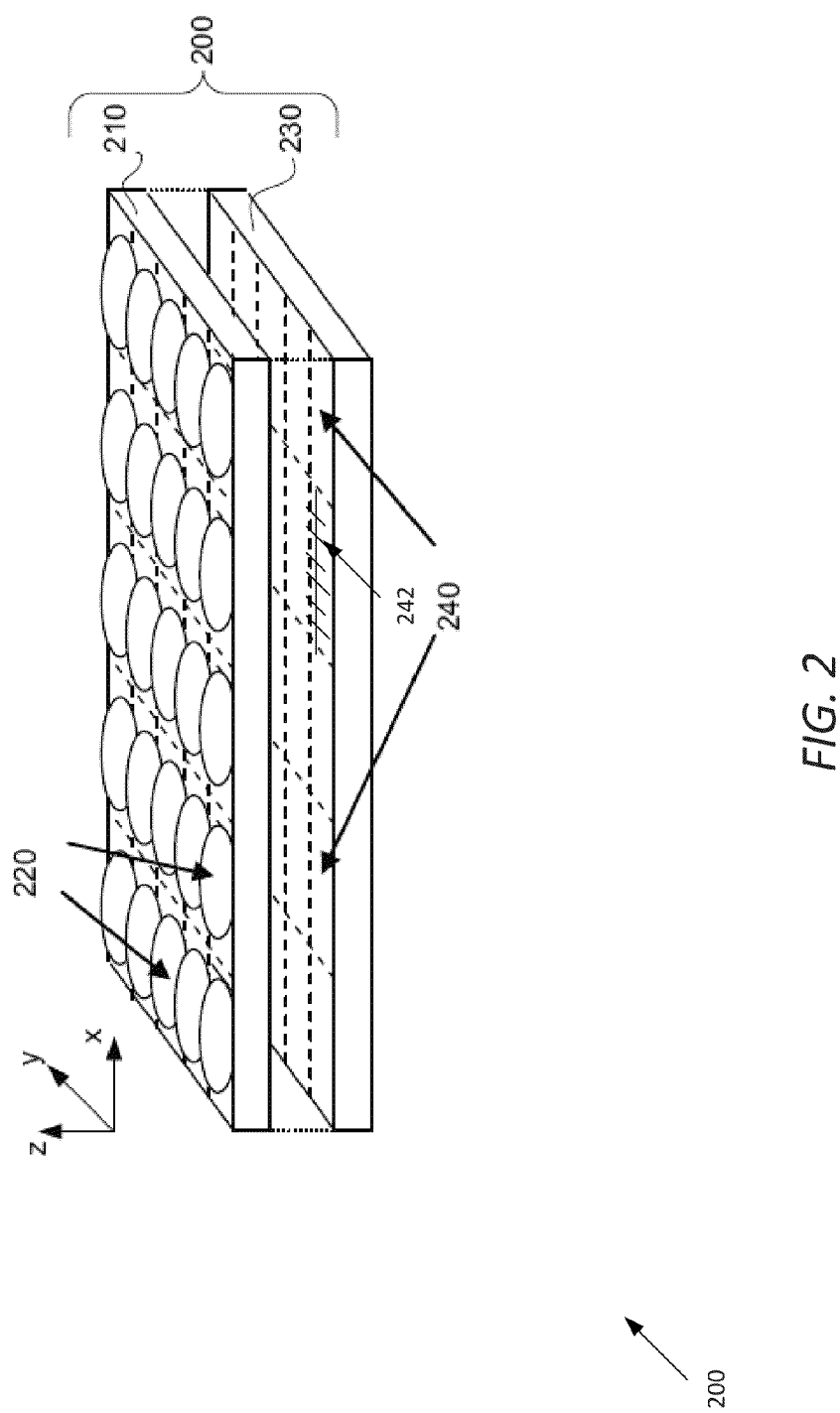
FIG. 2 is a perspective view of a conventional camera array with lens elements.

FIG. 2 is a perspective view of one such conventional array camera assembly 200 that incorporates such an optics array 210 with an imager array 230. As shown, the optics array 210 generally includes a plurality of lens stacks 220 (which furthermore may consist of several axially aligned lens elements), each lens stack 220 covering (in the shown example) one of twenty-five imagers 240 in the imager array 230.

Figure 3:
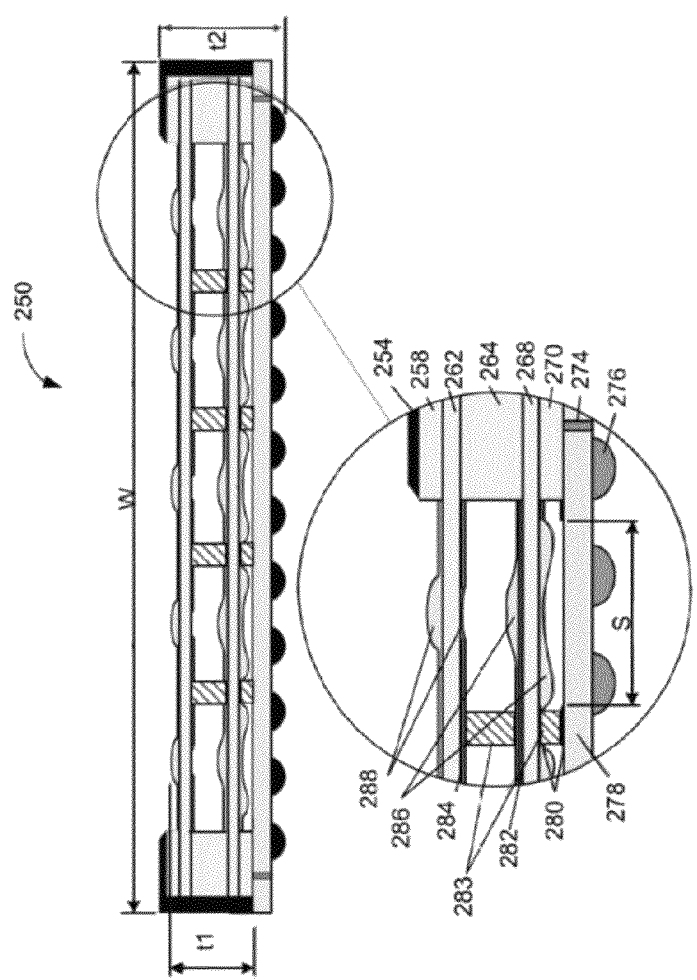
FIG. 3 is a cross-sectional view of a conventional camera array.

FIG. 3 is a sectional view of a camera array assembly 250. As shown, in such a design the camera assembly 250 would comprise an optics array including a top lens wafer 262 and a bottom lens wafer 268, and an imager array including a substrate 278 with multiple sensors and associated light sensing elements formed thereon. Spacers 258, 264 and 270 are also included to provide proper positioning to the various elements. In this embodiment the camera array assembly 250 is also packaged within an encapsulation 254. Finally, an optional top spacer 258 may be placed between the encapsulation 254 and the top lens wafer 262 of the imager array; however, it is not essential to the construction of the camera assembly 250. Within the imager array, individual lens elements 288 are formed on the top lens wafer 262. Although these lens elements 288 are shown as being identical in FIG. 3, it should be understood that within the same camera array different types, sizes, and shapes of elements may be used. Another set of lens elements 286 is formed on the bottom lens wafer 268. The combination of the lens elements on the top lens wafer and bottom lens wafer form the lens stacks 220 shown in FIG. 2.

In these types of camera arrays, through-silicon vias 274 may also provided to paths for transmitting signal from the imagers. The top lens wafer 262 may be partially coated with light blocking materials 284 (e.g., chromium, oxidized ("black") chromium, opaque photoresist) to block of light. In such embodiment, the portions of the top lens wafer 262 of the optics array not coated with the blocking materials 284 serve as apertures through which light passes to the bottom lens wafer 268 and the imager array. Although only a single aperture is shown in the embodiment provided in FIG. 3, it should be understood that, in these types of camera arrays, additional apertures may be formed from opaque layers disposed on any and all of the substrate faces in the camera assembly to improve stray light performance and reduced optical crosstalk. In the example shown in FIG. 3, filters 282 are formed on the bottom lens wafer 268 of the optics array. Light blocking materials 280 may also be coated on the bottom lens wafer 268 of the optics array to function as an optical isolator. A light blocking material 280 may also be coated on the substrate 278 of the imager array to protect the sensor electronics from incident radiation. Spacers 283 can also be placed between the bottom lens wafer 268 of the optics array and the substrate 278 of the imager array, and between the lens wafers 262 and 268 of the optics array. In such array cameras, each layer of spacers may be implemented using a single plate.

Although not illustrated in FIG. 3, many such camera arrays also include spacers between each optical channel located on top of the top lens wafer 262 of the optics array that are similar to, or implemented in single layer with, the spacer 258 shown at the edge of the lens stack array. As is discussed further below the spacers can be constructed from and/or coated in light blocking materials to isolate the optical channels formed by the wafer level optics. Suitable light blocking materials may include any opaque material, such as, for example, a metal material like Ti and Cr, or an oxide of these materials like black chromium (chrome and chrome oxide), or dark silicon, or a black particle filled photoresist like a black matrix polymer (PSK2000 from Brewer Science).

There are a number of advantages that can be realized by using smaller lens elements with these array cameras. First, the smaller lens elements occupy much less space compared to a single large lens covering the entire camera array 230. In addition, some of the natural consequences of using these smaller lens elements include, improved optical properties by reduced aberrations, in particular chromatic aberrations, reduced cost, reduced amount of materials needed, and the reduction in the manufacturing steps. A full discussion of these advantages may be found in U.S. Patent Publication No. US-2011-0080487-A1, the disclosure of which is incorporated herein by reference.

Although the above-description provides an overview of a basic design for an optical arrangement for use with an array camera, the current invention is directed to novel arrangements capable of enhanced properties. In short, because of the array approach itself, and the resultant relaxed total track length requirement (since the array camera by its nature is much shorter than a comparable classical objective), it is possible to adopt novel optical design approaches for the lens channels of an array camera rather than just using arrays of regular optical designs. These novel arrangements will be described in detail below, however, it should be understood that other optical arrangements that incorporate the improvements set forth herein may be used with the camera arrays described herein.

Embodiment 1

Three-Surface WLO Design

Traditional wafer level optics (WLO) is a technology where polymer lenses are molded on glass wafers, potentially on both sides, stacked with further such lens wafers by spacer wafers, and diced into lens modules (this is called "polymer on glass WLO") followed by packaging of the optics directly with the imager into a monolithic integrated module. As will be described in greater detail below, the WLO procedure may involve, among other procedures, using a wafer level mold to create the polymer lens elements on a glass substrate. Usually this involves incorporating apertures, and in particular the aperture stop by providing openings centered with the later lens channels in an otherwise opaque layer onto the substrate before lens molding.

Figure 4A:
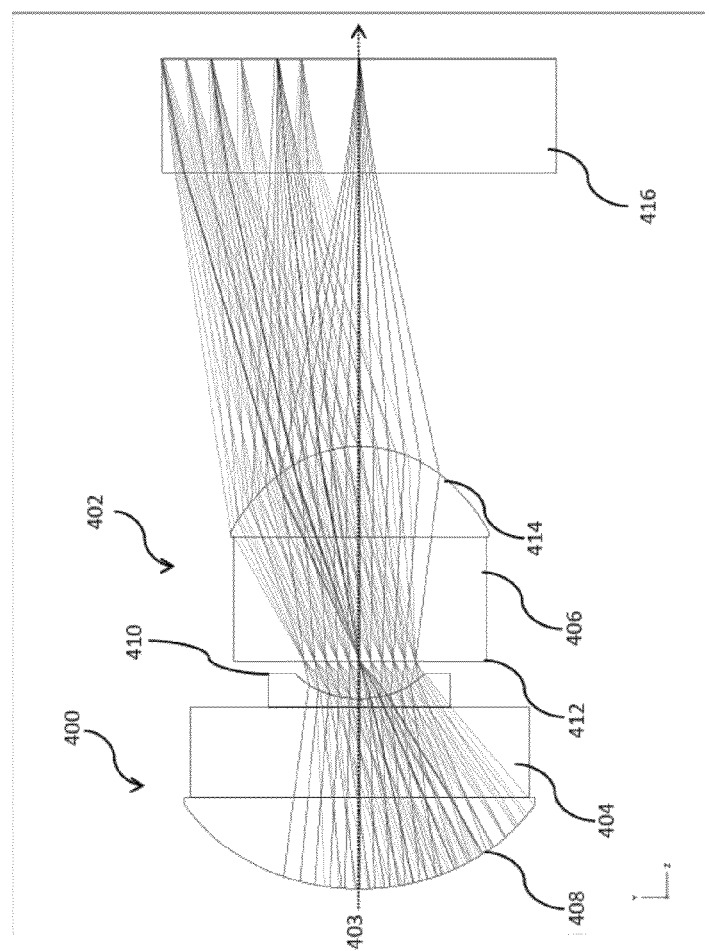
FIG. 4A is a schematic of a three surface two-lens optical arrangement according to one embodiment of the invention.

In a first embodiment, a three-surface optical arrangement suitable for the fabrication by wafer level optics technology, and, in particular, to be used for the optics (as one of the multiple channels) of an array camera is described in reference to FIG. 4A. More specifically, in a standard two-element lens, as shown in FIGS. 2 and 3, there are typically four lens surfaces (front and back for the top and the bottom lenses). In contrast, in this total-track-length-relaxed but MTF-performance optimized design, the third surface (first side of second element) has very low refractive power. As a result, it is possible to omit it from the design entirely. The result is a three surface design, which leads to a less expensive lens, due to less required process steps, and improved yield because of less contributors to the yield multiplication. In addition, since only lenses that have shapes which appear close to spherical- or parabolic profiles (monotonous profiles, no wings) are applied in a specific axial arrangement, centered around the aperture stop, only weak ray bending occurs at all the refractions on air-lens or lens-air interfaces. The result of this arrangement is a relaxed sensitivity with respect to centering-, thickness-, distance-, or lens shape form error tolerances. As shown in FIG. 4A, the rays for the different field heights more or less transmit perpendicularly, and are thus not strongly refracted through the lens surfaces. However, in such an arrangement it is very important to find an optimum position where the angle of incidence (AOI) on the glass substrate is minimal so that the shift of the band edges due to the AOI is minimized for any dielectric filter system (e.g. for IR cut-off), which is applied on substrates within the lens stack.

As shown FIG. 4A, the three-surface optical arrangement is identified by first 400 and second lens elements 402, which are arranged sequentially along a single optical path 403. It should be understood that for construction purposes, each lens element may optionally be associated with a corresponding supporting substrate 404 and 406, made from example of glass, upon which the polymer lens surfaces are formed. In addition, spacer elements (not shown) that can serve to mechanically connect the lens elements to each other and/or to the image sensor may also be included in the construction. Although any suitable material may be used, in one embodiment the lens surfaces are made from a (UV- or thermally curable) polymer.

Turning to the construction of the lens elements themselves, in the first lens element 400, there is a convex surface 408 of a first diameter on the first side of the first element and a concave surface 410 of a second diameter on the second side of the first element. Preferably the diameter of the first side is larger than the diameter of the second side of the first lens element. In the second element 402, there is a shallow or flat surface 412 on the first side of the second element, and a convex surface 414 on the second side of the second element. Preferably, the diameter of the first side of the second element is smaller than the diameter of the second surface of the second element, and that the diameter of the second side of the second element is intermediate between the diameters of the first and second sides of the first element. In addition, the system aperture or stop (not shown) is preferably disposed on the first side of the second element.

Although not shown in the diagram, a (thin) first spacing structure (not shown) is placed in between the two lens elements, which can be either incorporated into the respective lens surfaces ("stand-offs"), or can be an additional element. Likewise, a (thick) second spacing structure connecting the second side of the second lens element with the cover glass or package 416 of the image sensor 417 may also be provided. Both spacing structures are preferably opaque, or have opaque surfaces, at least at the inner side-walls, and provide partial optical isolation between adjacent optical channels. FIG. 4B provides a lens table for an exemplary embodiment of the three-surface optical arrangement in accordance with the current invention.

Although the basic construction of the three-side optical arrangement is described above, it should be understood that other features and structures may be incorporated into the lens elements to provide additional or enhanced functionality, including:

- The inclusion of additional apertures within the lens stack (in particular on the glass substrates underneath the polymer lenses).
- Channel specific filters, such as, for example, organic color filter arrays "CFA" and/or structured dielectric filters, such as, for example, IR cut-off, NIR-pass, interference color filters. These filters may be arranged within the stack of the first and the second lens element, preferably in a surface close to the system aperture.
- Partial achromatization of the individual narrow-spectral-band-channels may be accomplished by combining different Abbe-number materials for the different lens surfaces, such as, for example, "crown-like" materials for the two convex surfaces on the outsides of the optical arrangement, and "flint-like" materials for the potentially two (concave) surfaces on the inner sides of the two lens elements (as is further described in Embodiment 6, below).
- Optimization of different color channels to their specific narrow spectral band may be accomplished by adapting (at least) one lens surface profile within the optical arrangement to that color to correct for chromatic aberrations. (For a full discussion see, e.g., U.S. patent application Ser. No. 13/050,429, the disclosure of which is incorporated herein by reference.)

There are several features of this novel three-surface optical arrangement that render it particularly suitable for use in array cameras. First, the optical arrangement is designed in such a way that very high contrast at the image sensor's Nyquist spatial frequency is achieved, which at the same time (for gradual fall-off of contrast with increasing spatial frequency) provides sufficient contrast at 1.5× or 2× the sensor's Nyquist frequency to allow the super-resolution image information recovery to work effectively. Second, the optical arrangement is optimized for allowing a small lateral distance between adjacent optical channels in order to economically exploit the die real-estate area, consequently the lens diameters should be small, as should the wall-thickness of the (opaque) spacer structures. Third, optical channels within one array dedicated to imaging different "colors" (parts of the overall wavelength spectrum to be captured) may differ with regard to the particular surface profile of at least one lens surface. The differences in the surface profiles of those lenses in one array can be minor, but are very effective in keeping the back focal length ("BFL") color-independent, and consequently allowing (almost) equally sharp images for the different colors without the costly need for wide-spectral-band achromatization. Moreover, after computational color-fusion a high-resolution polychromatic image can be achieved. In particular, preferably the last surface in the lens stack (here—second surface of second element) is specifically optimized for the narrow spectral band of the respective color channel. Fourth, the above design approaches result in a (partial—as far it can be the case for the given non-symmetry between object- and image space) symmetry of the lens system around the aperture stop, which helps to reduce certain types of aberrations, including, distortion, coma and lateral color.

The benefits of this array-dedicated design of the single channels of the array camera include:

- The ability to provide high resolution with as few as two elements, and with only three surfaces of refractive power within the two elements,
- Increased simplicity of the lens shapes,
- Reduced fabrication tolerance sensitivity due to reduced ray bending.
- Low CRA, due to relaxed total track length requirement.
- Low color cross-talk, due to color filters differentiating the different optical channels rather than having a Bayer pattern on the pixel level performing this task.
- Low pixel cross-talk, due to the smaller pixel stack height.
- Reduced color inhomogeneity, due to the color filters being farther from the image plane.
- Low inter-channel cross-talk, because of the long back focal length, which allows a thick opaque second spacer compared to thin transparent substrate.
- Fewer monochromatic aberrations, as a result of the smaller lenses, because many of these aberrations scale with lens size $^2$-$^4$.
- Separate color channels that only need to be optimized for their respective spectral bands, resulting in higher overall polychromatic resolution while minimizing the achromatization requirements within the individual channels, again resulting in simpler overall aberration balancing or correction processes and simpler lenses, and/or better MTF, and/or lower F/#.
- Higher yield during manufacture, because the smaller lenses mean smaller sag (i.e., vertex height) of the lenses, which leads to less shrinkage and the ability to use less complex replication technology.

Embodiment 2

Five-Surface WLO Design

In a second embodiment, a five-surface optical arrangement suitable for the fabrication by wafer level optics technology, and, in particular, to be used for the optics (as one of the multiple channels) of an array camera is described in reference to FIGS. 5A to 5J. More specifically, this embodiment is directed to a five-surface high-resolution wafer level lens/objective having a field-flattening element close to the image plane. Again, in a standard two-element lens, as shown in FIGS. 2 and 3, there are typically four lens surfaces (front and back for the top and the bottom lenses). However, these optical arrangements are non-ideal for use in high resolution array cameras. Ideally, there would be a reduced requirement on small maximum CRA of the optics by the image sensor (allowing much larger angles of incidence on the same), for example, by using BSI or quantum film sensors (quantum film having the additional advantage of an increased fill factor not requiring microlenses, which otherwise require an air gap in front of the image sensor in order for the microlenses to provide refractive power). Finally, regular lens designs have stronger small total track length requirements, which would render the overall camera length shorter than necessary for an array camera, since the array camera is much shorter than a comparable classical objective by concept. In contrast, in this design five surfaces are used. The large number of degrees of freedom in the five-surface design allows for achromatization for the full visible spectral band (or other band of interest), so that channel-specific lens profiles are not necessarily required. However, even though the back focal length may be kept constant over the spectral band of interest, the effective focal length and with it the magnification may vary.

As shown in FIG. 5A, in one embodiment the five-surface optical arrangement is identified by first 500, second 502, and third 504 lens elements arranged sequentially along a single optical path 505. It should be understood that for construction purposes, each lens element may optionally be associated with a corresponding supporting substrate 506, 508 & 510, made from example of glass, upon which the polymer lens surfaces are formed. In addition, spacer elements (not shown) that can serve to mechanically connects the lens elements to each other and/or to the image sensor may also be included in the construction. Although any suitable material may be used, in one embodiment the lens surfaces, i.e., the volume between the surface of the lens and the underlying substrate, are made from a (UV- or thermally curable) polymer.

Turning to the construction of the lens elements themselves, the first lens element 500 has a convex surface 512 having a first diameter, and a concave surface 514 having a second diameter. Preferably the diameter of the convex surface is greater than the diameter of the concave surface on this lens element. The second lens element 502 has a concave surface 516 on the first side of the second lens element, and a convex surface 518 on the second side of the second element. In this second lens element, preferably the convex surface thereof is of a larger diameter when compared to the concave surface thereof. The third lens element 504 has a concave surface 520 on the first side of the third lens element, and a second planar side 522 that is adjoined to the substrate that serves as the image sensor cover 510. Typically, the diameter of the concave surface of the third lens element is larger than the diameters of any of the surfaces of the first and second lens elements.

In terms of arrangement, a first spacing structure (not shown) is disposed in between the first 500 and the second 502 lens elements. Likewise, a second spacing structure (not shown) is disposed in between the second 502 and the third 504 lens elements. Either of these spacers may be either incorporated (also split) into the respective lens surfaces ("stand-offs" in which the lenses then can be glued directly together), or can be an additional element. In addition, both of these spacing structures are preferably opaque (or have opaque surfaces, at least at the (inner) side-walls), and provide (partial) optical isolation between adjacent optical channels. The third lens element 504 is disposed comparatively close to the image surface 524, and the second side of the third lens element is preferably connected with the image sensor or image sensor cover glass by a transparent areal bond or a local bond (e.g. UV- and/or thermally curing adhesive), or even a (–n opaque) spacing structure with transparent openings as described above.

In summary, FIG. 5A1, discussed above, demonstrates a five-surface optical arrangement disposed on a large-sag field flattener on a regular-thickness image sensor cover glass. In particular, there is no air gap between the field flattener 504 (or its substrate, or the sensor cover glass, respectively) and the image sensor 524. In front of the field flattener is the actual focusing objective comprised of first 500 and second 502 lens elements, ideally containing two concave surfaces close to the system aperture more or less symmetrically surrounded by two convex surfaces. An exemplary lens table associated with this design is provided in FIG. 5A2.

Figure 5B:
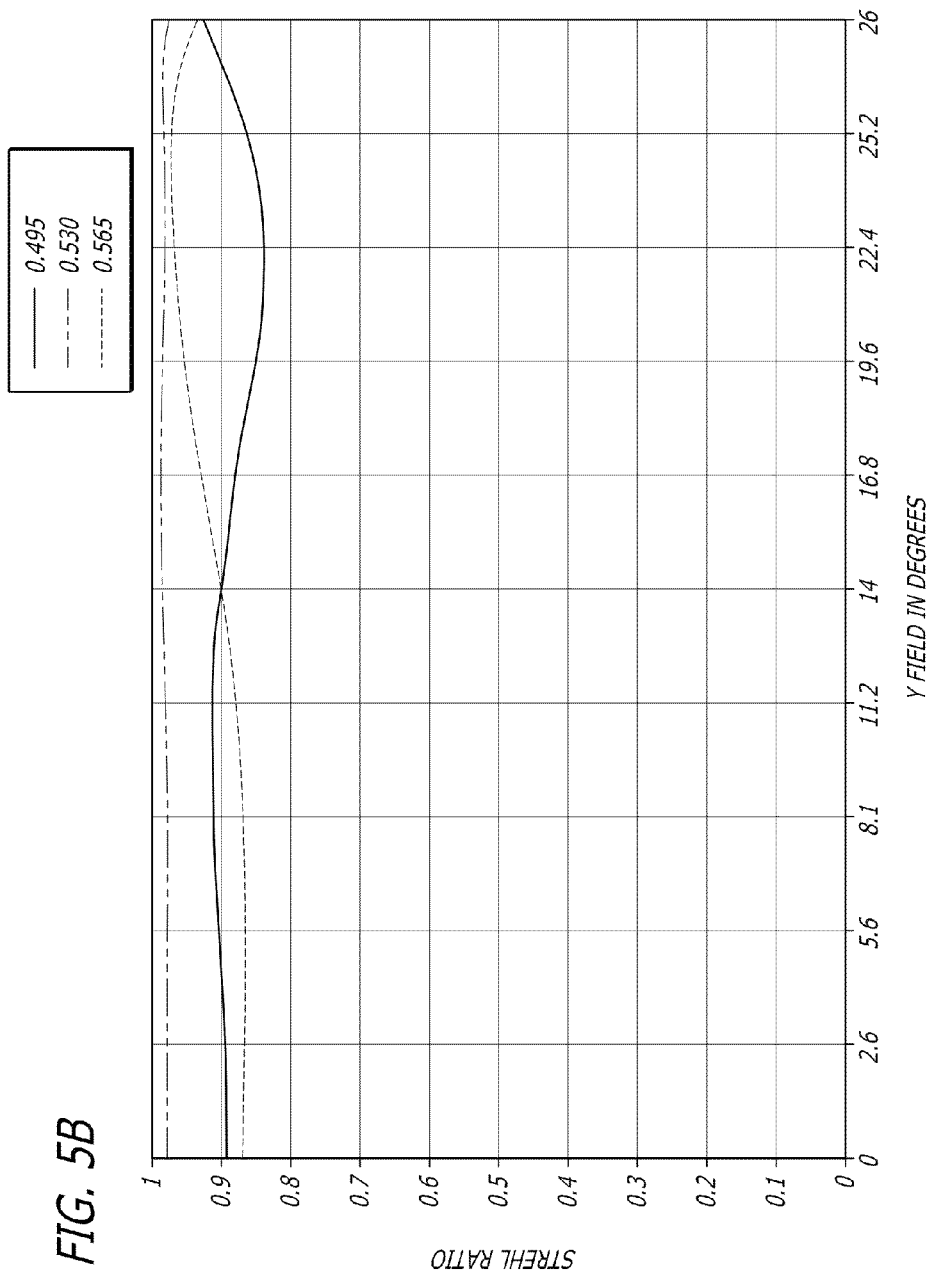
Figure 5D:
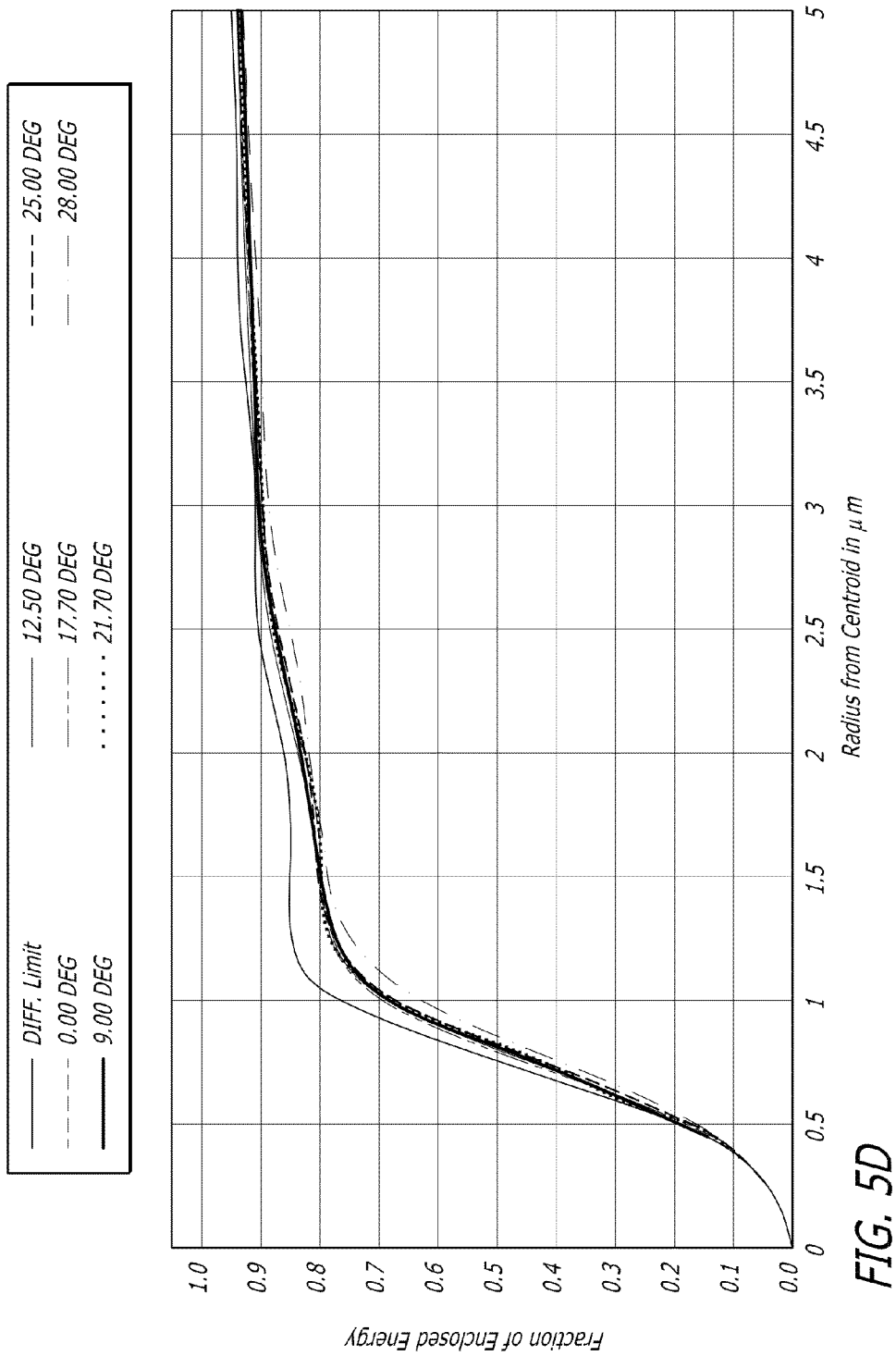
Figure 5E:
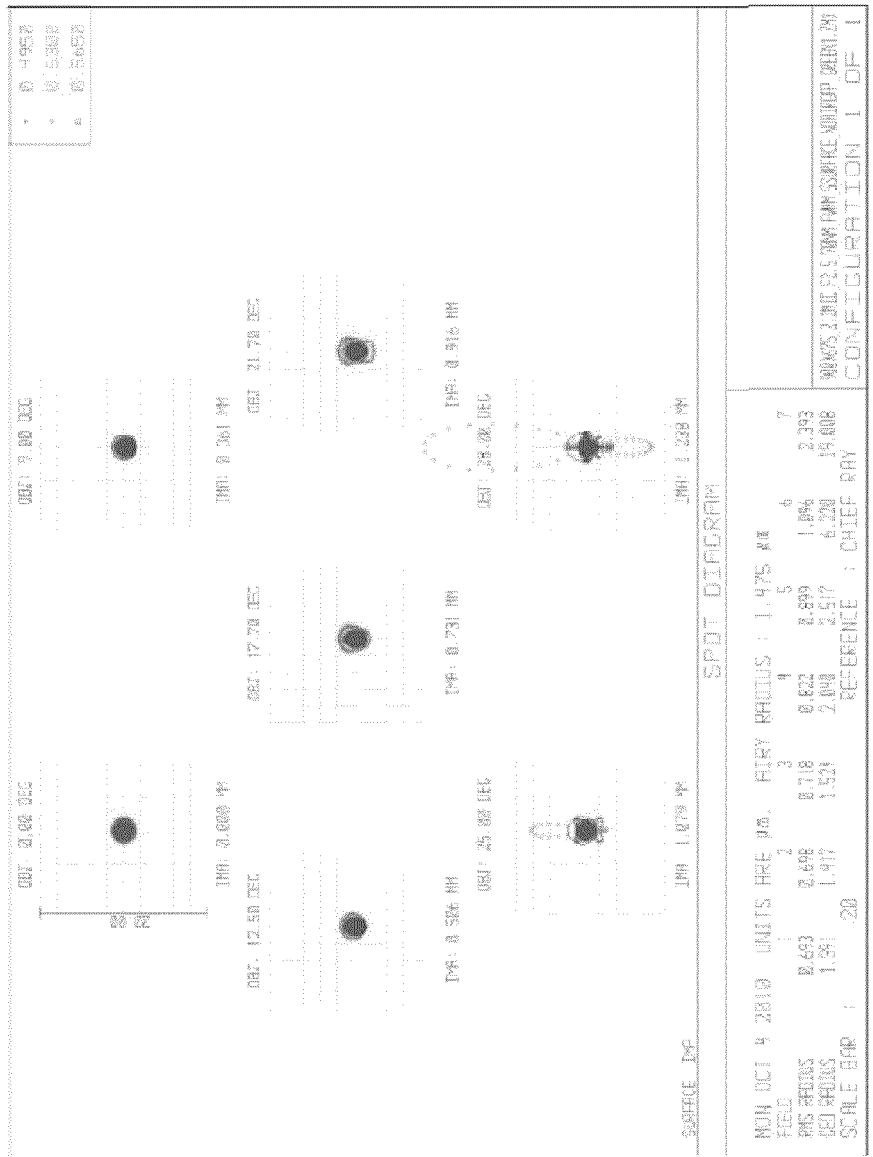
Figure 5F:
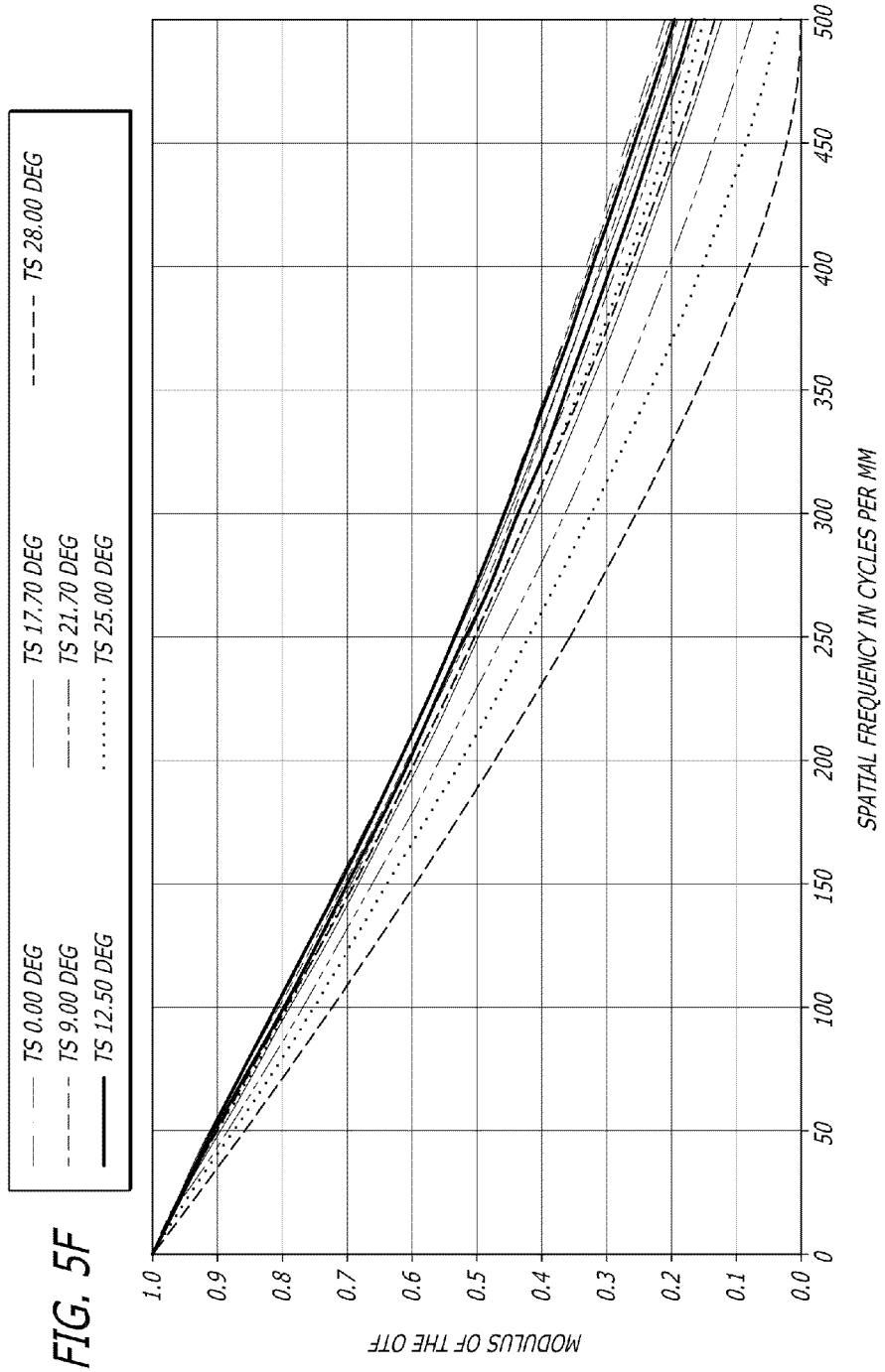
Figure 5G:
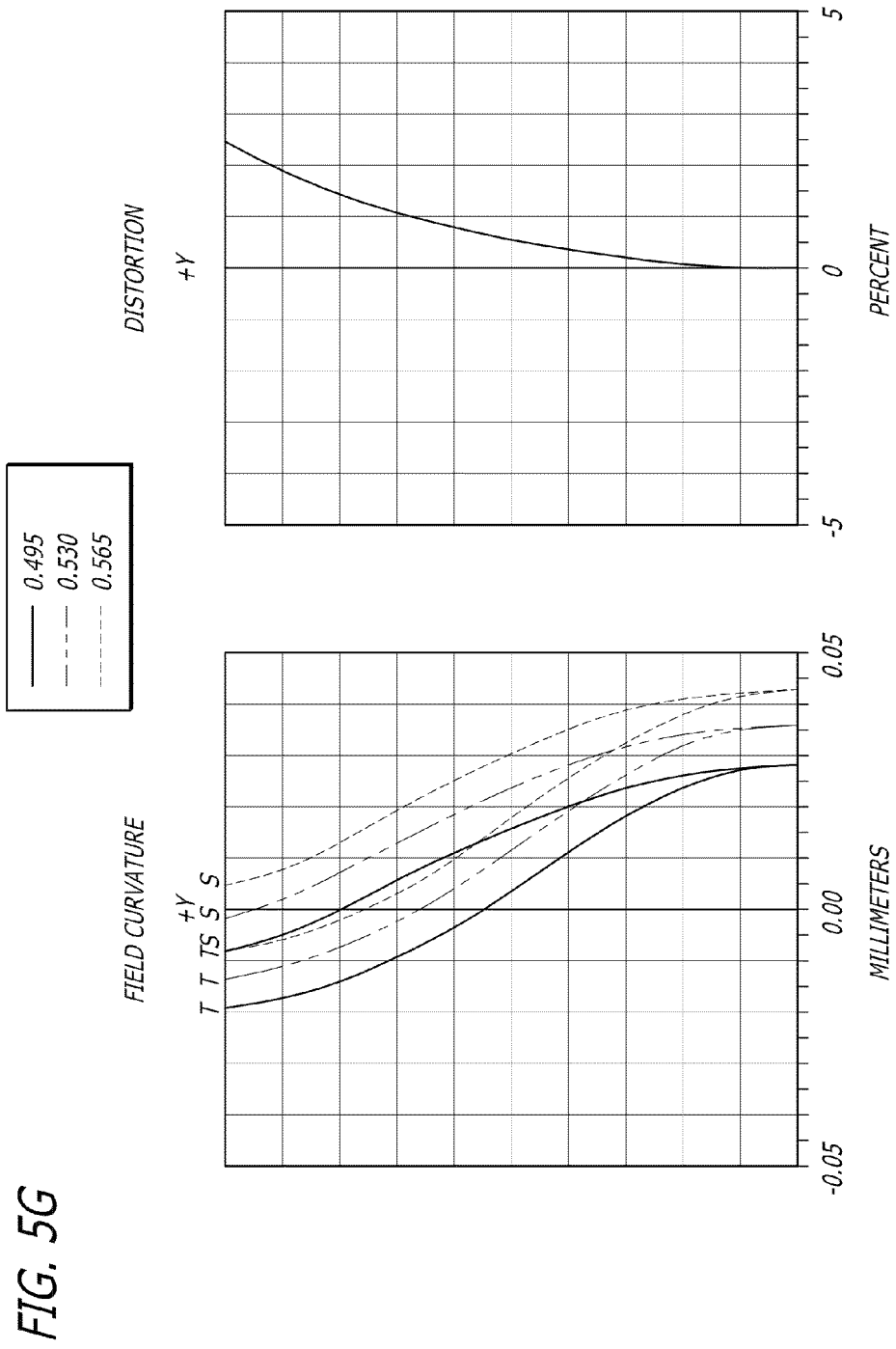
Figure 5H:
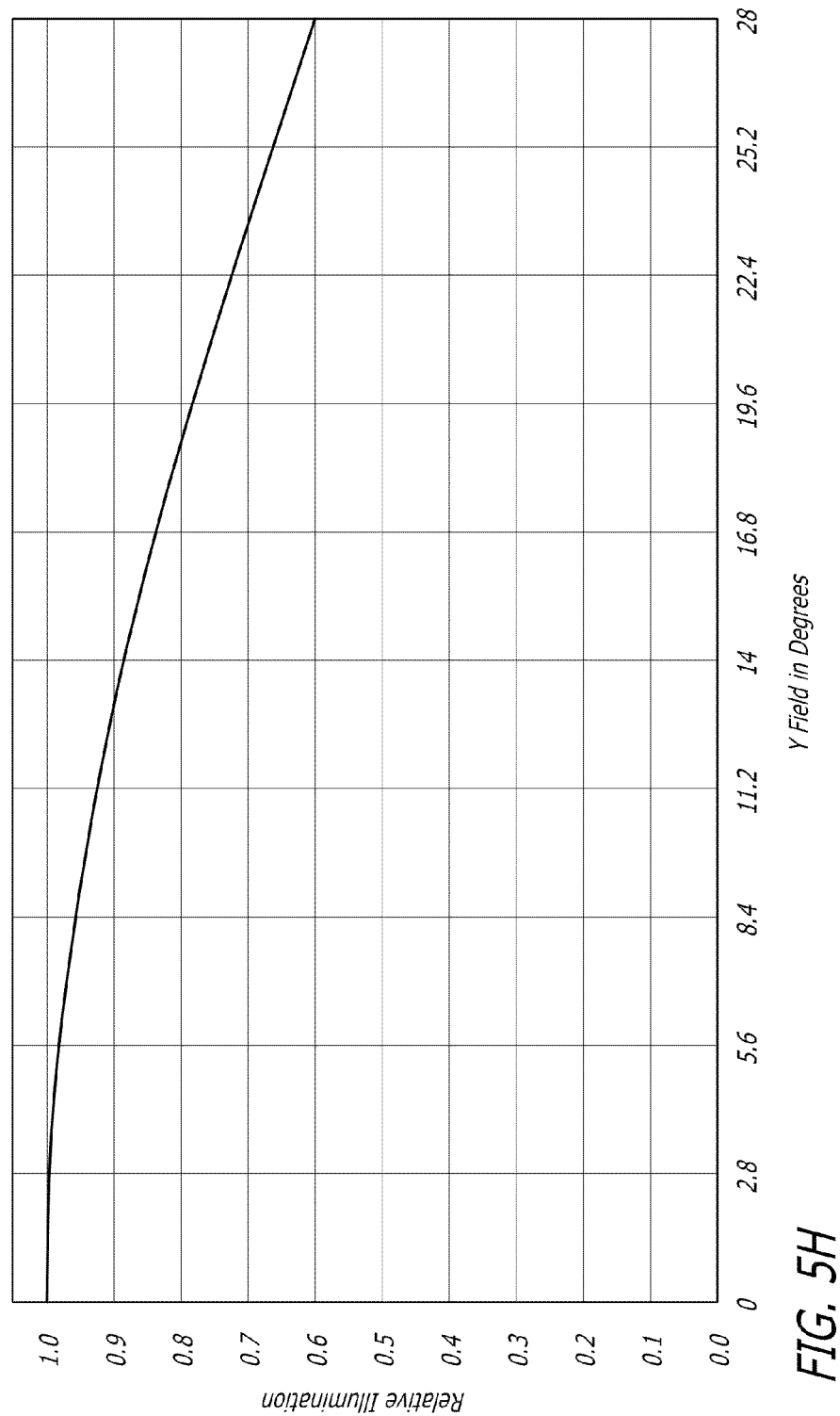

FIGS. 5B-H present some characteristic performance indicators of the five-surface optical arrangement shown in FIG. 5A1. In particular, FIG. 5B provides a data graph of the Strehl ratio showing that the lens is diffraction limited over the full field height (@ F/2.4 and diagonal full FOV of 56°). FIG. 5C provides a data graph showing that in a comparison of MTF vs. field there is virtually no loss of performance with increasing field height. FIG. 5D provides a data graph of the polychromatic diffraction encircled energy, and demonstrates that most of the focused light energy is within the Airy disk. FIG. 5E provides a spot diagram demonstrating that the lens almost appears to be isoplanatic where there is little change of spot size and shape with field height. FIG. 5F provides a data graph of MTF vs. spatial frequency, and shows that for small and intermediate field heights there is still 15-20% contrast even at 500 LP/mm. FIG. 5G provides data graphs showing that the lens design demonstrates acceptable and monotonous distortion. Finally, FIG. 5H provides a relative illumination plot, demonstrating that the optical arrangement shows the usual vignetting behavior.

These data results show that for this particular design family, due to the strong degree of achromatization, there is very little performance loss using the green channel for red and blue spectra. In other words, the system is already well achromatized for the full visible spectrum. Accordingly, there is not much benefit when optimizing the green and red channels specifically rather than just using the green one. Explicit full visible optimization is very promising as well, i.e., no differences between the channels are required. Furthermore, from these results it is possible to recognize that optimizing a lens for the full visible spectrum, but using only the red, green and blue bands separately will improve performance even beyond what is seen from the visible-polychromatic MTF, Strehl-ratio and Encircled energy plots. This is because fewer wavelengths contribute to each color channel's polychromatic blur. Moreover, this effect becomes more significant the more lateral color dominates the polychromatic blur over axial color, since then the difference between colors is mostly reflected in a difference of magnification or focal length as described above rather than different blur sizes. In short, the largest benefit of these features is that all channels could be the same, simplifying the array mastering considerably.

Although the above discussion has focused on an embodiment of a five-surface optical arrangement with no air gap between the field flattener and the imager, it should be understood that alternative embodiments incorporating air gaps may be made in accordance with this invention. These embodiments are advantageous because they may be combined with regular image sensors which can have fill factor enhancing microlenses and a limited maximum CRA of around 30°. For Example, FIGS. 5I1 and J1 provide diagrams of two such embodiments, which will be described below.

Figure 5I2:
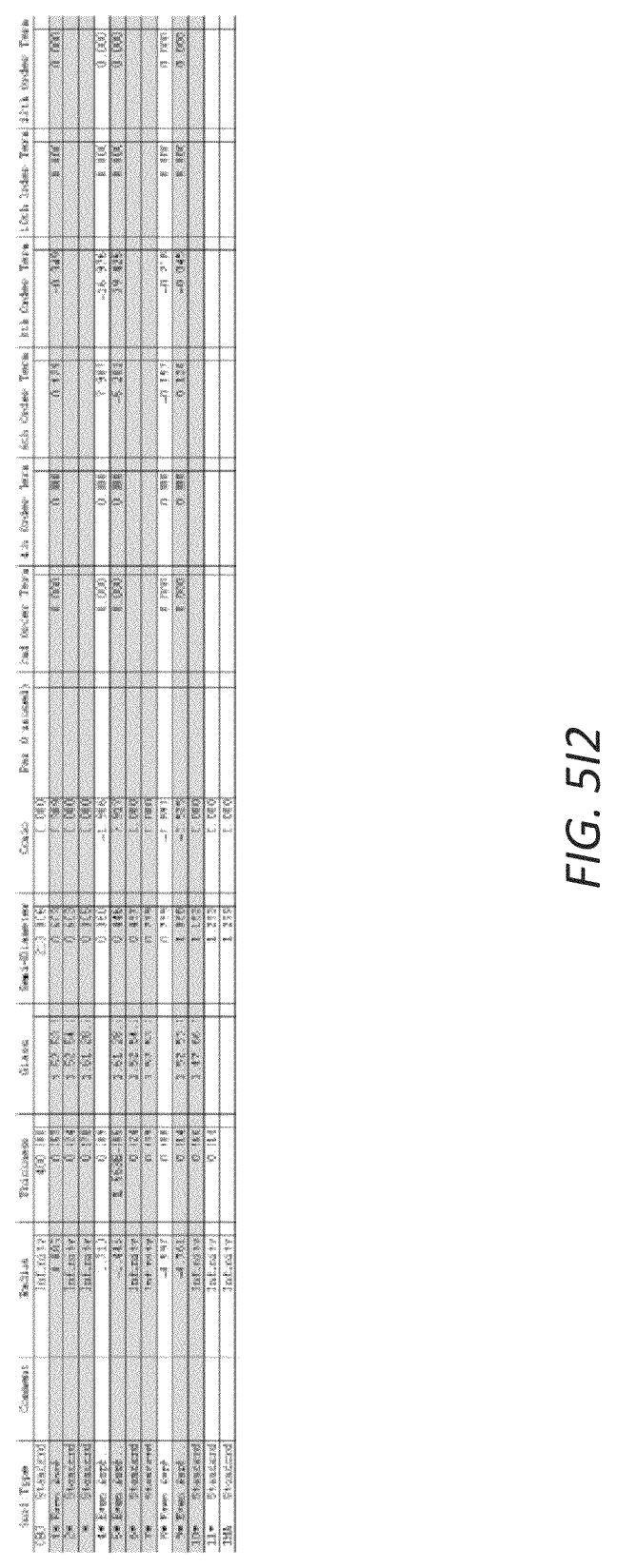

The embodiment shown in FIG. 5I1 is a five-surface optical arrangement that allows for an air gap 526 between the sensor cover glass 510 (on which the field flattener 528 is positioned) and the image sensor 524. This is usually required when fill factor enhancing plenses are applied on top of the image sensor 524. As a result of the presence of the air gap, the chief ray angle needs to be reduced over the embodiment shown in FIG. 5A1. Although there are no constraints made on lens vertex heights and minimum glass thicknesses, lens TTL increases and image performance reduces due to the requirement of a reduced maximum CRA. However, ray calculations indicate that even in this embodiment the CRA of the inventive optical arrangement meets regular sensor specifications (in the order of magnitude of 27-28° in air). An exemplary lens table associated with this design is provided in FIG. 5I2.

Figure 5J2:
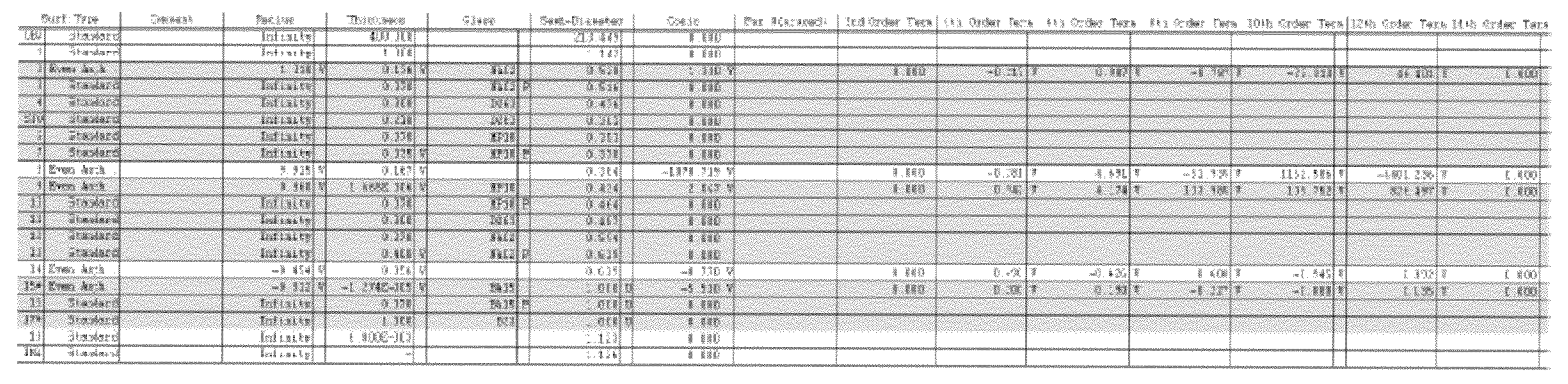

FIG. 5J1 provides a schematic of an embodiment of a five-surface optical arrangement optimized for best possible manufacturability. In particular, in this embodiment the lens sags are decreased, and lens material planar base layers 532, 534, 536, 538 and 542 having suitable thicknesses are provided. It should be understood that for construction purposes, each lens element may optionally be associated with a corresponding supporting substrate 533 & 533', 537 & 543 made from example of glass, upon which the polymer lens surfaces and base layers may be formed. In addition, spacer elements (not shown) that can serve to mechanically connect the lens elements to each other and/or to the image sensor may also be included in the construction.

In addition, the system aperture 540 is sandwiched (or "embedded") between two glass substrates 533 and 533' in order to decrease the necessary polymer thickness of the adjacent lens surfaces. Finally, a glass substrate 543 is provided between the field flattener lens surface 544 and the imager package, including the image sensor glass cover 545 and the image sensor 546 (with air gap 548). Although an even split of 50/50 is shown in FIG. 5J1, the thickness between the glass substrate 543 and the image sensor cover glass 545 may be shared by any reasonable ratio (which allows sufficient thickness for both). Cover glass as needed for the imager may also be provided. All of these elements may then be immersed and bonded together by a suitable adhesive during manufacture. Again, in this embodiment the CRA meets regular sensor specifications (in the order of magnitude of 27-28° in air). An exemplary lens table associated with this design is provided in FIG. 5J2.

Although the basic construction of the five-surface optical arrangement is described above, it should be understood that other features and structures may be incorporated into the lens elements to provide additional or enhanced functionality (references are to FIG. 5A1), including:

The system aperture (Stop) may be disposed either on the second side of the first element 500, or on the corresponding side of the respective glass substrate, or embedded within the first lens element 500 (e.g. sandwiched between two thinner glass substrates that have been structured with an aperture array on the inner side, then glued together). In such an embodiment, the lenses of the element would be replicated on this aperture sandwich.

As discussed above, other implementations of this general design may have either no air gap or a thin air gap between the third lens element 504 and the photosensitive surface (or interface thereto) of the image sensor 524. Such a design allows this optical arrangement to operate with regular image sensors, specifically those with fill factor-enhancing microlenses, and image sensors with conventional CRA. However, this results in longer TTL and only moderate image quality compared to versions without the discussed air gap. In particular, the CRA needs to be moderate when there is an air gap at this location, because otherwise there can be (partly) total internal reflection at the interface between the higher refractive index third lens element 504 and the air gap, or such a strong refraction outwards that strong aberrations occur, i.e., rays may be fanned out rather than focused.

Several additional apertures may also be disposed within the stack, and, in particular, on the glass substrates underneath the polymer lenses where applicable.

Channel specific filters may also be arranged within the stack of the first 500 and the second 502 lens element, preferably in a surface close to the system aperture. Such filters may include, for example, organic color filter array "CFA" and/or structured dielectric filters, such as, IR cut-off or NIR-pass interference color filters.

Partial achromatization of the individual narrow-spectral-band-channels may be accomplished by combining different Abbe-number materials for the different lens surfaces. Preferably "crown-like" materials would be used for the two convex surfaces on the outsides of the two first lens elements and "flint-like" materials for the two concave surfaces on the inner sides of the two first lens elements (See Embodiment 6).

Optimization of the different color channels to their specific narrow spectral band may also be accomplished by adapting at least one lens surface profile within the optical arrangement to that color to correct for chromatic aberrations. (For a full discussion see, e.g., U.S. patent application Ser. No. 13/050,429, the disclosure of which is incorporated herein by reference.)

There are several features of this novel five-surface optical arrangement that render it particularly suitable for use in array cameras. First, the optical arrangement is designed in such a way that very high contrast at the used image sensor's Nyquist spatial frequency is achieved, which at the same time (for gradual fall-off of contrast with increasing spatial frequency) provides sufficient contrast at 1.5× or 2× the sensor's Nyquist frequency to allow the super-resolution image information recovery to work effectively. Second, the optical arrangement is optimized for allowing a small lateral distance between adjacent optical channels in order to economically exploit the die real-estate area, consequently the lens diameters and the wall-thickness of (opaque) spacer structures may be reduced. However, for the field flattening structure itself this is sometimes difficult to achieve. The reason for this is that the proximity of this lens surface to the image sensor requires a lens having a diameter on the order of magnitude of the image circle (scaled by the distance between the two). In order to relax this requirement the field flattener can be designed and implemented in a non-rotational-symmetric way. This results in a rectangular rather than circular footprint of this lens surface. Thus the lens would have a large lateral extension along the corners (=image sensor diagonal), thereby allowing multiple lens surfaces within one array to be situated much closer together in x-y and thus allowing an overall smaller pitch between the channels. Third, optical channels within one array dedicated to imaging different "colors" (parts of the overall wavelength spectrum to be captured) may differ in the particular surface profile of at least one lens surface. The differences in the surface profiles of those lenses in one array can be minor, but are very effective in order to keep the back focal length ("BFL") color-independent, and consequently allow (almost) equally sharp images for the different colors without the costly need for wide-spectral-band achromatization. Moreover, after computational color-fusion a high-resolution polychromatic image can still be achieved. Here, preferably the first surface of the first lens element would be specifically optimized for the narrow spectral band of the respective color channel.

The benefits of this array-dedicated design of the single channels of the array camera include:

Extremely high image quality, both in terms of resolution and contrast, and image quality homogeneity over the field of view (close to diffraction limited performance and close to isoplanatically);

A reduced TTL;

A reduced fabrication tolerance sensitivity due to reduced ray bending;

Low color cross-talk, due to color filters now being differentiating the different optical channels rather than having a Bayer pattern on the pixel level;

Low pixel cross-talk, due to smaller pixel stack height); and

Reduced color inhomogeneity, due to the color filters being far from the image plane.

Finally, of particular note in this design is the fact that the separate color channels only need to be optimized for their respective spectral bands. This results in overall higher polychromatic resolution, while minimizing the need for achromatization correction within the individual channels. This in turn leads to the ability to implement simpler overall aberration balancing or correction process, and therefore have simpler lenses and lens manufacturing processes, and/or better MTF, and/or lower F/#.

Embodiment 3

Monolithic Lens Design with Embedded Substrate

The embodiments previously discussed dealt with lenses made in accordance with a polymer on glass WLO process. In the following embodiment optical arrangements and designs using a monolithic lens WLO process are provided. In particular, in a first embodiment a monolithic lens stacked with planar substrates for use in forming apertures and filters is described.

Figure 6A:
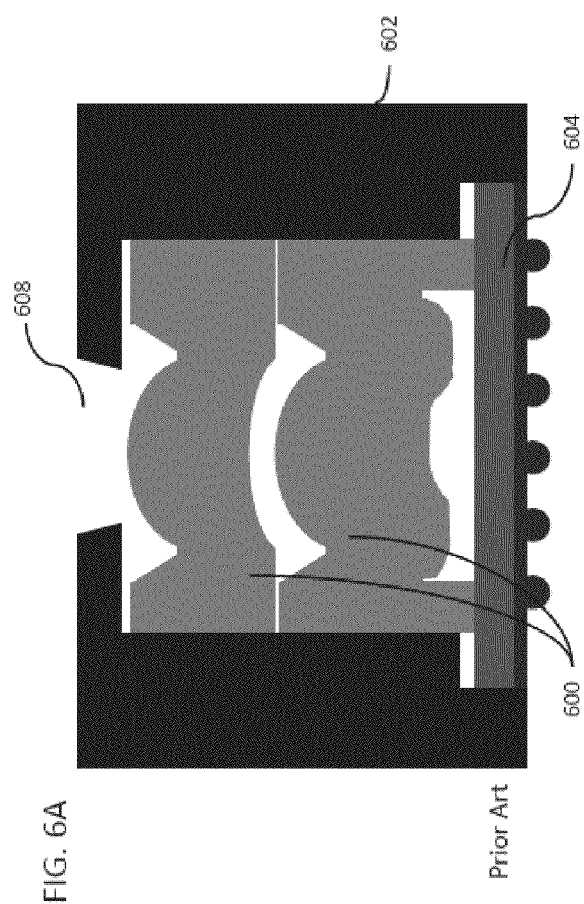
FIGS. 6A and 6B are schematics of conventional monolithic lens and aperture arrangements.
Figure 6B:
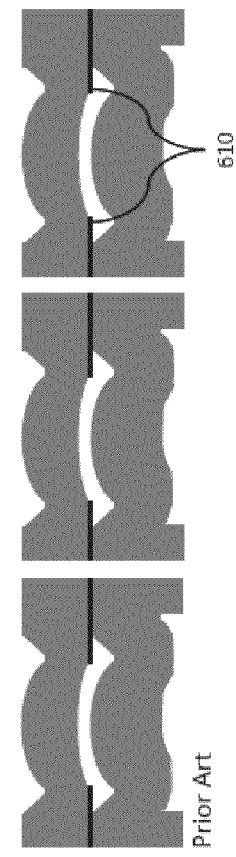

FIG. 6A shows the current state of the art of monolithic lens systems. More or less the same conceptual approach is taken as in creating injection-molded lenses and their packaging. In the state of the art of monolithic lens WLO, many lenses are fabricated on a wafer scale. These replicated lenses 600 are stacked with other previously replicated lens wafers of different topology, the sandwich is diced, and the lens cubes are packaged into an opaque housing 602 with the image sensor 604, which contains the aperture stop 606 at the front as shown in FIG. 6A. This very much limits the degrees of freedom available for the optical design of the objective. In addition, it makes it difficult to accurately replicate and align the lenses with respect to each other, particularly as it is difficult to determine precisely the placement of the aperture stop. Moreover, from the standpoint of optical design it is very desirable to have the aperture stop between the two lens elements, not in front of the first lens element as shown in FIG. 6A. Currently, as shown in FIG. 6B, the only method for forming apertures of this type on monolithic lenses is to use a highly imprecise screen-printing method in which apertures 608 in opaque resins are printed onto the flat portions of the lens interfaces. The lateral accuracy of those apertures is unsuitable for their use as a system stop, which must be precisely aligned with the lenses.

In short, although monolithic lens WLO is potentially an attractive means to manufacture cheap miniaturized optics for array cameras, the current monolithic systems are directly adapted from the methods used to form lenses by injection molding. As a result, many of the techniques used in conventional polymer-on-glass WLO to ensure proper alignment are not applied, leading to alignment accuracy problems as well as to a limited lens design space. The current embodiment is directed to a novel method of forming monolithic lenses that combines the monolithic WLO lenses with substrates that hold apertures and additional structures in precise alignment, thereby reducing the limitations of conventional monolithic lens WLO.

Figure 6C:
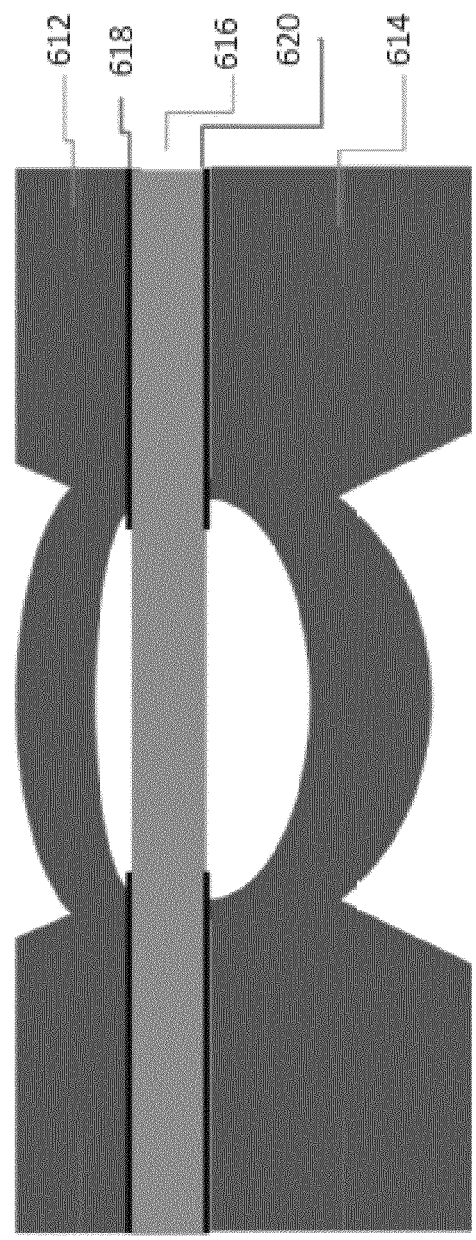
FIG. 6C is a schematic of a monolithic optical arrangement according to one embodiment of the invention.

An exemplary embodiment of the method of monolithic lenses formed in accordance with the invention is shown in FIG. 6C. As shown, in this embodiment, monolithic lenses 612 & 614, fabricated by an independent replication process, are stacked with a substrate or sheet 616 that holds apertures 618 & 620. (As discussed previously, it will be understood that the monolithic lenses may be formed of glass or polymer.) Because the apertures can be formed on the substrate with lithographic precision, it is possible to align the elements with sufficient lateral precision to function as the aperture stop. In addition, although not shown in FIG. 6C, the accuracy of the alignment in such a system is increased by cooperative alignment marks, which are disposed in the opaque layer(s) where the transparent openings for the apertures are structured, to provide a guide for the precision alignment of the lenses and apertures. In particular, in a wafer stack formed from a series of wafer surfaces, themselves formed from the elements of a number of optical arrangements, alignment marks would be formed in relation to each wafer surface. Each of the alignment marks would be cooperative with an alignment mark on an adjacent wafer surface such that when cooperatively aligned the alignment marks would aide in the lateral and rotational alignment of the lens surfaces with the corresponding apertures. Using these alignment marks results in a very high lateral alignment accuracy (on the order of a few µm) compared to having the aperture stop in the external housing, which results in an accuracy of several 10-20 µm.

In addition to apertures, the current method of providing a substrate embedded into monolithic lenses provides a base onto which any number of different structures, coatings, kinds of substrates or sheets can be applied in order to achieve a desired optical functionality. A number of these possibilities are shown in FIG. 6D, these include where there are two apertures on the front and back of the substrate that are the same size (6D1) or different sizes (6D2); where an additional IRCF coating, such as a homogenous IR cut-off filter made by a dielectric interference coating, is applied on either one or both sides of the substrate (6D3); where an additional color filter array material coating is applied to the substrate (6D4); where the sheet or substrate contains an adaptive refractive optical element allowing for the adjustment of the optical power of the element by changing an applied voltage, which can allow for the focusing of the whole lens stack, accounting for fabrication tolerances (such as BFL variations)(6D5); or where the sheet or substrate is made from an opaque material (6D6).

Other alternative designs that may be incorporated into the substrates and monolithic lenses of the instant invention, but that are not shown in the figures may include:
A substrate that is made of a material that is itself an absorptive IRCF (or combined with a dielectric coating);
A structured dielectric IRCF complemented by a structured dielectric NIR-pass filter for extended color camera modules;
A polarization filter disposed on the surface of the substrate or that is preformed into the sheet;
A thin diffractive lens applied to the surface of the thin substrate by replication of an additional thin polymer layer, or also by etching the diffractive structure into the glass, front and/or backside of the substrate surface (See Embodiment 9); and/or
Standoffs or spacing structures integrated into the monolithic lenses in addition to the actual lens surfaces in order to provide the correct positioning between the lens surfaces and the system aperture on the thin substrate (See Embodiment 8).

Although the above has focused on specific substrate structures and additional optical elements that the substrate embedded monolithic lenses of the instant inventions can incorporate, it should be understood that there are other features unique to the embedded substrates of the invention. For example, unlike conventional polymer on glass WLO where substrates or sheets must be sufficiently thick to allow replication of lenses thereon, the embedded substrates or sheets of the instant invention can be thin in comparison to wafer level optics standards since there is no need to replicate lenses on them. As a result, the mechanical stability and stress applied to the substrate is not an issue. In contrast, the independently replicated monolithic lenses can themselves serve to stabilize the glass substrate. Moreover, this holds true even for a singlet lens construct (i.e., one monolithic lens and one thin substrate).

Finally, while individual modifications to the basic embedded substrate monolithic lens optical array are described above, it should be understood that all or some of these features may be applied in various combinations to the substrates to obtain the desired functionality of the optical arrangement.

Embodiment 4

Monolithic Lens Design with Embedded Aperture Stop

This embodiment of the invention provides yet another alternative for aperture and filter placement within the lens stack of polymer or glass WLO monolithic lenses. As described above with respect to Embodiment 3, the current state of the art for producing monolithic lens optical arrays is to stack the independently replicated monolithic lens wafers, dice the sandwich and package the lens cubes into an opaque housing which contains the aperture stop as an integral part at the front of the array. This methodology limits the degrees of freedom for the optical design of the objective, as well as making it extremely difficult to accurately align the lenses with respect to of the aperture stop.

Embodiment 3 of the invention described a polymer or glass monolithic lens stacked with substrates for the placement of apertures and filters. In that embodiment of the invention, a substrate, such as glass, having aperture and/or filters thereon is disposed between separately fabricated monolithic lenses. This novel optical arrangement provides addition degrees of freedom for the optical design, and increases the lateral precision of the lens-aperture-alignment. The invention described in this embodiment embeds apertures and filters directly within a monolithic lens (See FIGS. 7A to 7G), providing even more and different degrees of freedom for the optical design, while maintaining a high lithographic precision for the lateral aperture placement.

As discussed with respect to Embodiments 1 to 3, lithographic procedures for producing apertures and/or filters are well known for polymer on glass WLO, e.g., spin on photoresist, expose desired areas through a correspondingly structured photomask, develop unexposed or exposed—depending on whether a positive or negative photoresist is used—areas away; either the photoresist itself is the opaque layer the apertures are structured in, or the (CFA) filter; or the photoresist is a protective layer for a previously applied metal or dielectric coating, which prevents the etching away of that material at the desired areas when the wafer is placed into an etchant. However, for a monolithic lens typically the monolithic lenses are replicated as double-sided lenses. As a result of the unusual topography, these WLO techniques cannot be applied since a plano surface is needed for lithography.

The current invention is directed to an optical arrangement and process for producing such monolithic lenses formed of either polymer or glass with embedded apertures and filters. One embodiment of the invention is shown schematically in FIG. 7A. As shown, in this embodiment, first the thick front-side of the lens 702 is replicated as a plano-convex or plano-concave element. Preferably, the front-side stamp, which also holds the lens profiles, additionally contains alignment marks (as described above in Embodiment 3) that are further used in the other manufacturing steps to aide in the precise alignment of the various elements to the overall optical arrangement. Because the backside 704 stamp in this initial step may be simply a highly flat and/or highly polished plate, no precise lateral alignment of the two stamps is required, only wedge error compensation as well as the correct thickness needs to be ensured. These modest requirements simplify this initial process step considerably.

Once the first lens element of the arrangement is complete, apertures 706 and filters 707 are applied on the plano backside 704 of this lens element. As these apertures must be precisely aligned, it is preferable if the front-side of the lens element is provided with alignment features (not shown) that can be used during manufacture to assist in positioning the apertures with respect to the lens by aligning the alignment marks in the photomask of the apertures and/or filters to the complementary alignment marks within the first lens layer. Alignment marks, which may be of any suitable design, provide the benefit of allowing much higher lateral alignment accuracy (few μm) compared to having the aperture stop in the external housing, which has a typical lateral alignment precision of several 10-20 μm.

Once the apertures/filters 706/707 are positioned on the back-side 704 of the first lens surface, the second lens surface 708 is replicated on the plano back-side 704, of the first lens surface 700. This second lens surface can be aligned either based on the alignment features in the first lens front-side 702, or based on alignment features within the aperture layer. However, it should be understood that aligning the second lens surface to the front-side of the first lens surface is preferred since the precision is expected to be better due to reduced error propagation when referring to this initial surface.

Figure 7A:
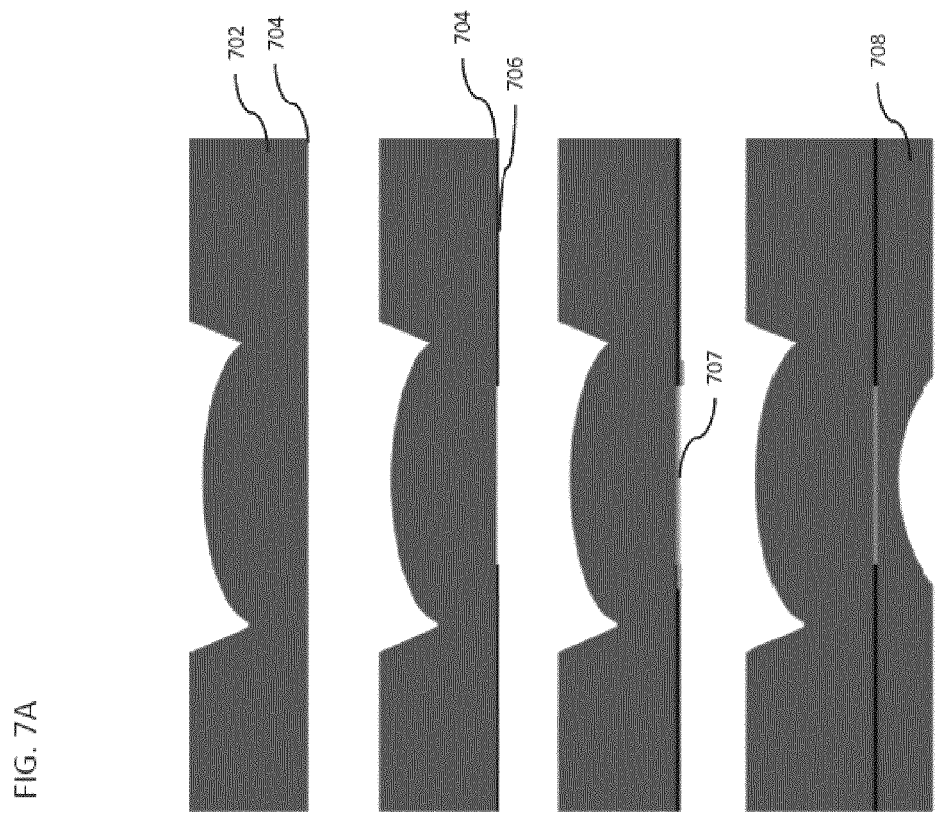
FIG. 7A is a schematic of a process flow for manufacturing a monolithic optical arrangement according to one embodiment of the invention.
Figure 7B:
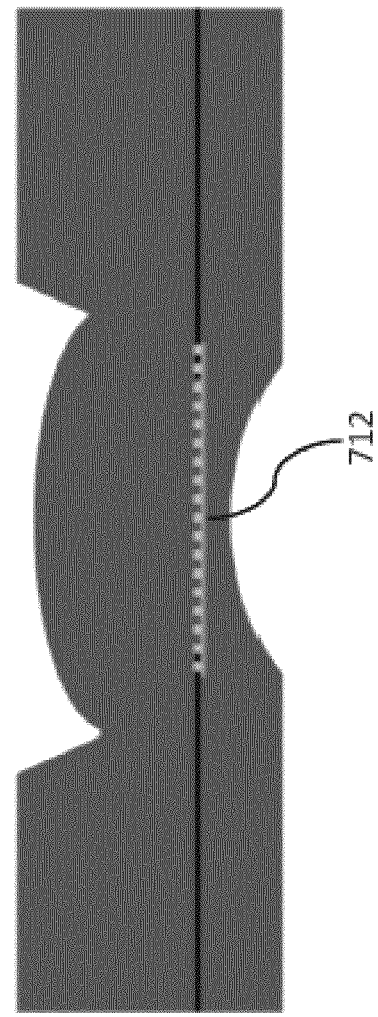
FIGS. 7B to 7D are schematics of monolithic optical arrangements according to various embodiments of the invention.

Although FIG. 7A provides an embodiment of a desired lens element with an embedded aperture in accordance with the current invention, a number of modifications or additional elements may be incorporated into the invention. For example, multiple filters 712, even having different physical natures, can be stacked on each other as shown in FIG. 7B. It should be understood that any desired filter may be applied in this manner, including, for example, a CFA filter or a structured IRCF filter.

Figure 7C:
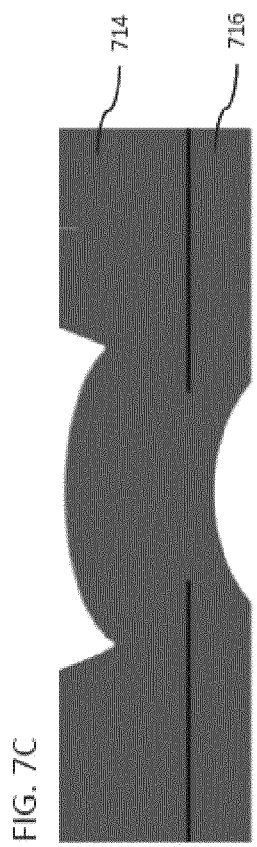
Figure 7D:
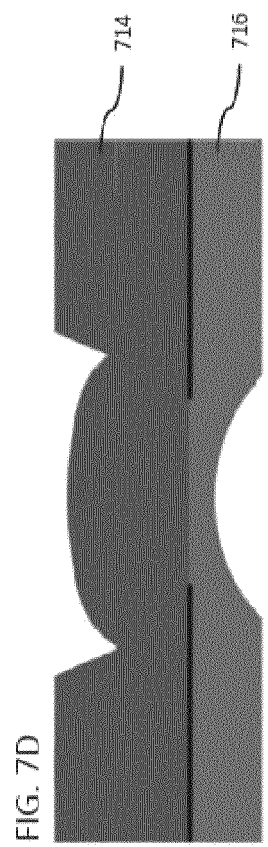

In addition, although the materials used in forming the first 714 and second lens 716 surfaces have not been specified, it should be understood that the different replications may be formed from any suitable material, and that the material may be the same for both replications (as shown in FIG. 7C) or two different materials (as shown in FIG. 7D). If the same lens materials are used for the first and second replication, the inside lens surface optically vanishes (in other words: it is not visible to the light and thus provides no refraction and consequently is free of any Fresnel reflection losses). However, making the two replications from two different materials provides yet another degree of freedom in manufacturing the optical arrangements, especially for achromatization correction if the Abbe numbers of the two materials are different (See Embodiment 6).

Figure 7E:
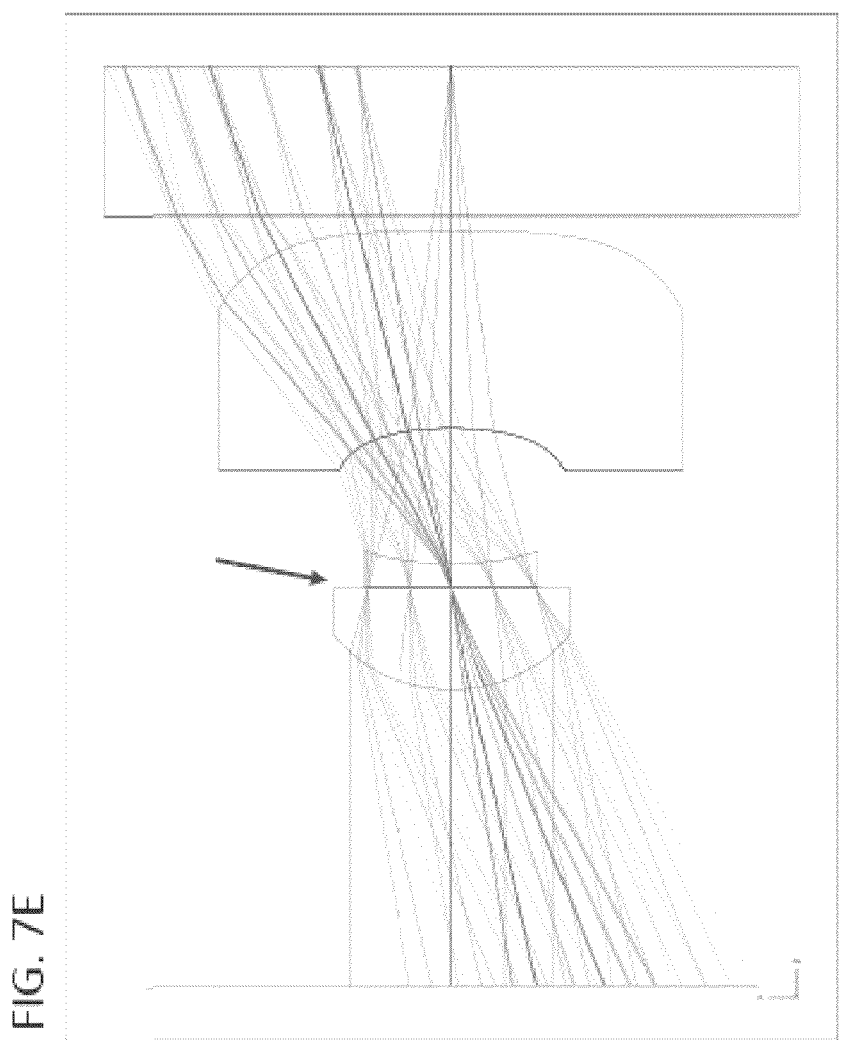
FIGS. 7E to 7G are schematics of optical arrangements which incorporate monolithic lens elements according to the embodiments of the invention shown in FIGS. 7B to 7D.
Figure 7F:
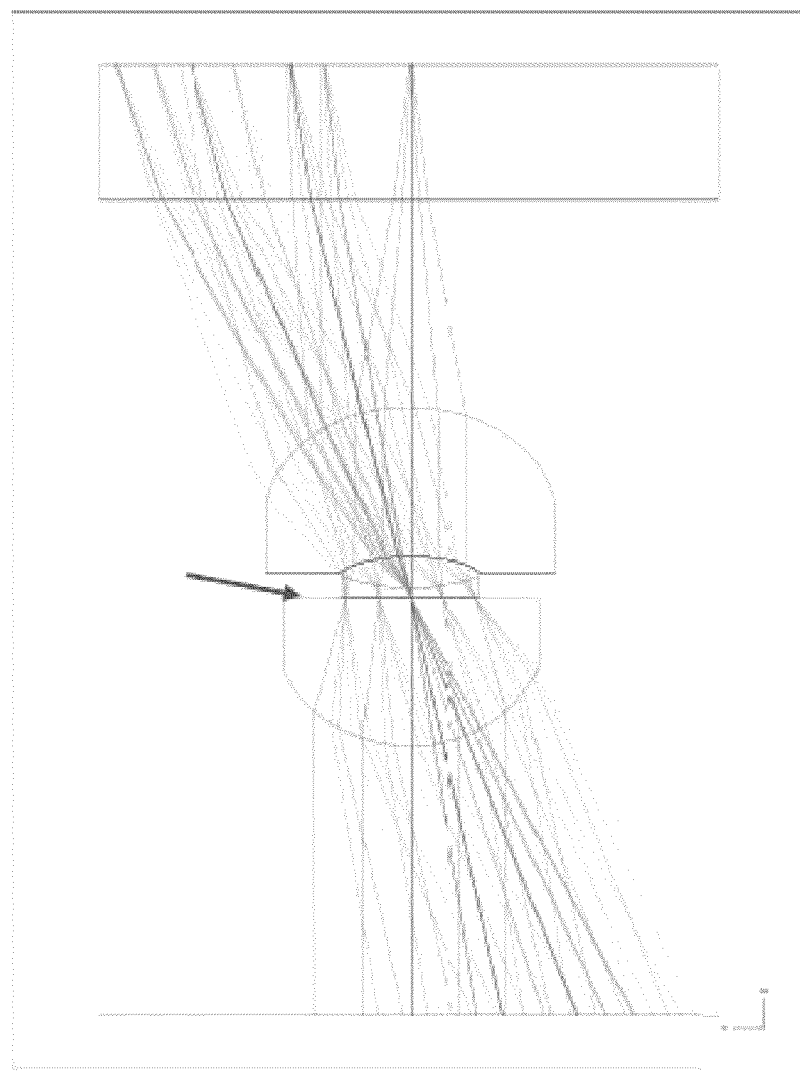
Figure 7G:
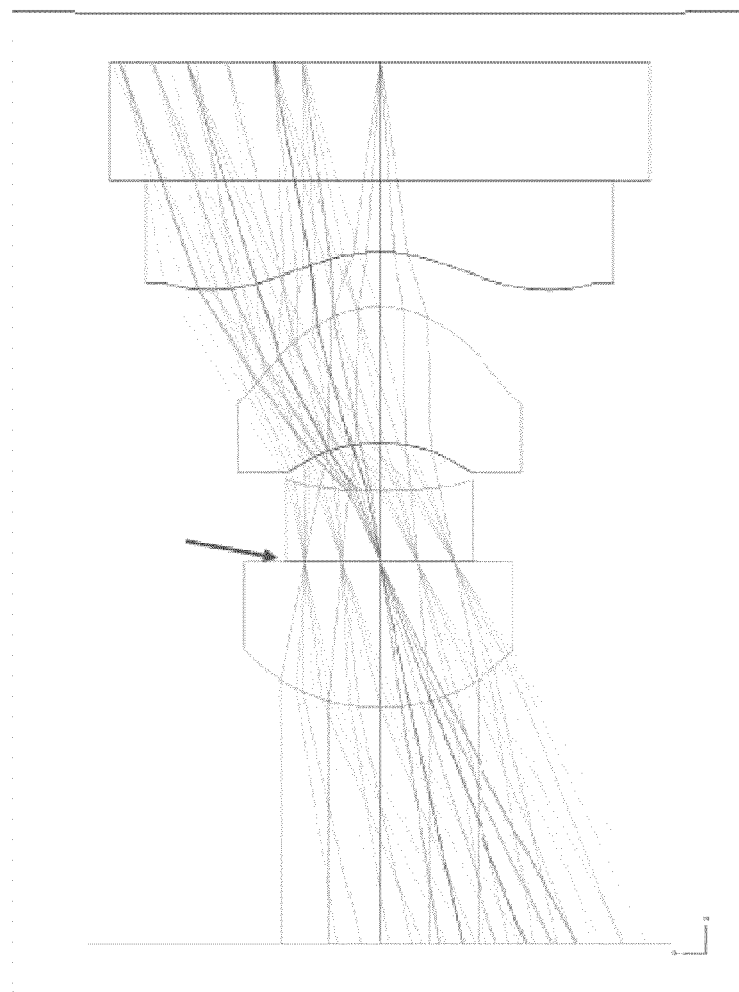

Although only a single lens element of a single lens channel or wafer arrangement is shown, it should be understood that the monolithic lenses (polymer or glass) formed in accordance with the current invention may be duplicated as necessary to form the plurality of lens stacks needed for the array camera, and that the monolithic lenses may be combined with other lens elements to realize an optical arrangement having the desired characteristics. For example, FIGS. 7E, F and G provide schematic diagrams for monolithic lens arrangements suitable for array camera architectures. FIGS. 7E and 7F show two different monolithic doublet designs, while FIG. 7G shows a triplet design. The arrows in the diagrams indicate where an embedded system aperture or "stop" has been disposed between the monolithic lenses on one of the planar surfaces of the monolithic lenses.

In summary, while there is no doubt that monolithic lens WLO is very attractive for manufacturing optics for cheap miniaturized cameras, current methods are adapted directly from techniques used for injection molded lenses. As a result, several benefits of polymer-on-glass WLO are not used, leading to alignment accuracy problems as well as to limited lens design degrees of freedom. The combination of monolithic lenses and lithographic technologies described in the current embodiment allows for the manufacture of precise apertures and additional structures for monolithic lenses and their alignment to the monolithic lenses. This, in turn, allows for greater flexibility in the choice of the z-position for aperture stop and filters, increased lateral accuracy of the lens-aperture alignment when compared to conventional stops that are integrated into the lens housing, and the plano intermediate surface of the monolithic lens allows application of lithographic technologies for structuring the apertures while maintaining the benefits of the monolithic lens over the polymer on glass WLO.

Embodiment 5

Three-Element Monolithic Lens Design

This embodiment of the invention provides yet another alternative for aperture and filter placement within the lens stack of polymer or glass WLO monolithic lenses. As described above with respect to Embodiments 3 and 4, the current state of the art for producing monolithic lens optical arrays is to stack the independently replicated monolithic lens wafers, dice the sandwich, and package the lens cubes into an opaque housing which contains the aperture stop as an integral part at the front of the array. This methodology limits the degrees of freedom for the optical design of the objective, as well as making it extremely difficult to accurately align the lenses with respect to the aperture stop.

As described in both Embodiment 3 and 4, a major problem of the monolithic lens process is that there is no suitable method to provide a precise system aperture (array) as well as (color- or IR cut-off-) filters within the lens stack of WLO monolithic lenses. The current embodiment provides another alternative to bring a lithographically fabricated aperture (stop), as well as filters into a polymer or glass WLO monolithic lens stack. In particular, this embodiment builds on the design introduced in Embodiment 4, in which one element of the lens design is forced to have a plano surface where the aperture and filters can be lithographically structured. As described above, in such an embodiment the plane side of the either plano-convex or plano-concave element can be used as substrate for the subsequent lithography step. The current embodiment provides a three-element optical arrangement using this plano-element monolithic design.

Figure 8A:
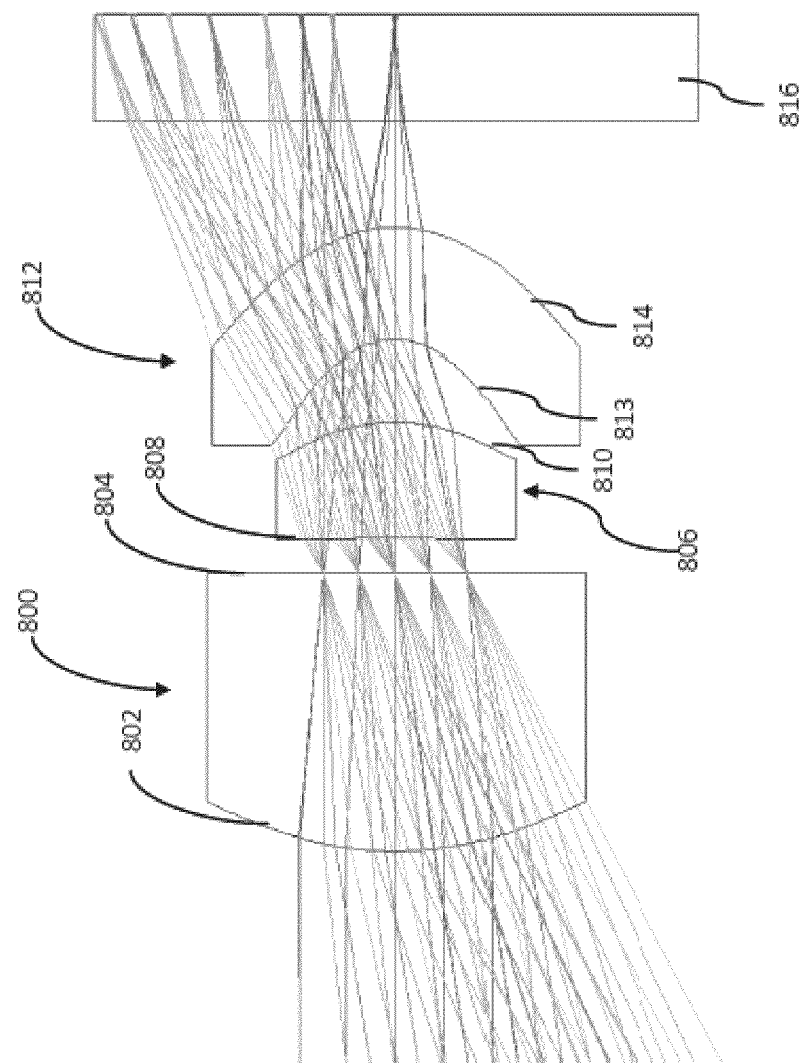
FIGS. 8A to 8D are schematics of three element monolithic optical arrangements according to various embodiments of the invention.

As shown schematically in FIG. 8A, the basic three-element design of the instant embodiment is characterized by the following properties:

- A first plano-convex lens element 800 that has a convex first surface 802 as well as a plane second side 804 carrying the system aperture stop as well as required filter structures. Preferably, this first element is made from a first (low dispersion, low refractive index) lens material.
- A second concave-convex lens element 806 that has a concave first surface 808, bent towards the object side and a convex second surface 810, where the concave first surface 808 is very shallow and this concave surface is very close to the plane (second) surface 804 of the first element 800. Again, preferably this lens element is made from a first (low dispersion, low refractive index) lens material. In addition, in a preferred embodiment, the surface profile of this shallow concave surface 808 close to the system aperture stop 804 is the one optimized/adapted to the specific narrow spectral band of the different color channels of an array camera.
- A third menisc-lens element 812 that has a concave first surface 813 and a convex second surface 814, both bent towards the object side. This lens is preferably a strongly bent concave-convex lens that is made from a second (high dispersion, high refractive index) lens material. This third lens element is disposed adjacent to the image sensor cover glass 816, which itself is placed in above the image sensor 817.

This design has two significant advantages, first, a plane, substrate-interface-like, surface (e.g., surface 804 in FIG. 8A) is introduced in the lens stack. This plane, substrate-interface-like-surface can be used to apply a highly accurate (sub- or few-micron centering tolerance) aperture stop by photolithography. This is a major improvement in precision as the current state-of-the-art (screen printing)) has a centering tolerance of around 20 μm, which is insufficient for high image quality array cameras. In addition, color filters (CFA) and/or dielectric filters (IRCF) or other structures, which need a planar substrate, can be applied to this planer surface.

Second, the design provides a surface which is very close to the aperture stop (first surface of the second element) whose surface profile can be optimally adapted to the specific narrow spectral band of the different color channels of an array camera, as will be described in greater detail below with reference to the data-plots in FIGS. 8E to 8J, below.

Figure 8B:
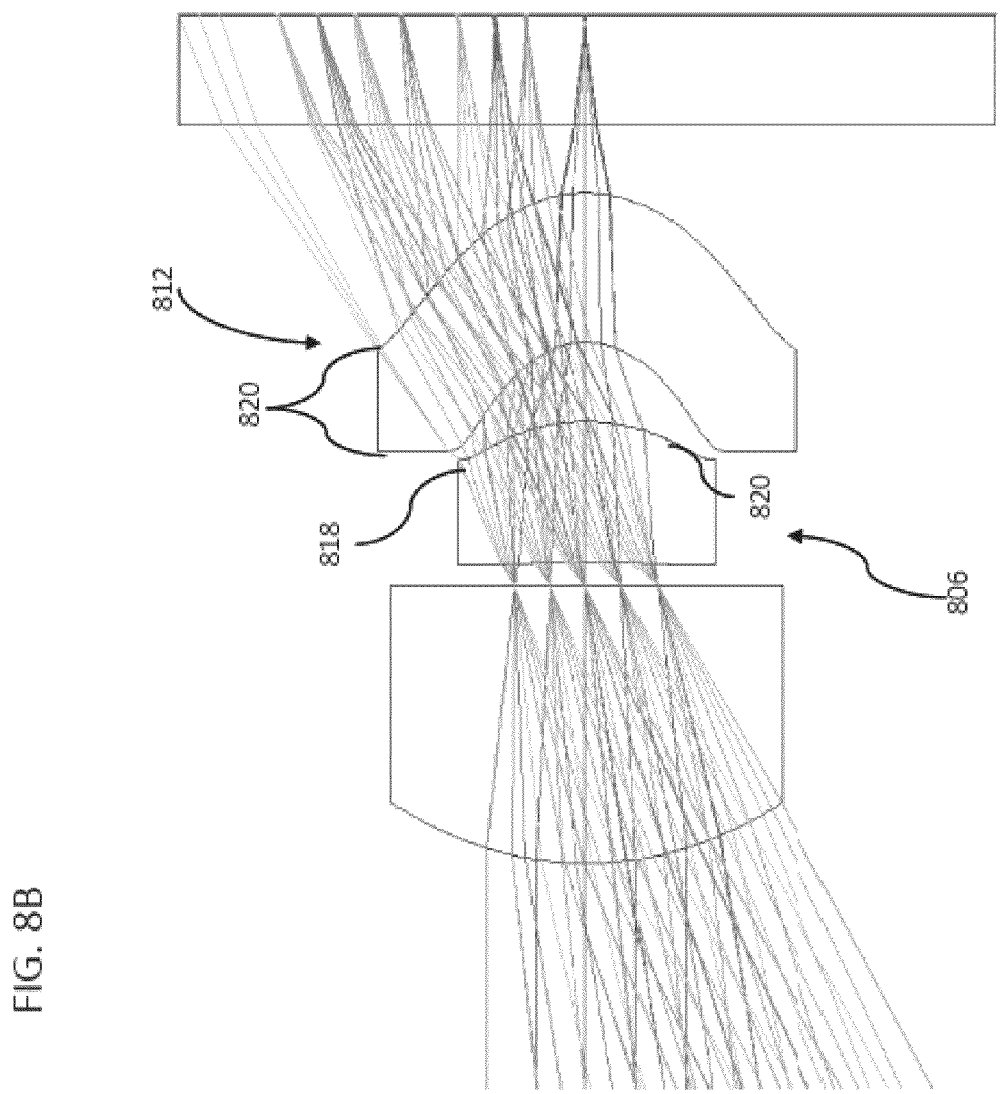
Figure 8C:
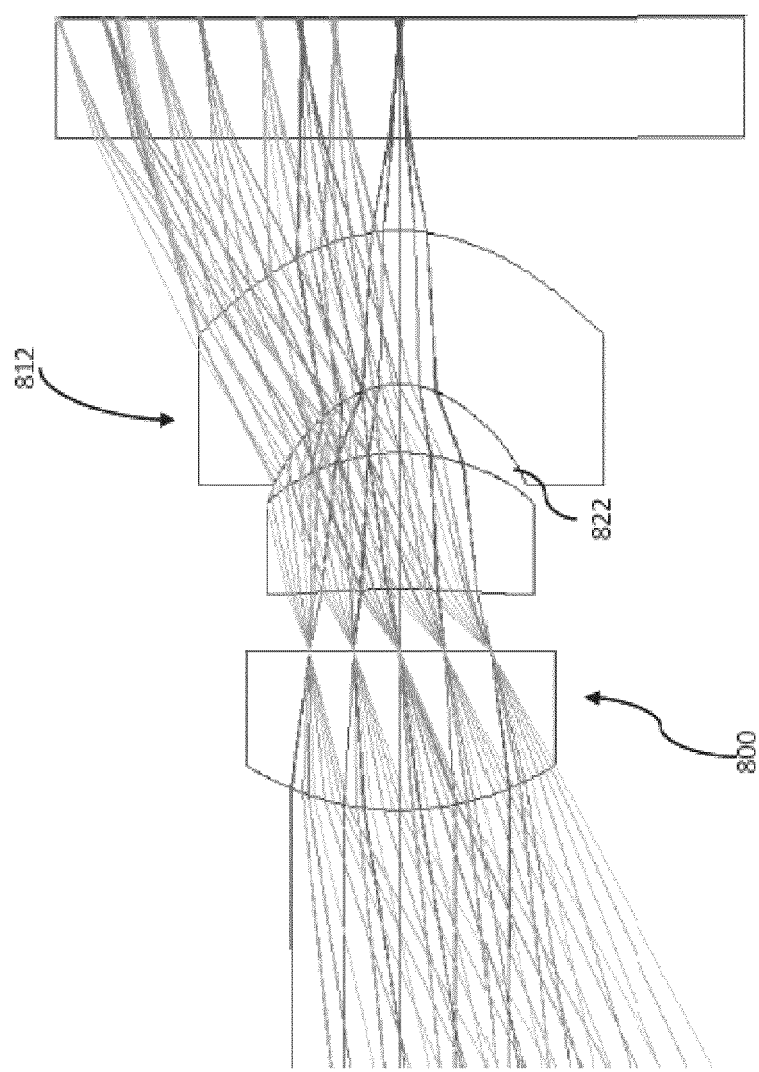
Figure 8D:
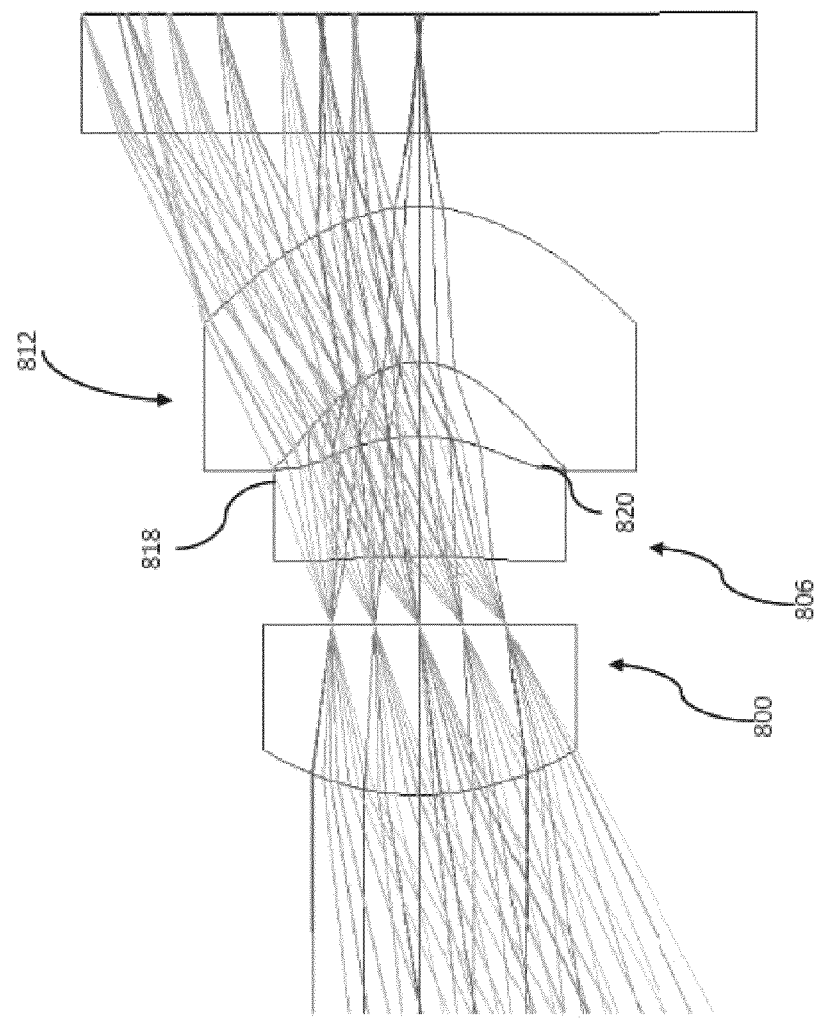
Figure 8E:
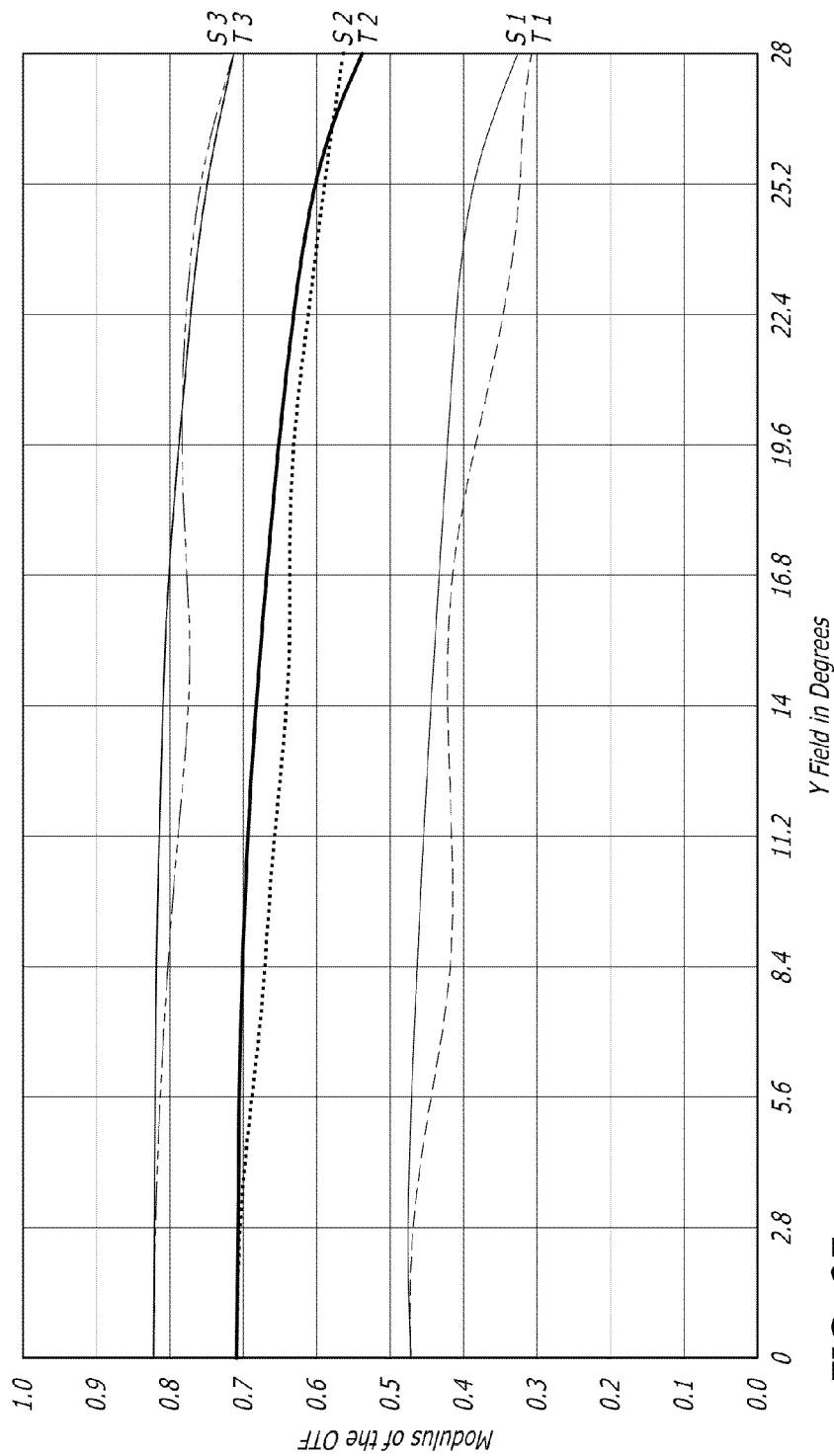
FIGS. 8E to 8J are data graphs of characteristic performance indicators of the three-element monolithic optical arrangements according to one embodiment of the invention.
Figure 8F:
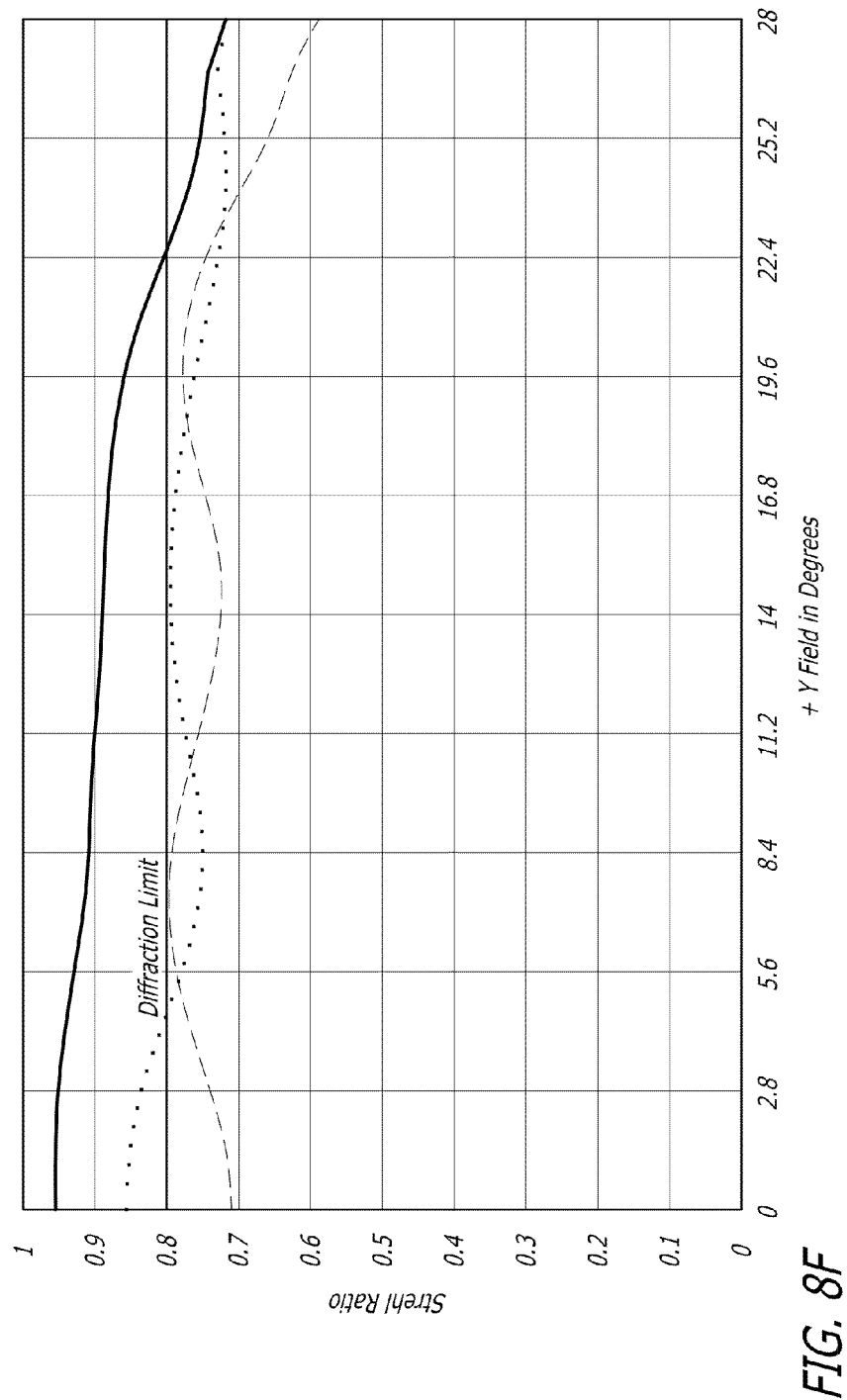
Figure 8G:
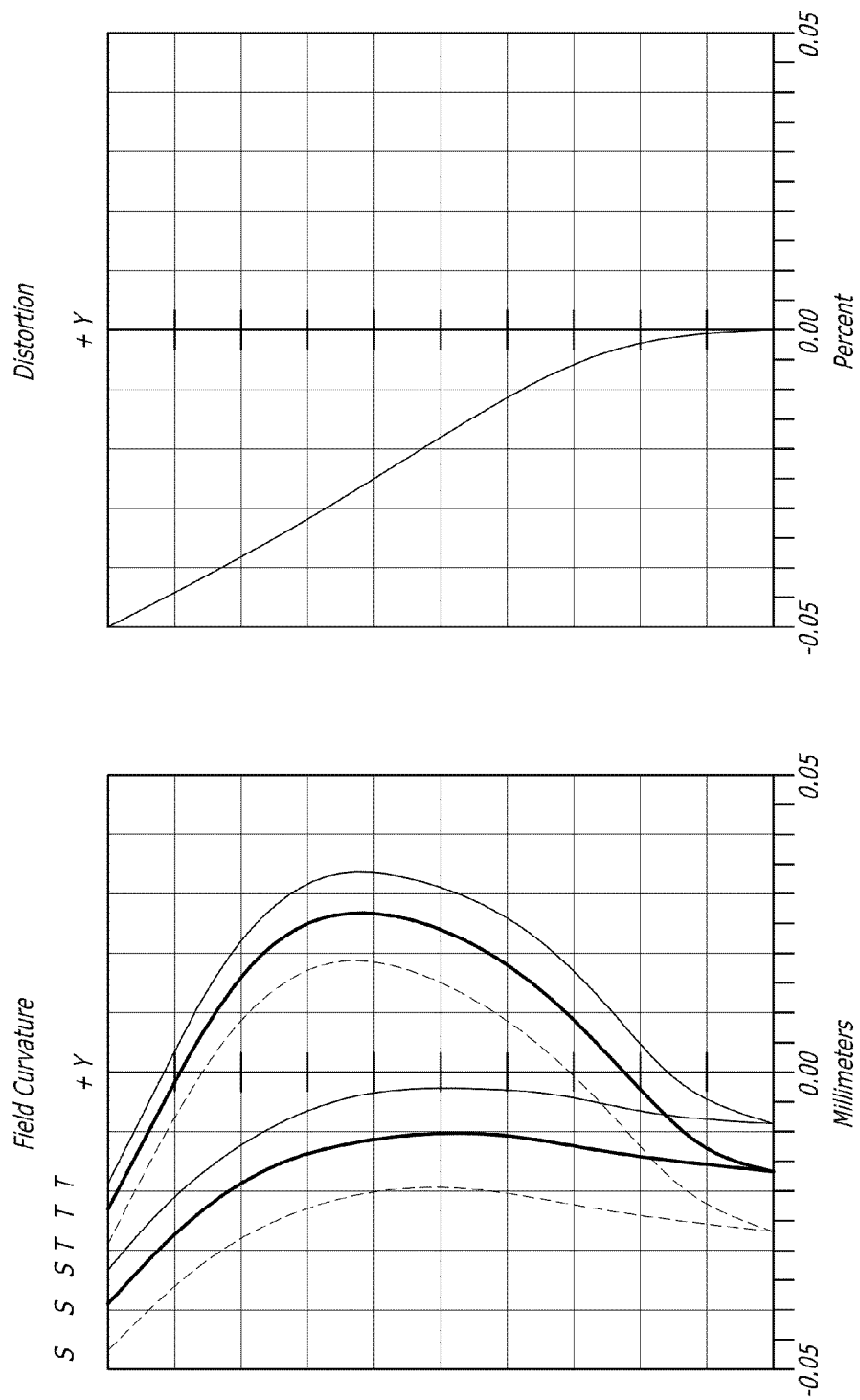
Figure 8H:
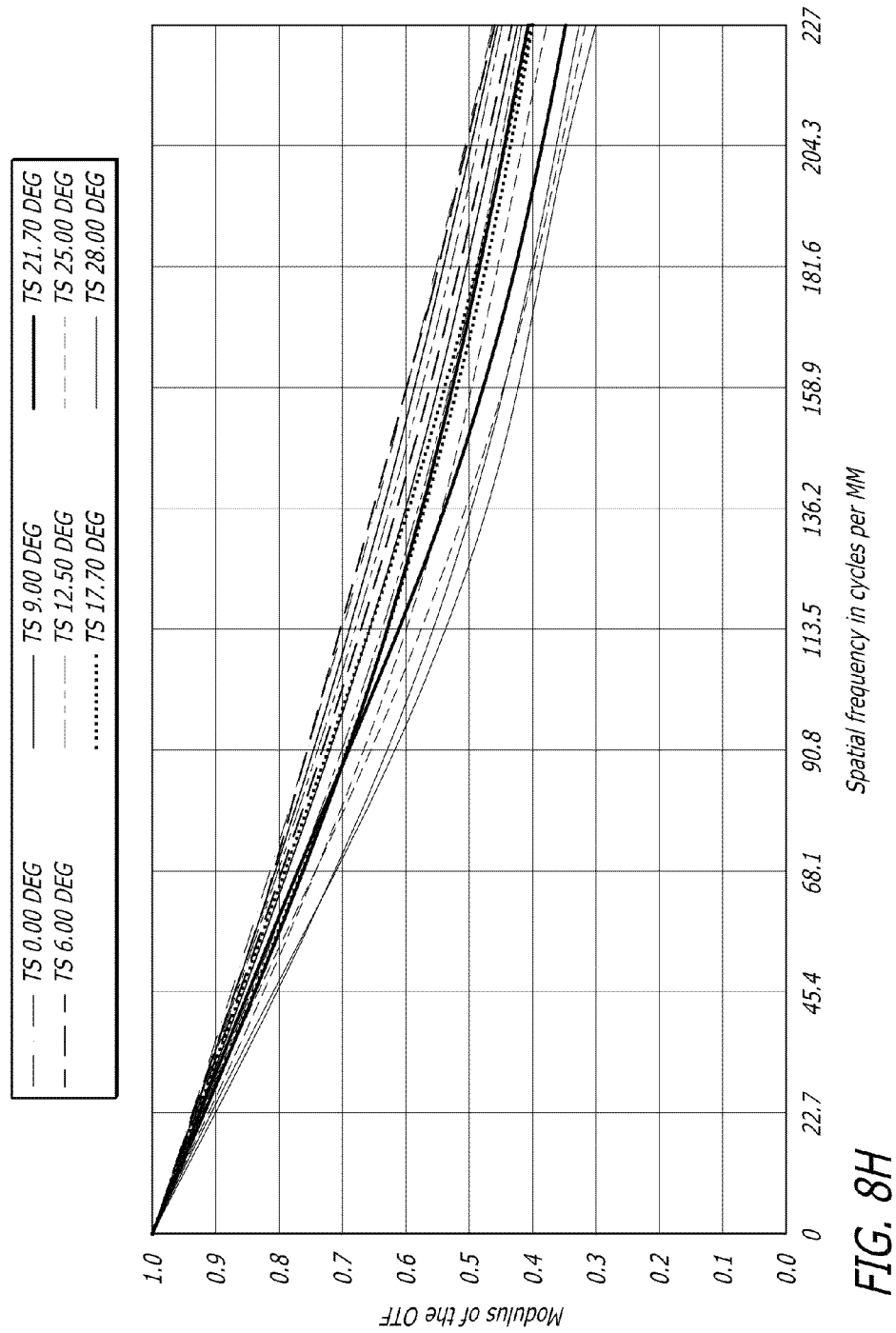

Although one specific embodiment of the three-element monolithic lens design is shown in FIG. 8A, it should be understood that there are many different implementations of the above general design principle, as shown and described in FIGS. 8B to 8D, below. In particular, FIG. 8B shows a modification of the basic optical arrangement in which the curvature at edges 818 of the second surface 820 of the second lens element 806, and at the edges 820 of both surfaces of the third lens element 812 quickly change slope towards these edges. Such a design has the benefit of allowing for a decrease in the steepness at the edge of the first surface of the third element. FIG. 8C shows a modification of the basic optical arrangement in which the first element 800 is thinner and the third element 812 is in consequence made thicker. Such a design, however, requires an increase in the steepness of the first surface 822 of the third element 812. FIG. 8D shows a modification of the basic optical arrangement in which the first element 800 is thinner and the third element 812 is thicker, and where the curvature of the surface at the edge 818 of the second surface 820 of the second element 806 quickly changes slope towards the edge formed thereof. Again, this design has the benefit of decreasing the steepness of the first surface of the third element 812.

In another alternative embodiment that can be applied to any of the arrangements described above, the first lens element can be made as a polymer-on-glass wafer level lens instead of a (polymer or glass) monolithic lens. This would mean that there would be a (comparatively thick) glass substrate where the aperture stop and filters would be lithographically applied to the second side thereof, and the first lens surface would be replicated on the first side. This "hybrid lens" would then be stacked with the second and third lens elements, which would both be fabricated by a monolithic lens process. Alternatively, the second lens element could be a hybrid lens in which the polymer lens surfaces would be replicated on both sides of a thinner glass substrate. However, the third lens element would always be monolithic due to the menisc-nature of this lens. There are several advantages of this combination of technologies, namely:

- The first lens is a comparatively thick element with a plane backside and a shallow front lens surface, so little is lost functionally by inserting the glass substrate.
- The use of the substrate provides additional robustness/stability/planarity during the application of the aperture and filters due to the presence of the glass substrate. In addition, the first lens surface quality can be improved due to the stable glass substrate it is replicated on.
- There is less (especially lateral) thermal expansion than with a purely monolithic lens since the thick glass substrate with about $1/10^{th}$ of the CTE of the polymer serves as a permanent carrier of the overall lens stack providing the majority of the mechanical integrity.

Figure 8I:
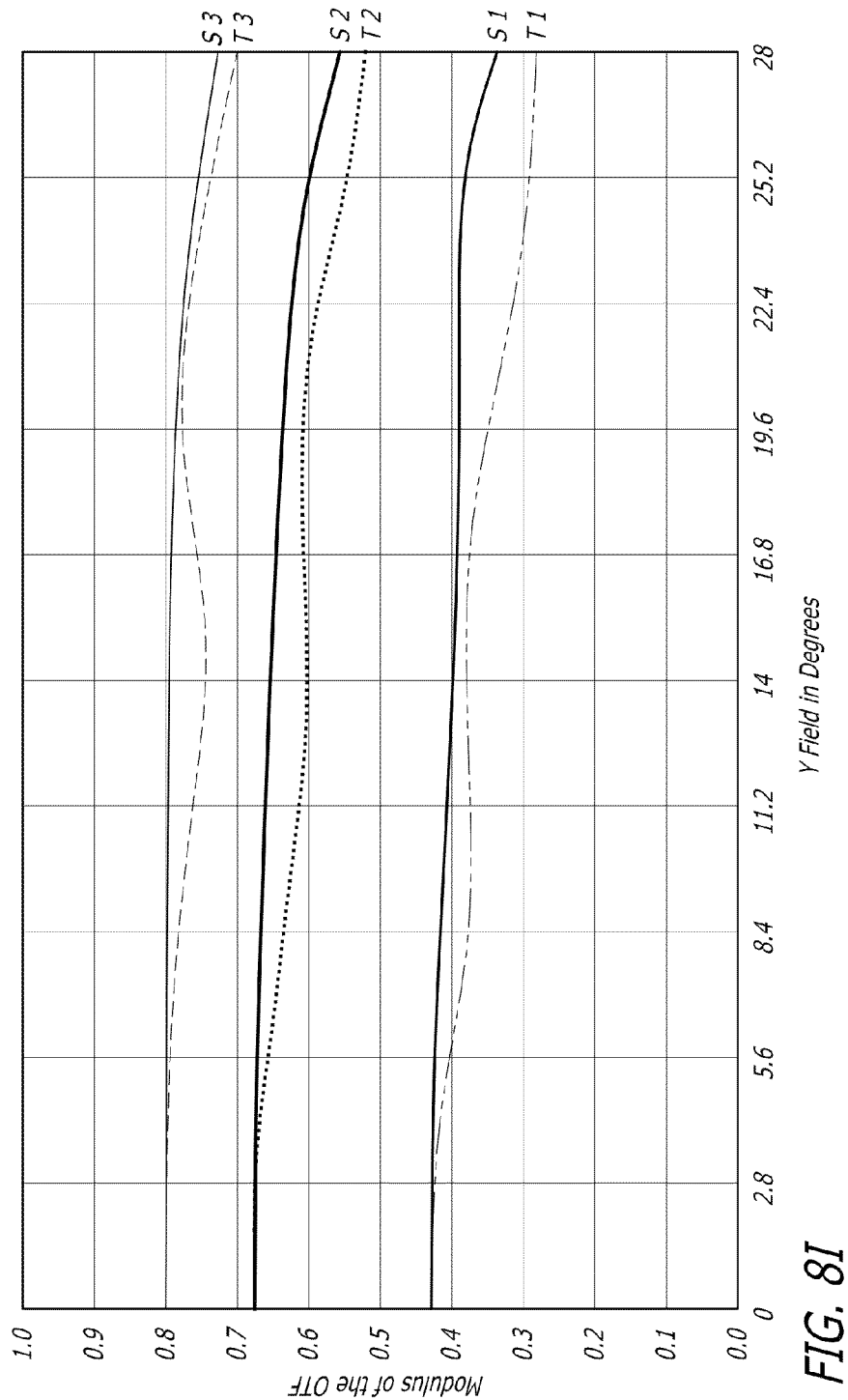
Figure 8J:
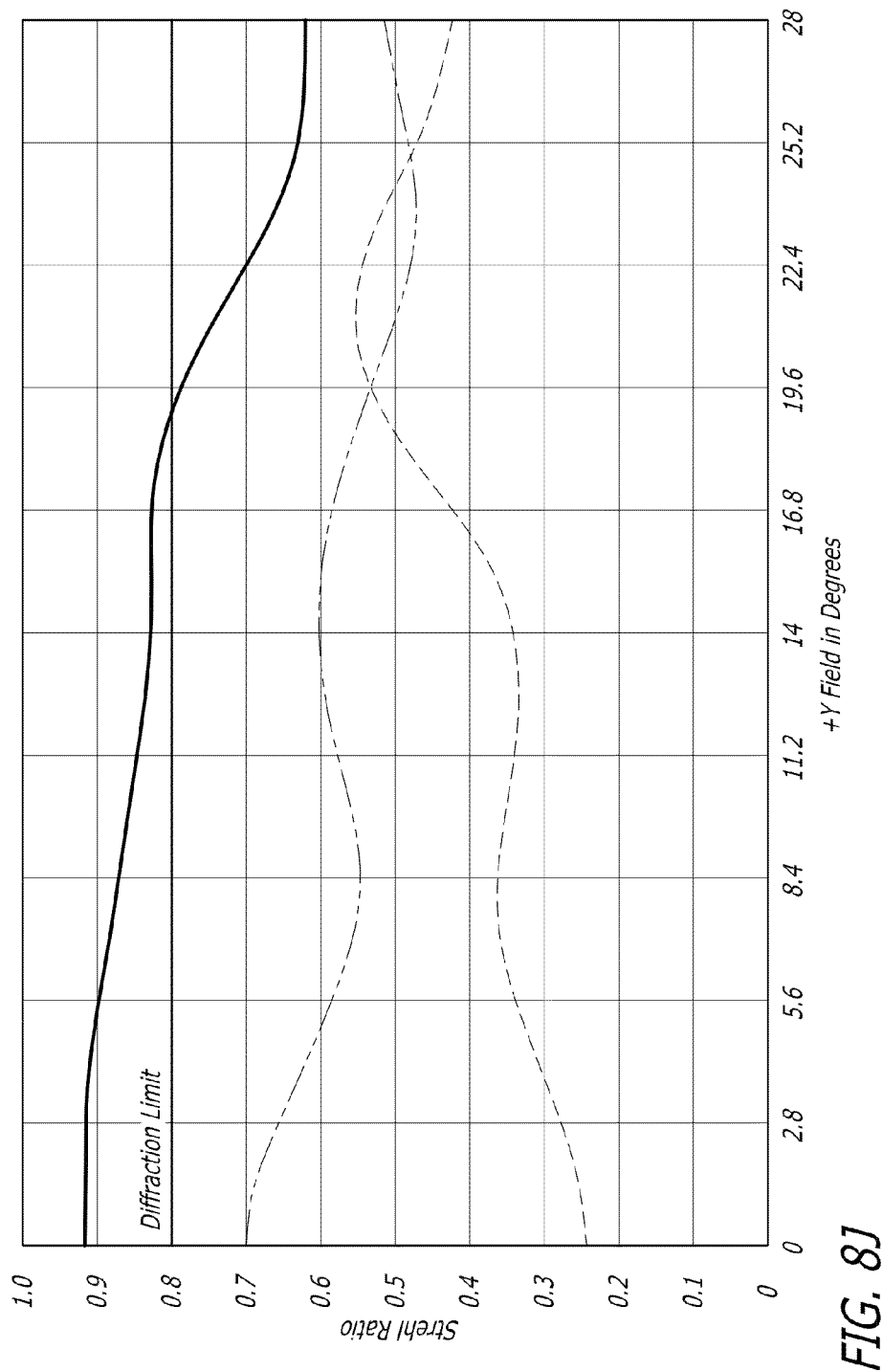

FIGS. 8E to 8J provide data plots showing the optical properties of these novel three-element monolithic optical arrangements. In particular, FIGS. 8E to 8H, provide plots of MTF vs field (8E), Strehl ratio vs. field (8F), distortion and field curvature (8G) as well as MTF vs. spatial frequency (8H) of the lens design shown in FIG. 8A for a green channel. Meanwhile, FIGS. 8I & 8J provide plots of MTF vs field (8I) and Strehl ratio vs. field plots (8J) of the corresponding blue channel of the design shown in FIG. 8A. It should be noted that only the surface profile of the first surface 808 of the second element 806 needs to be altered to optimize the optical arrangement for a different color channel. As can be seen from this data, the three-element monolithic optical arrangement provides high image quality (See, e.g., FIGS. 8E to 8H) comparable to that of a design using a field-flattening element (such as e.g. applied in Embodiment 2 above). Moreover, because only three lens elements need to be stacked in the current design it is much more suitable for manufacture using a monolithic method compared to complex conventional multi-element optical arrangements.

The lens material sequence (i.e., in the above embodiment high Abbe number, high Abbe number, low Abbe number) for the positive, positive, negative elements provides an efficient way of achromatization for each considered channel's spectral band (See Embodiment 6). For example, even for regular dispersion materials the blue channel performance seen in the exemplary embodiment is much better than can be obtained for regular designs (See, e.g., FIGS. 8I and 8J). Moreover, even though for array cameras each channel only has to perform well for a comparatively narrow spectral band, this achromatization still increases the performance since both the central wavelength and the wavelengths at the sides of the used spectral band of the considered channels are imaged sharply.

Embodiment 6

Different Lens Material Sequences for Channels that Work with Different Spectral Bands Although the above embodiments have focused on specific optical arrangements, it will be understood that the current invention is also directed to novel methods and materials for modifying the optical properties of the various lens elements of these novel optical arrangements. For example, in a first such embodiment, the invention is directed to the use of different lens materials (or combinations thereof) for different color channels.

As shown in FIGS. 9A, 9B and 9D, using conventional array optics, channel specific color-focusing in an array camera so far is limited to adjusting at least one surface, (i.e., the surface profiles of front- and/or backside for lens 900 or lens 902) for channel-specific correction of the back-focal-length (BFL) for axial color. However, the material sequence for the different elements of the lens channels is always the same, independently of the color the considered channel is supposed to work for. It should be noted that the only difference between the lens arrays in FIGS. 9A and 9B is that in FIG. 9B the supporting structure of the array is opaque and going through the full length of a channel. (For reference the specific color channel red "R", green "G", or blue "B" is indicated by the letter in the schematics provided.) However, while there are several materials with high refractive index, which are beneficial in achieving strong refractive power with shallow lens profiles, these materials usually also show high spectral dispersion. In particular, typically one has a choice between high refractive index and low Abbe number (high dispersion) materials ("flint-like"), and low refractive index and high Abbe number (low dispersion) materials ("crown-like"). Indeed, for (lens-) polymers the above connection is always valid, dispersion always increases with increasing refractive index. If this physical connection of the two material properties was not the case, from an optical design standpoint the choice would usually be made to use a high index material (so that the surface of the lens can be shallow, while still maintaining strong optical power) with low dispersion (so that the difference in refractive power for different wavelengths would be small). However, as stated above, such polymer materials are not available, so one has to choose if the priority is on either one of the two properties.

While using a flint-like material can be acceptable for the green and red channels, it can impact the blue spectral band disproportionately, because dispersion is related to the change of refractive index with wavelength and usually this change is stronger in the blue spectral band than in the green and red ones. In short, while green and red channels would profit from the use of such a high index material, the blue channel would show too strong axial color aberration due to the related large dispersion. The current embodiment takes advantage of the array nature of the camera to allow the use of a different material sequence in the blue channel (as shown in FIG. 9C), which may be less optimal with regard to refractive index, but shows much less spectral dispersion. Using such a method makes it possible to adapt one or more lens profiles to optimize a channel to its respective spectral band, and to optimize the material sequence used, e.g., here changing the material sequence for the blue channel.

It should be understood that the ability to modify the material sequence to optimize it for a specific color channel may be used in injection molded lenses (as shown in FIG. 9C) or with a specific type of polymer on glass "WLO" lenses (as shown in FIGS. 9D and 9E) (where the lens material is dispensed in separated islands prior to the replication (e.g. by some device similar to an ink jet) other than with the wafer scale puddle dispense). For example, in an injection molding process a "crown-like" polymer material would, e.g., be PMMA, Zeonex (COP) and Topas (COC), and a "flint-like" material would be Polycarbonate (PC) and Polystyrene (PS). Finally, as described in reference to the invention more broadly, the material sequence may also be modified in glass molded lenses as well.

Embodiment 7

Polymer on Glass WLO Novel Aperture Stop

Again, although the above embodiments have focused on specific optical arrangements, it will be understood that the current invention is also directed to novel methods and materials for modifying the optical properties of the various lens elements of these novel optical arrangements. In a second such embodiment, the invention is directed to a novel arrangement that could be used in any polymer on glass WLO, in which the aperture stop is disposed on a separate substrate in the air spacing between lenses.

As shown schematically in FIG. 10A, in the conventional polymer on glass WLO, apertures 1000, and in particular the aperture stop, is structured on the supporting glass substrate 1002, and then the lenses 1004 and 1006 are replicated above the aperture. In the current embodiment, an additional layer 1010 is introduced between the lens substrates 1012 and 1014, upon which the aperture stop 1016 is disposed. In such an embodiment, the apertures may be made using any suitable technique, such as, for example, transparent openings in an opaque layer (e.g. metal, metal oxide or opaque photoresist) on a thin (glass) substrate, be (metal) etch mask, etc. Positioning the aperture in the air space between the lenses as an additional diaphragm, or as an aperture on very thin (glass) sheet, rather than forcing it to be on the substrate under the polymer lens yields a number lens designs benefits in terms of MTF performance. In contrast, constraining the apertures to the substrate surfaces for a large variety of lens designs reduces performance by 5-10% over the full field.

Embodiment 8

Polymer Injection- or Precision Glass Molded Lens Arrays

Again, although the above embodiments have focused on specific optical arrangements, it will be understood that the current invention is also directed to novel methods of manufacturing the various lens elements of these novel optical arrangements. In a third such embodiment, the invention is directed to a novel method of manufacturing optical arrangements for use in camera arrays in which stand-offs and mechanical self-alignment features for assembly are included in the manufacture of the lenses.

In conventional polymer injection- or precision glass molding techniques, a cavity for producing one lens array (front and back side) is provided. The mold cavity is filled with a suitable material, such as, for example, PMMA or polycarbonate for polymer injection molding or preferably "low-Tg-glasses" such as e.g. P-BK7 or P-SF8 for precision glass molding. Then for conventional camera assembly alignment barrels are used in which the molded lenses are stacked and glued together. In an array camera this method does not provide sufficient alignment precision. The current invention proposes a method in which mechanical alignment features are provided in the lens mold. In other words, during the polymer injection- or precision glass molding process, not only the lens features are replicated into the array, nor even optical alignment marks, but also small mechanical features are formed into the front- and back-faces of the elements, which allow mechanical self-alignment with the adjacent array, such as, for example, complementary rings and spherical segments, pins and holes, cones and pyramids with complementary (and correspondingly shaped) cavities on the opposing element.

Figure 11A:
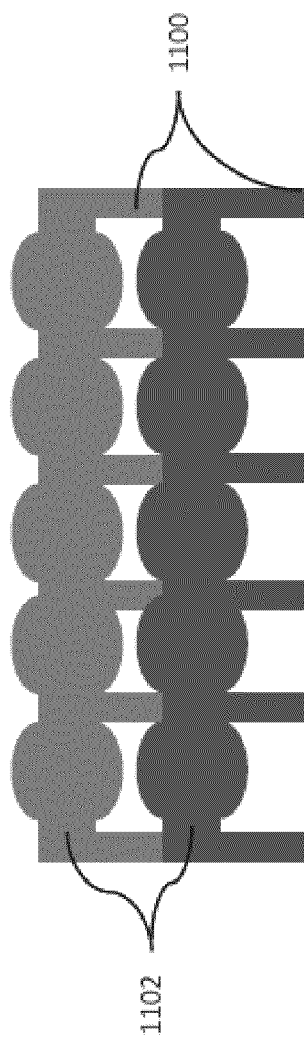
FIGS. 11A and 11B are schematics of optical arrangements having preformed spacing and alignment elements according to one embodiment of the invention.
Figure 11B:
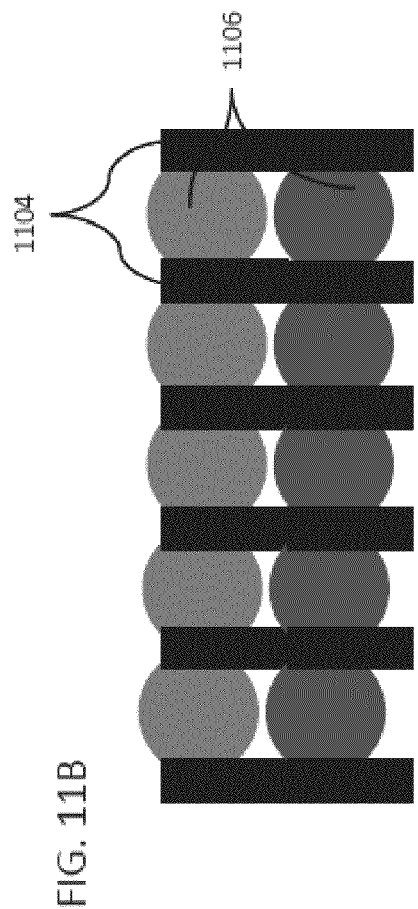

Two such embodiments are shown in FIGS. 11A and 11B. For example, FIG. 11A shows an example in which spacing structures/stand-offs 1100 are included in injection molding process of the lens array 1102. For polymer injection molding it is desirable in such an embodiment that the material combination choice and spacer thickness provide athermalization. In short, it is desirable that the do/dT of the lens material is compensated by the CTE of spacer. Alternatively, the same technique may be used in independently fabricated spacer or hole matrix structures. In such an embodiment, as shown in FIG. 11B an (opaque) cavity array 1104 is used as the supporting structure into which the lenses 1106 are replicated.

Embodiment 9

Waveplate or Multilevel Diffractive Phase Elements

In yet another embodiment, the invention is directed to a waveplate or multilevel diffractive phase element ("kinoform") for channelwise correction of chromatic aberrations in an array camera, and an iterative fabrication process tolerance compensation.

Currently one of the three or four lens surfaces in the objective is channel-wisely optimized in order to correct for chromatic aberrations of the specific channel (see, e.g., U.S Pat. Pub. No. US-2011-0069189-A1, the disclosure of which is incorporated herein by reference). For this a special mastering regime for the array tool is required since slightly different lenses need to be fabricated within one array. The overall lens property can be considered as the sum of the average required shape, and the individual color correction. However, the total profile has to be implemented by machining, which adds difficulty for diamond turning mastering techniques. (See, e.g., U.S. patent application Ser. No. 13/050,429, the disclosure of which is incorporated herein by reference.)

Lens design experiments show that it could be beneficial to separate the channel-averaged optical power from the channel-specific optical power, which is then related to the color correction. The current embodiment is directed to an optical arrangement that accomplishes this channel-wise correction using a channel-specific surface that introduces only a minor wavefront deformation of exactly the size needed to distinguish the channels from each other so that they are perfectly adapted to their individual waveband. The wavefront deformation required for this is typically on the order of only several wavelengths. As a result, this surface can either be a very shallow refractive surface ("waveplate"), a "low frequency" diffractive lens ("kinoform") or radial symmetric multilevel diffractive phase element. As a result, there is no longer a need to machine slightly different lenses (e.g. by diamond turning), but all the lens surfaces within one array could be equal. In addition, different technologies can be used for the origination of arrays of such channel specific surfaces, including, "classical" lithographic microoptics fabrication technologies such as laser beam writing, gray scale lithography, E-beam lithography, binary lithography, etc. Moreover, these techniques are more suitable for manufacturing slight differences in the surfaces comprised in the array, they have much higher lateral precision than mechanical origination means, and they provide much higher thickness precision (i.e., phase accuracy of the surface).

Figure 12:
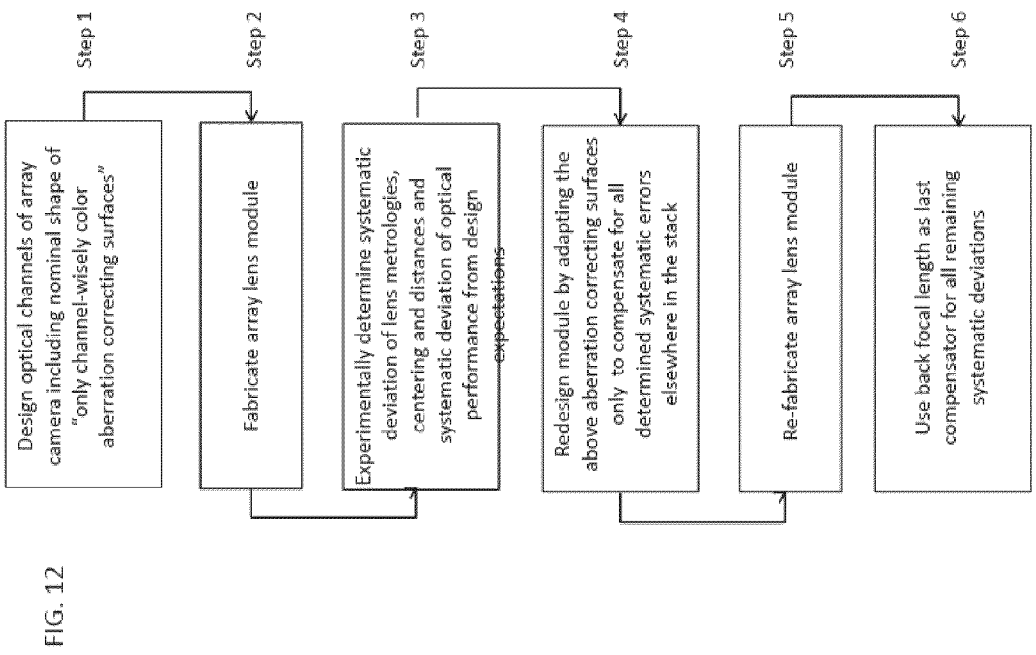
FIG. 12 is a flowchart of a process for manufacturing an optical arrangement according to one embodiment of the invention.

In addition, it is possible to use the above advantages to compensate for the effects of systematic fabrication errors on image quality. A flow chart of this manufacturing method is provided in FIG. 12. As shown, in a first step the optical channels of the array camera are designed. This at this time includes the nominal shape of the waveplate or multilevel diffractive phase element which is used for channel-wise color aberration correction only. In a second step the array lens module is fabricated by a suitable means (as described above). Then in step three, the systematic deviation of the lens prescriptions from design expectations are determined by lens surface metrology, centering- and distances-measurements are performed, as well as the systematic deviation of optical performance from design expectation are experimentally determined. The module is then redesigned (Step Four) by adapting the above aberration correcting surfaces in order to compensate for all determined systematic errors elsewhere in the stack (profile, xy-position, thickness, etc.). In step six the array lens module is re-fabricated. And finally, the back focal length is used as a last compensator for all remaining systematic deviations (Step Seven). The advantage of this method is that there are more degrees of freedom, rather then being able to change back focal length only, as is the case in conventional system. This leads to better overall performance, potentially without impacting optical magnification.

GENERAL CONSIDERATIONS

Finally, it will be understood that in any of the above embodiments, multiple identical or slightly varied versions of such optical arrangements may be collocated next to each other in an array. The variation of the optical arrangements within an optical array is related to e.g. one of the following optical performance parameters of the considered channel: "color" (identifying the narrow spectral band the considered optical channel is supposed to image of the overall spectral band the whole system shall image), e.g. RGB (and NIR), field of view (FOV), F/#, resolution, object distance, etc. Most typical is the differentiation into different colors, but different FOVs, for example, would allow for different magnifications while different F/#s would allow for different sensitivities and so forth.

DOCTRINE OF EQUIVALENTS

While particular embodiments and applications of the present invention have been illustrated and described herein, it is to be understood that the invention is not limited to the precise construction and components disclosed herein and that various modifications, changes, and variations may be made in the arrangement, operation, and details of the methods and apparatuses of the present invention without departing from the spirit and scope of the invention as it is defined in the appended claims.

What is claimed is:

1. A monolithic lens optical arrangement for an array camera comprising:
   at least one lens element comprising:
   a first monolithic lens having front and back optical surfaces disposed on opposite sides of the first monolithic lens, wherein the front surface of the first monolithic lens has one of either a concave or convex profile, and wherein the back surface of the first monolithic lens has a plano profile;
   at least one aperture disposed on the back surface of the first monolithic lens and in optical alignment therewith;
   a second monolithic lens having front and back optical surfaces disposed on opposite sides of the second monolithic lens, wherein the front surface of the second monolithic lens has a plano profile, and wherein the back surface of the second monolithic lens has one of either a concave or convex profile, and wherein the second monolithic lens is arranged in optical alignment with said aperture; and
   wherein the back surface of the first monolithic lens element is in direct contact with the aperture and the front surface of the second monolithic lens forming a planar interface therebetween.

2. The monolithic optical arrangement of claim 1, further comprising at least one filter disposed on one of said surfaces having a plano profile in optical alignment with said at least one aperture.

3. The monolithic optical arrangement of claim 1, wherein the monolithic lenses are formed from materials having different Abbe-numbers.

4. The monolithic optical arrangement of claim 1, further comprising at least two lens elements.

5. An array comprising a plurality of the monolithic optical arrangements of claim 1, wherein the array is designed to image a selected wavelength band, and wherein the profile of at least one of the lens surfaces within each optical arrangement is adapted to optimally image only a narrow-band portion of the selected wavelength such that in combination the plurality of arrangements within the array image the entirety of the selected wavelength band.

6. A wafer stack comprising a plurality of the monolithic lens optical arrangements of claim 1, the wafer stack further comprising:
   a plurality of wafer surfaces formed from the elements of the arrangements; and
   at least two alignment marks formed in relation to each wafer surface, each of said alignment marks being cooperative with an alignment mark on an adjacent wafer surface such that said alignment marks when cooperatively aligned aide in the lateral and rotational alignment of the lens surfaces with the corresponding apertures.

* * * * *